(12) United States Patent
Kikukawa et al.

(10) Patent No.: US 6,965,556 B1
(45) Date of Patent: Nov. 15, 2005

(54) OPTICAL INFORMATION MEDIUM HAVING HIGH RESOLUTION BEYOND A DIFFRACTION LIMIT AND READING METHOD

(75) Inventors: Takashi Kikukawa, Tokyo (JP); Hajime Utsunomiya, Tokyo (JP); Hiroshi Shingai, Tokyo (JP); Tatsuya Kato, Tokyo (JP)

(73) Assignee: TDK Corporation, Tokyo (JP)

( * ) Notice: Subject to any disclaimer, the term of this patent is extended or adjusted under 35 U.S.C. 154(b) by 774 days.

(21) Appl. No.: 09/609,898

(22) Filed: Jul. 3, 2000

(30) Foreign Application Priority Data

| Jul. 2, 1999 | (JP) | 11-189800 |
| Aug. 27, 1999 | (JP) | 11-242293 |
| Sep. 21, 1999 | (JP) | 11-267823 |
| Oct. 25, 1999 | (JP) | 11-302558 |
| Dec. 28, 1999 | (JP) | 11-375067 |
| Jun. 16, 2000 | (JP) | 2000-182125 |

(51) Int. Cl.$^7$ ............................................. G11B 7/24
(52) U.S. Cl. ............................................. 369/284
(58) Field of Search .......................... 369/284, 285, 369/47.5, 47.51, 53.26, 53.27

(56) References Cited

U.S. PATENT DOCUMENTS

| 5,474,874 A | * | 12/1995 | Asai et al. | 430/275.1 |
| 5,559,769 A | * | 9/1996 | Ando et al. | 369/44.27 |
| 5,572,503 A | * | 11/1996 | Satoh et al. | 369/47.17 |
| 5,610,879 A | * | 3/1997 | Moriya et al. | 369/13.24 |
| 5,661,716 A | * | 8/1997 | Saito | 369/275.1 |
| 5,684,769 A | * | 11/1997 | Kaneko | 369/47.26 |
| 5,691,072 A | * | 11/1997 | Izumi et al. | 428/694 ML |
| 5,701,281 A | * | 12/1997 | Sano | 710/5 |
| 5,738,973 A | * | 4/1998 | Abe | 430/270.11 |
| 5,777,981 A | * | 7/1998 | Sugaya et al. | 369/275.4 |
| 5,817,389 A | | 10/1998 | Ono | |
| 5,824,450 A | | 10/1998 | Abe | |
| 5,917,791 A | * | 6/1999 | Tsuchiya et al. | 369/53.23 |
| 5,999,512 A | * | 12/1999 | Furuta | 369/275.1 |
| 6,083,597 A | * | 7/2000 | Kondo | 428/64.1 |
| 6,108,296 A | * | 8/2000 | Kajiyama et al. | 369/275.4 |
| 6,254,966 B1 | * | 7/2001 | Kondo | 428/156 |
| 6,320,832 B1 | * | 11/2001 | Nakao et al. | 369/47.53 |
| 6,366,547 B1 | * | 4/2002 | Chase | 369/112.01 |
| 6,456,586 B1 | * | 9/2002 | Suzuki et al. | 369/286 |
| 6,487,164 B1 | * | 11/2002 | Endoh et al. | 369/275.4 |

(Continued)

FOREIGN PATENT DOCUMENTS

JP  2-147287  6/1990

(Continued)

Primary Examiner—Brian E. Miller
Assistant Examiner—Michael V. Battaglia
(74) Attorney, Agent, or Firm—Oblon, Spivak, McClelland, Maier & Neustadt, P.C.

(57) ABSTRACT

In an optical information medium having an information bearing surface having projections and depressions and/or capable of forming recorded marks, a functional layer is added. The information borne on the information bearing surface can be read by using reading light of a wavelength longer than $4NA \cdot P_L$ wherein $P_L$ is the minimum size of the projections and depressions or the recorded marks and NA is the numerical aperture of a reading optical system, setting the power of the reading light within such a range that the functional layer does not change its complex index of refraction, and irradiating the reading light to the information bearing surface constructed by the functional layer or to the information bearing surface through the functional layer or to the functional layer through the information bearing surface. The medium enables reading at a high resolution beyond the diffraction limit.

10 Claims, 38 Drawing Sheets

U.S. PATENT DOCUMENTS 6,538,968 B1 * 3/2003 Yamaguchi et al. ..... 369/47.53

FOREIGN PATENT DOCUMENTS

| JP | 5-28498 | 2/1993 |
| JP | 5-205314 | 8/1993 |
| JP | 8-96412 | 4/1996 |
| JP | 10-269627 | 10/1998 |
| JP | 2844824 | 10/1998 |
| JP | 10-340482 | 12/1998 |
| JP | 11-86342 | 3/1999 |

* cited by examiner

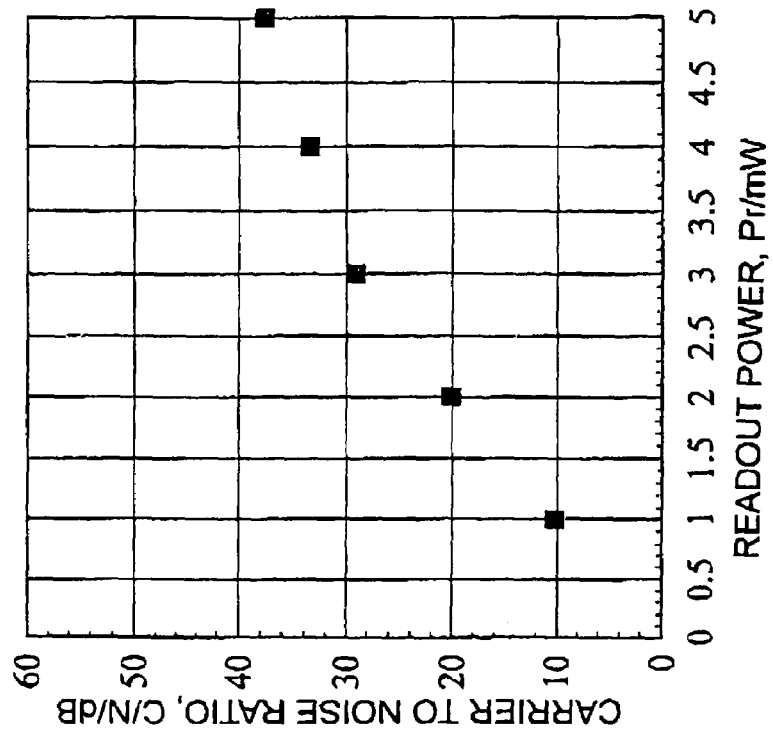
FIG. 27A WITHOUT METAL LAYER
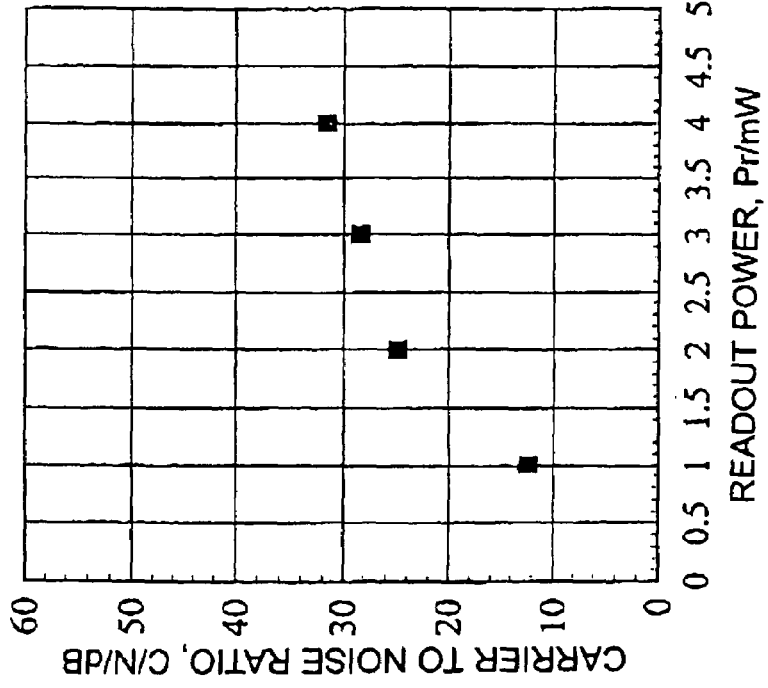
FIG. 27B WITH METAL LAYER

WITH METAL LAYER

WITHOUT METAL LAYER

OPTICAL INFORMATION MEDIUM HAVING HIGH RESOLUTION BEYOND A DIFFRACTION LIMIT AND READING METHOD

This invention relates to an optical information medium having a high recording density and a method for reading information in the medium.

BACKGROUND OF THE INVENTION

Optical information media include read-only optical discs such as compact discs, rewritable optical recording discs such as magneto-optical recording discs and phase change optical recording discs, and write-once optical recording discs using organic dyes as the recording material.

In general, optical information media have a high information density as compared with magnetic recording media. The recent need to process a vast quantity of information as in images requires to further increase the recording density. The recording density per unit area can be increased either by narrowing the track pitch or by reducing the space or blank between recorded marks or between phase pits to increase a line density. However, if the track density or line density is too high relative to the beam spot of reading light, the carrier-to-noise (C/N) ratio lowers, eventually to a level where signals are unreadable. The resolution upon signal readout is determined by the diameter of a beam spot. More illustratively, provided that the reading light has a wavelength $\lambda$ and the optical system of the reading equipment has a numerical aperture NA, the readout limit is generally given by a spatial frequency $2NA/\lambda$. Accordingly, reducing the wavelength of reading light and increasing the NA are effective means for improving the C/N and resolution upon readout. A number of technical studies that have been made thus far reveal that many technical problems must be solved before such effective means can be introduced.

Under the circumstances, several methods have been proposed for going over the readout limit determined by light diffraction. They are generally known as super-resolution readout methods.

The most common super-resolution readout method is to form a mask layer over a recording layer. Based on the fact that a laser beam defines a spot having an intensity distribution approximate to the Gaussian distribution, an optical aperture smaller than the beam spot is formed in the mask layer whereby the beam spot is reduced below the diffraction limit. This method is generally divided into a heat mode and a photon mode, depending on the optical aperture-forming mechanism.

The heat mode is such that upon irradiation to a beam spot, the mask layer changes its optical properties in a region whose temperature is raised above a certain value. The heat mode is utilized, for example, in the optical disc disclosed in JP-A 5-205314. This optical disc has on a transparent substrate in which optically readable recorded pits are formed in accordance with information signals, a layer of a material whose reflectance changes with temperature. That is, the material layer serves as a mask layer. The elements described in JP-A 5-205314 as the material of which the mask layer is constructed are lanthanoids, with Tb being used in Examples. In the optical disc of JP-A 5-205314, when reading light is irradiated, the reflectance of the material layer changes due to temperature distribution within the scanned spot of the reading light. After reading operation, the reflectance resumes the initial state as the temperature lowers. It never happens that the material layer be melted during reading. Another known example of the heat mode is a medium capable of super-resolution readout, as disclosed in Japanese Patent No. 2,844,824, the medium having a mask layer of an amorphous-crystalline phase transition material in which a high-temperature region created within a beam spot is transformed into crystal for increasing the reflectance. This medium, however, is impractical in that after reading, the mask layer must be transformed back to amorphous.

The heat mode media require that the readout power be strictly controlled in consideration of various conditions including the linear velocity of the medium since the size of the optical aperture depends solely on the temperature distribution in the mask layer. This, in turn, requires a complex control system and hence, an expensive medium drive. The heat mode media also suffer from the problem that reading characteristics degrade with the repetition of reading operation because the mask layer is prone to degradation by repetitive heating.

On the other hand, the photon mode is such that upon exposure to a beam spot, the mask layer changes its optical properties in a region whose photon intensity is increased above a certain value. The photon mode is utilized, for example, in the information recording medium of JP-A 8-96412, the optical recording medium of JP-A 11-86342, and the optical information recording medium of JP-A 10-340482. More illustratively, JP-A 8-96412 discloses a mask layer formed of phthalocyanine or a derivative thereof dispersed in a resin or inorganic dielectric, and a mask layer formed of a chalcogenide. JP-A 11-86342 uses as the mask layer a super-resolution readout film containing a semiconductor material having a forbidden band which upon exposure to reading light, is subject to electron excitation to the energy level of excitons to change light absorption characteristics. One illustrative mask layer is CdSe microparticulates dispersed in a $SiO_2$ matrix. JP-A 10-340482 uses as the mask layer a glass layer in which the intensity distribution of transmitted light varies non-linearly with the intensity distribution of irradiated light.

Unlike the super-resolution readout media of the heat mode, the super-resolution readout media of the photon mode are relatively resistant to degradation by repetitive reading.

In the photon mode, the region whose optical characteristics change is determined by the number of incident photons which in turn, depends on the linear velocity of the medium relative to the beam spot. Also in the photon mode, the size of an optical aperture depends on the power of reading light, indicating that supply of an excessive power makes so large an optical aperture that super-resolution readout may become impossible. Therefore, the photon mode also requires to strictly control the power of reading light in accordance with the linear velocity and the size of pits or recorded marks to be read out. Additionally, the photon mode requires to select the mask layer-forming material in accordance with the wavelength of reading light. That is, the photon mode media are rather incompatible with multi-wavelength reading.

SUMMARY OF THE INVENTION

An object of the invention is to provide an optical information medium which enables reading at a high resolution beyond the diffraction limit and minimizes the dependency of a readout power on a linear velocity. Another object is to provide a method for reading the information recorded in the optical information medium.

These and other objects are achieved by the present invention which is defined below.

(1) An optical information medium comprising
an information bearing surface having projections and depressions and/or capable of forming recorded marks, and
a functional layer having a function of increasing a spatial resolution.

(2) An optical information medium comprising an information bearing surface having projections and depressions and/or capable of forming recorded marks, and a functional layer, wherein
the information borne on said information bearing surface can be read by using reading light of a wavelength longer than $4NA \cdot P_L$ wherein $P_L$ is the minimum size of said projections and depressions or said recorded marks and NA is the numerical aperture of a reading optical system, setting the power of the reading light within such a range that said functional layer does not change its complex index of refraction, and irradiating the reading light to said information bearing surface constructed by the functional layer or to said information bearing surface through the functional layer or to the functional layer through said information bearing surface.

(3) The optical information medium of (2) wherein an optimum readout power is previously recorded.

(4) An optical information medium comprising an information bearing surface having projections and depressions and/or capable of forming recorded marks, and a functional layer, wherein
the information borne on said information bearing surface can be read by using reading light of a wavelength longer than $4NA \cdot P_L$ wherein $P_L$ is the minimum size of said projections and depressions or said recorded marks and NA is the numerical aperture of a reading optical system, setting the power of the reading light within such a range that the intensity of reflected light from said functional layer changes in linear proportion to a change in the readout power, and irradiating the reading light to said information bearing surface constructed by the functional layer or to said information bearing surface through the functional layer or to the functional layer through said information bearing surface.

(5) The optical information medium of (4) wherein an optimum readout power is previously recorded.

(6) An optical information medium comprising a substrate which is formed on a surface with pits for bearing information, and a functional layer on the pitted surface of said substrate, said functional layer giving rise to the following phenomena (A) and (B):
phenomenon (A) that the information borne in the pits can be read when reading light having a wavelength longer than $4NA \cdot P_L$ wherein $P_L$ is the minimum size of said pits and NA is the numerical aperture of a reading optical system is irradiated, and
phenomenon (B) that the read output varies in accordance with the depth of pits, and the pit depth at which the read output becomes maximum for those pits having a length of less than $\lambda/4NA$ is less than the pit depth at which the read output becomes maximum for those pits having a length of at least $\lambda/4NA$, provided that the reading light has a wavelength $\lambda$.

(7) An optical information medium comprising a substrate which is formed on a surface with pits for bearing information, and a functional layer on the pitted surface of said substrate, wherein the information borne in said pits can be read when reading light of a wavelength longer than $4NA \cdot P_L$ wherein $P_L$ is the minimum length of said pits and NA is the numerical aperture of a reading optical system is irradiated,
provided that the reading light has a wavelength $\lambda$ and said substrate has a refractive index n, the pits have a depth d which satisfies:

$\lambda/10n \leq d < \lambda/6n$ throughout the medium.

(8) An optical information medium comprising a substrate which is formed on a surface with pits for bearing information, and a functional layer on the pitted surface of said substrate, wherein
the information borne in said pits can be read when reading light of a wavelength longer than $4NA \cdot P_L$ wherein $P_L$ is the minimum length of said pits and NA is the numerical aperture of a reading optical system is irradiated,
provided that the reading light has a wavelength $\lambda$, said pits include pits having a length of less than $\lambda/4NA$ and a depth of $d_s$, and pits having a length of at least $\lambda/4NA$ and a depth of $d_L$ that satisfies $d_s < d_L$.

(9) The optical information medium of (8) wherein provided that said substrate has a refractive index n, the depth $d_s$ satisfies: $\lambda/10n \leq d_s < \lambda/6n$.

(10) The optical information medium of (8) wherein provided that said substrate has a refractive index n, the depth $d_L$ satisfies: $\lambda/8n < d_L < \lambda/4n$.

(11) In connection with an optical information medium comprising an information bearing surface having projections and depressions and/or capable of forming recorded marks, and a functional layer.
a method for reading the information on the information bearing surface, comprising the steps of:
using reading light of a wavelength longer than $4NA \cdot P_L$ wherein $P_L$ is the minimum size of said projections and depressions or said recorded marks and NA is the numerical aperture of a reading optical system,
setting the power of the reading light within such a range that said functional layer does not change its complex index of refraction, and
irradiating the reading light to said information bearing surface constructed by the functional layer or to said information bearing surface through the functional layer or to the functional layer through said information bearing surface.

(12) The method of (11) wherein upon reading, the temperature of said functional layer is raised above a predetermined value corresponding to the material of which said functional layer is made.

(13) The method of (12) wherein the temperature of said functional layer is raised by utilizing at least the irradiation of a laser beam.

(14) The method of (12) wherein the temperature of said functional layer is raised by utilizing at least the elevation of the ambient temperature.

(15) The method of (11) wherein an optimum readout power is previously recorded in the optical information medium, the optimum power is read out prior to the reading operation, and the reading operation is carried out using reading light of the optimum power.

(16) In connection with an optical information medium comprising an information bearing surface having projections and depressions and/or capable of forming recorded marks, and a functional layer, a method for reading the information on the information bearing surface, comprising the steps of:

using reading light of a wavelength longer than 4NA·$P_L$ wherein $P_L$ is the minimum size of said projections and depressions or said recorded marks and NA is the numerical aperture of a reading optical system, setting the power of the reading light within such a range that the intensity of reflected light from said functional layer changes in linear proportion to a change in the readout power, and irradiating the reading light to said information bearing surface constructed by the functional layer or to said information bearing surface through the functional layer or to the functional layer through said information bearing surface.

(17) The method of (16) wherein upon reading, the temperature of said functional layer is raised above a predetermined value corresponding to the material of which said functional layer is made.

(18) The method of (17) wherein the temperature of said functional layer is raised by utilizing at least the irradiation of a laser beam.

(19) The method of (17) wherein the temperature of said functional layer is raised by utilizing at least the elevation of the ambient temperature.

(20) The method of (16) wherein an optimum readout power is previously recorded in the optical information medium, the optimum power is read out prior to the reading operation, and the reading operation is carried out using reading light of the optimum power.

BRIEF DESCRIPTION OF THE DRAWINGS

FIG. 27 is a graph of C/N versus readout power, FIGS. 27A and 27B corresponding to the absence and presence of a metal layer, respectively.

DESCRIPTION OF THE PREFERRED EMBODIMENT

The optical information medium of the invention has an information bearing surface. The information bearing surface used herein means a region that has projections and depressions in the form of pits and/or grooves, a region where recorded marks can be formed, or a region that has projections and depressions and can form recorded marks. This suggests that the invention is applicable to both read-only media and optical recording media (write-once or rewritable media). In the read-only media, a substrate surface having pits formed therein constitutes the information bearing surface. In the optical recording media, the recording layer constitutes the information bearing surface. The recording layer may be any of a phase change layer, a layer based on an organic dye, and a layer based on another organic material or inorganic material. The recorded information may take the form of marks having a different optical constant (e.g., reflectance) from the surrounding, concave marks or convex marks.

We have found that by providing an optical information medium with a layer constructed of a specific material and having an appropriate thickness for the specific material, the optical information medium is given a capability of super-resolution readout based on a mechanism essentially different from the prior art. The specific material used herein is at least one element selected from among Nb, Mo, W, Mn, Pt, C, Si, Ge, Ti, Zr, V, Cr, Fe, Co, Ni, Pd, Sb, Ta, Al, In, Cu, Sn, Te, Zn, and Bi or an alloy or compound containing that element or elements, with the element or compound thereof being preferred. Herein, the layer capable of super-resolution readout is designated a functional layer. The provision of the functional layer enables to detect pits, grooves or recorded marks of a size falling below the resolution limit determined by light diffraction.

Now the invention is described in detail in conjunction with the drawings.

Figure 1:
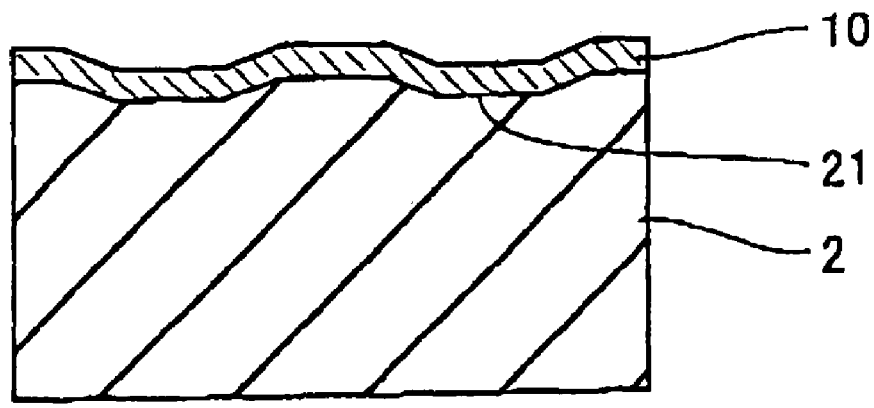
FIG. 1 is a fragmentary cross-sectional view of an optical information medium according to one embodiment of the invention.

Application to Medium Structure Shown in FIG. 1

Referring to FIG. 1, there is illustrated one exemplary construction of the optical information medium. The optical information medium 1 shown in FIG. 1 is a read only medium including a light-transmissive substrate 2 having pits 21 formed on a surface and a layer 10 in close contact with the pitted surface. Reading light comes from below in the figure. The layer 10 serves as the functional layer when it has a specific composition and a specific thickness.

Figure 5:
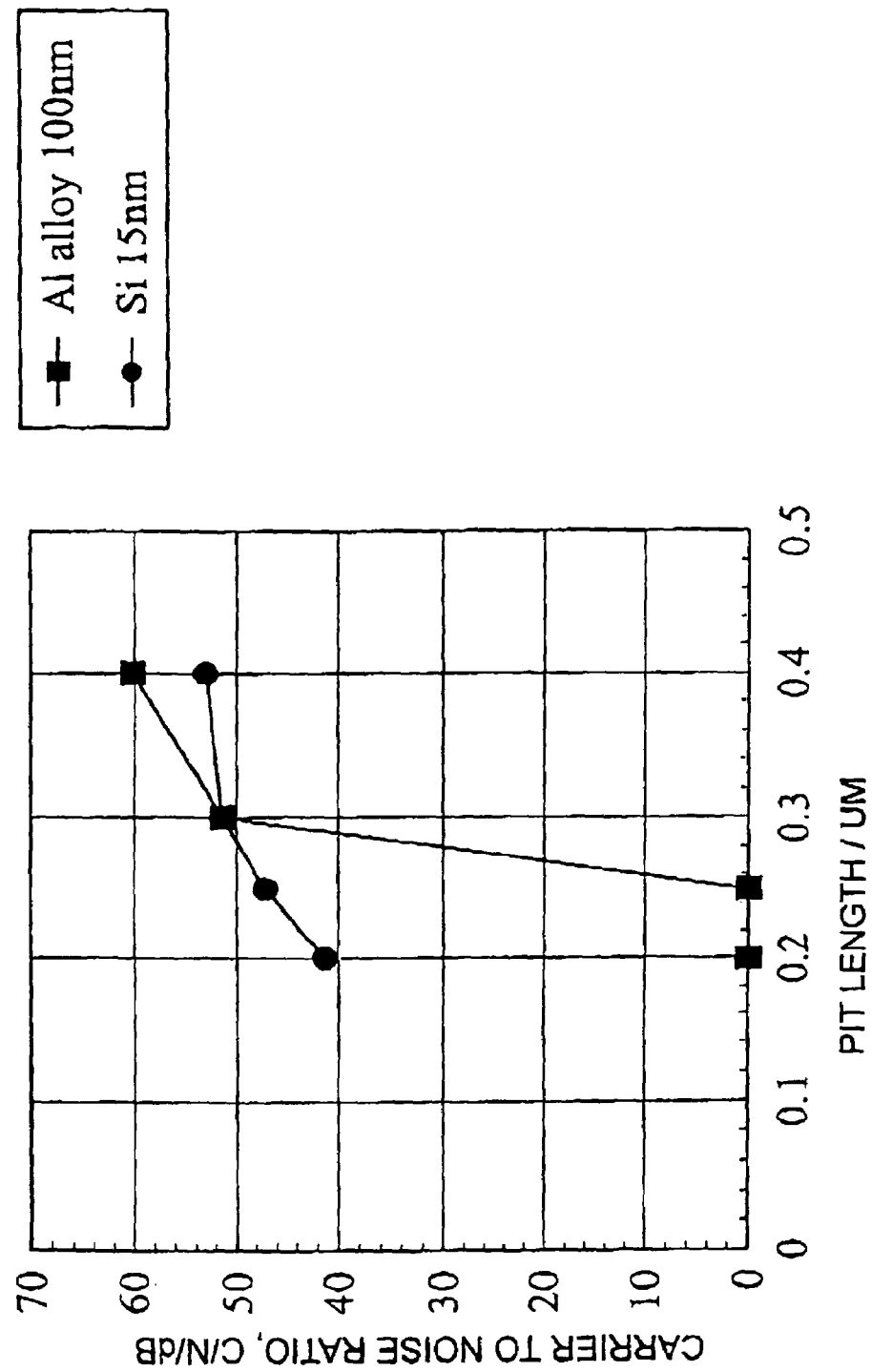
FIG. 5 is a graph of C/N versus pit length.
Figure 6:
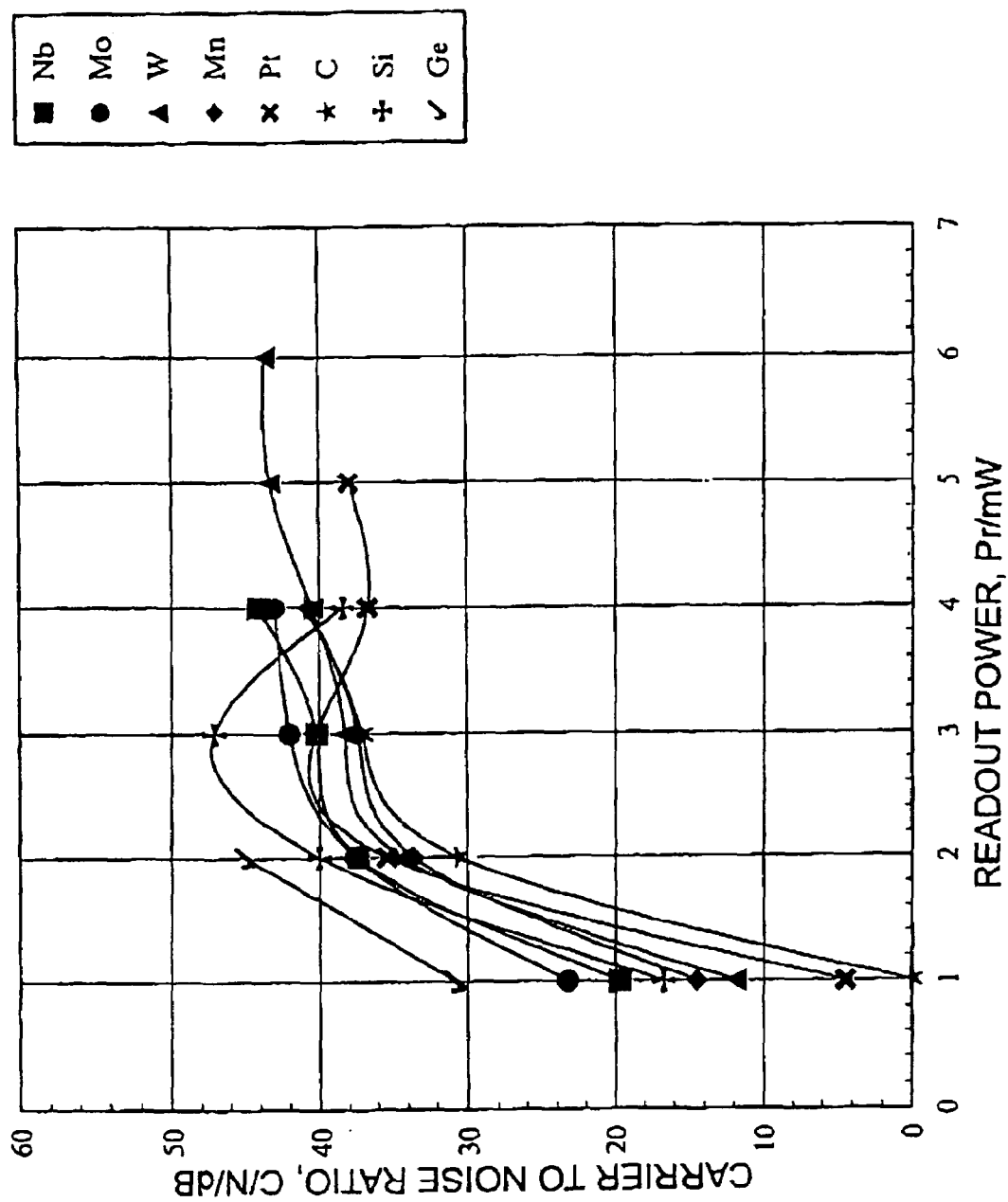
FIG. 6 is a graph of C/N versus readout power.
Figure 7:
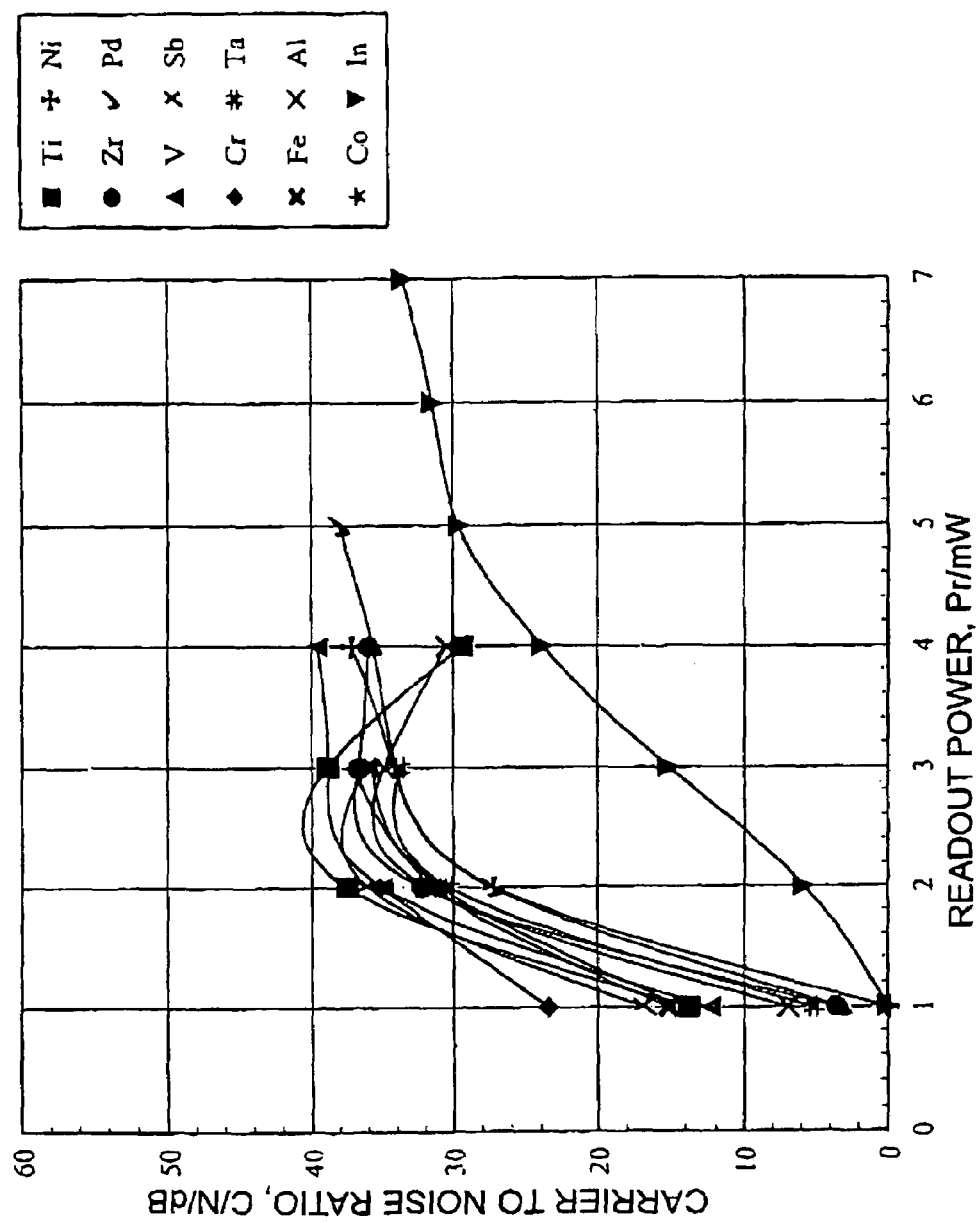
FIG. 7 is a graph of C/N versus readout power.
Figure 8:
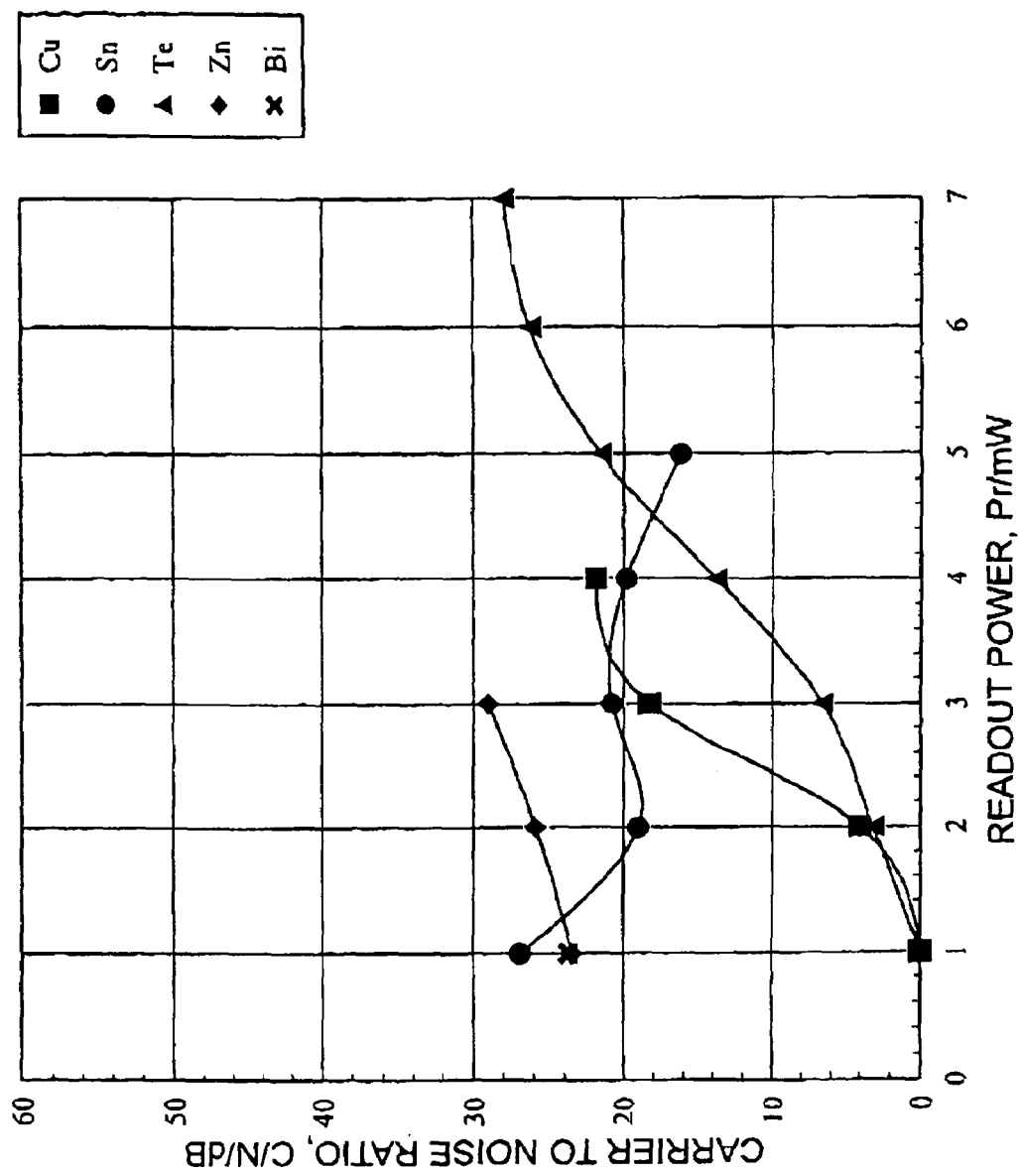
FIG. 8 is a graph of C/N versus readout power.

Layer 10 Made of Element or Alloy:

Optical disc samples of the structure shown in FIG. 1 were fabricated by the following procedure. The substrate 2 used was a disc which was injection molded from polycarbonate (refractive index n=1.58) to a diameter of 120 mm and a thickness of 0.6 mm in which phase pits were formed simultaneously with injection molding. The substrate 2 is of the banded type that the substrate is provided with a plurality of annular pit-forming regions having helical tracks in a concentric pattern, and pits have an equal length in each pit-forming region. Namely, phase pits of different lengths are formed in a single substrate. The pit length in each pit-forming region has a value as shown in FIG. 5. The space between adjacent pits is equal to the pit length. The layer 10 was constructed by a silicon layer of 15 nm thick or an aluminum alloy (Al—1.7 at % Cr) layer of 100 nm thick. The layer 10 was formed by sputtering.

Using an optical disc tester (laser wavelength 635 nm and numerical aperture 0.60), these samples were measured for carrier to noise (C/N) ratio at a linear velocity of 11 m/s and a reading power of 3 mW. Since the optical disc tester used has a cutoff spatial frequency $2NA/\lambda$, which is calculated to be:

$$2NA/\lambda = 1.89 \times 10^3 \text{ (line pairs/mm)},$$

rows of pits in which the pit length is equal to the space between adjacent pits are readable as long as the spatial frequency is equal to or below $1.89 \times 10^3$ (line pairs/mm). The pit length (=space length) $P_L$ corresponding to the readable spatial frequency is given as $$P_L \geq \lambda/4NA = 265 \text{ (nm)}.$$

It is then concluded that super-resolution readout is possible if a C/N is obtained from a pit row with a pit length of less than 265 nm.

For these samples, the C/N is plotted relative to the pit length in FIG. 5. The sample having the Si layer of 15 nm thick shows a C/N of more than 40 dB at a pit length of 200 to 250 nm. The sample having the Al alloy layer of 100 nm produces no signal as seen from a C/N of 0 dB at a pit length of less than 250 nm. When the pit length is 300 nm within the readable spatial frequency range, the sample having the Al alloy layer shows a C/N approximately equal to the Si layer sample. It is evident from these results that the provision of a St layer of 15 nm thick enables super-resolution readout.

In the disclosure, the medium is considered readable (reading is possible) when a C/N of at least 20 dB is obtained. For the medium to find practical use, a C/N of preferably at least 30 dB and more preferably at least 40 dB is necessary.

Next, optical disc samples were fabricated by constructing the layer 10 from any one element selected from among Nb, Mo, W, Mn, Pt, C, Si, Ge, Ti, Zr, V, Cr, Fe, Co, Ni, Pd, Sb, Ta, Al, In, Cu, Sn, Te, Zn, Bi, Au and Ag and changing its thickness in the range of 5 to 100 nm. For these samples, a pit row with a pit length of 250 nm was measured for C/N while changing the readout power in the range of 1 to 7 mW. The C/N measurement used the same optical disc tester as above and a linear velocity of 11 m/s. Tables 1 to 4 show the relationship of C/N to the thickness of the layer 10. In Tables 1 to 4, the highest C/N obtained from the layer 10 of a certain thickness when the readout power is changed between 1 mW and 7 mW is reported for each of different materials of which the layer 10 is made. Table 1 picks up those samples which show a maximum C/N of at least 40 dB, Table 2 picks up those samples which show a maximum C/N of 30 dB to less than 40 dB, Table 3 picks up those samples which show a maximum C/N of 20 dB to less than 30 dB, and Table 4 picks up those samples which show a maximum C/N of less than 20 dB.

TABLE 1

C/N (dB) versus thickness of layer 10
(maximum C/N ≧ 40 dB)

| Layer 10 Material | Thickness of layer 10 (nm) | | | | | | |
|---|---|---|---|---|---|---|---|
| | 5 | 10 | 15 | 20 | 30 | 50 | 100 |
| Nb | 38.4 | — | 34.3 | — | 44.1 | 40.3 | 32.8 |
| Mo | — | 41.2 | 43.0 | — | 39.6 | 26.4 | 9.2 |
| W | 32.2 | 43.0 | 43.6 | 38.2 | 32.7 | 24.3 | 7.7 |
| Mn | 33.2 | 37.6 | 35.3 | — | 40.7 | 35.1 | 22.7 |
| Pt | — | 39.1 | 40.2 | — | 30.2 | 13.2 | 4.3 |
| C | 33.2 | — | — | — | 40.9 | 40.9 | 31.0 |
| Si | 45.5 | 43.2 | 47.1 | — | 41.4 | 44.9 | 40.5 |
| Ge | 37.4 | 41.3 | 45.0 | — | 44.4 | 42.5 | 40.7 |

TABLE 2

C/N (dB) versus thickness of layer 10
(40 dB > maximum C/N ≧ 30 dB)

| Layer 10 Material | Thickness of layer 10 (nm) | | | | | | |
|---|---|---|---|---|---|---|---|
| | 5 | 10 | 15 | 20 | 30 | 50 | 100 |
| Ti | — | 29.6 | 35.4 | 37.2 | 37.5 | 37.4 | 29.8 |
| Zr | — | — | 20.9 | — | — | 36.7 | 28.8 |
| V | 33.1 | — | 31.1 | — | 36.6 | 39.6 | 32.4 |
| Cr | — | 35.2 | 26.8 | — | 20.4 | 11.1 | 4.8 |
| Fe | 28.6 | 29.5 | 35.8 | — | 35.2 | 29.4 | 7.9 |
| Co | — | 31.8 | 37.0 | 39.4 | 35.9 | 26.3 | 6.2 |
| Ni | — | — | 36.3 | — | 37.1 | 28.8 | 5.0 |
| Pd | — | 32.8 | 38.0 | — | 31.4 | 14.5 | 5.4 |
| Sb | — | 29.4 | 35.6 | — | 36.1 | 33.3 | 23.7 |
| Ta | — | 23.3 | 25.0 | — | 31.5 | 33.8 | 21.5 |
| Al | — | 34.9 | 26.4 | — | 0.0 | 0.0 | 0.0 |
| In | 33.6 | 24.2 | 21.3 | — | 27.9 | 25.9 | 22.2 |

TABLE 3

C/N (dB) versus thickness of layer 10
(30 dB > maximum C/N ≧ 20 dB)

| Layer 10 | Thickness of layer 10 (nm) | | | | | | |
|---|---|---|---|---|---|---|---|
| Material | 5 | 10 | 15 | 20 | 30 | 50 | 100 |
| Cu | — | 21.9 | 0.0 | — | 7.6 | 9.3 | 8.6 |
| Sn | — | 25.5 | 26.9 | — | 21.0 | 9.9 | 3.7 |
| Te | 28.0 | 23.6 | 25.9 | — | 27.0 | 24.0 | 18.0 |
| Zn | 0.0 | 0.0 | 12.8 | — | 0.0 | 29.0 | 10.6 |
| Bi | 0.0 | 0.0 | 0.0 | — | 13.0 | 23.7 | 11.4 |

TABLE 4

C/N (dB) versus thickness of layer 10
(maximum C/N < 20 dB)

| Layer 10 | Thickness of layer 10 (nm) | | | | | | |
|---|---|---|---|---|---|---|---|
| Material | 5 | 10 | 15 | 20 | 30 | 50 | 100 |
| Ag | 19.2 | 7.4 | 7.8 | — | 0.0 | 0.0 | 0.0 |
| Au | 12.2 | 8.9 | 5.6 | 4.9 | 8.3 | 5.5 | 7.1 |

It is evident from Tables 1 to 4 that the thickness of the layer 10 must be optimized for a particular element used in order that super-resolution readout become possible. For example, as seen from Table 2, super-resolution readout is possible when the layer 10 is an Al layer and has a thickness of 15 nm. However, when the Al layer has a thickness of 100 nm, which is approximate to the thickness of the reflective layer in conventional ROM discs such as CD-ROM and DVD-ROM, super-resolution readout becomes impossible like conventional ROM discs.

Only for those samples producing a maximum C/N among the above samples, FIGS. 6 to 9 show C/N relative to readout power Pr. The samples shown in FIGS. 6 to 9 correspond to the samples shown in Tables 1 to 4, respectively. The C/N was measured on a pit row with a pit length of 250 nm. The C/N measurement used the same optical disc tester as above and a linear velocity of 11 m/s. It is seen from FIGS. 6 to 9 that in most samples, C/N increases with an increasing readout power. Although the read output is not shown in these diagrams, the read output shows the same behavior as the C/N. In FIGS. 6 to 9, the samples lacking data on the high Pr region are those samples which failed to produce readout signals on account of degradation of the layer 10 at such Pr or mean that no data were available due to saturation of the reflected light intensity detecting system of the tester.

For those samples producing a maximum C/N among the above samples, FIGS. 10 to 13 show the intensity of reflected light relative to readout power Pr. The samples shown in FIGS. 10 to 13 correspond to the samples shown in Tables 1 to 4, respectively. For showing a change of the intensity of reflected light from a prior art super-resolution medium utilizing a mask layer, the results of a disc having a phase change material layer as the mask layer are also plotted in FIG. 13. This disc was fabricated by stacking on the same substrate as above a first dielectric layer of ZnS—SiO$_2$ having a thickness of 80 nm, a mask layer (phase change material layer) of Ge$_2$Sb$_Z$Te$_5$ having a thickness of 20 nm, a second dielectric layer of ZnS—SiO$_2$ having a thickness of 23 nm, and a reflective layer of Al having a thickness of 100 nm in the described order, the mask layer being just as deposited, that is, in an amorphous state. The intensity of reflected light was measured on a pit row with a pit length of 250 nm. The intensity of reflected light is an average intensity of reflected light along the entire pit row, that is, an average intensity of reflected light along a recording track consisting of pits and spaces between adjacent pits. The measurement used the same optical disc tester as above and a linear velocity of 11 m/s. It is seen from FIGS. 10 to 13 that in all the samples except for the comparative sample having the mask layer, the intensity of reflected light increases in substantial linear proportion to an increase in readout power Pr. This means that the reflectance is not substantially affected by the readout power, that is, the complex index of refraction (n+ik) does not change with a change of the readout power. By contrast, the prior art super-resolution medium having a mask layer requires a readout power (heat or light intensity) above a critical level to form an optical aperture, and the reflectance experiences an abrupt change across that critical level. As a result, an inflection point exists at the critical level in the readout power vs. reflected light intensity graph as found with the curve of the comparative sample in FIG. 13. It is noted that the Pr-reflected light intensity curve of the comparative sample shown in FIG. 13 has a first inflection point at the position of Pr=2 mW which is due to the crystallization of the mask layer and a second inflection point at the position of Pr 6 mW which is due to the melting of the mask layer.

Like samples incapable of super-resolution readout (for example, the samples having Au and Ag layers shown in FIG. 13), in the inventive samples capable of super-resolution readout, the reflectance is not affected by the readout power. These results suggest that unlike the prior art super-resolution media in which optical apertures are formed by the heat mode or photon mode, the present invention adopts the super-resolution readout mechanism which does not utilize a reflectance change by a temperature or light intensity change.

It is noted that a phase change material layer can also be utilized herein as the functional layer as will be described later. Whether it is amorphous or crystalline, the phase change material layer which can be utilized herein as the functional layer enables super-resolution readout upon irradiation of reading light which does not change its complex index of refraction.

Figure 14:
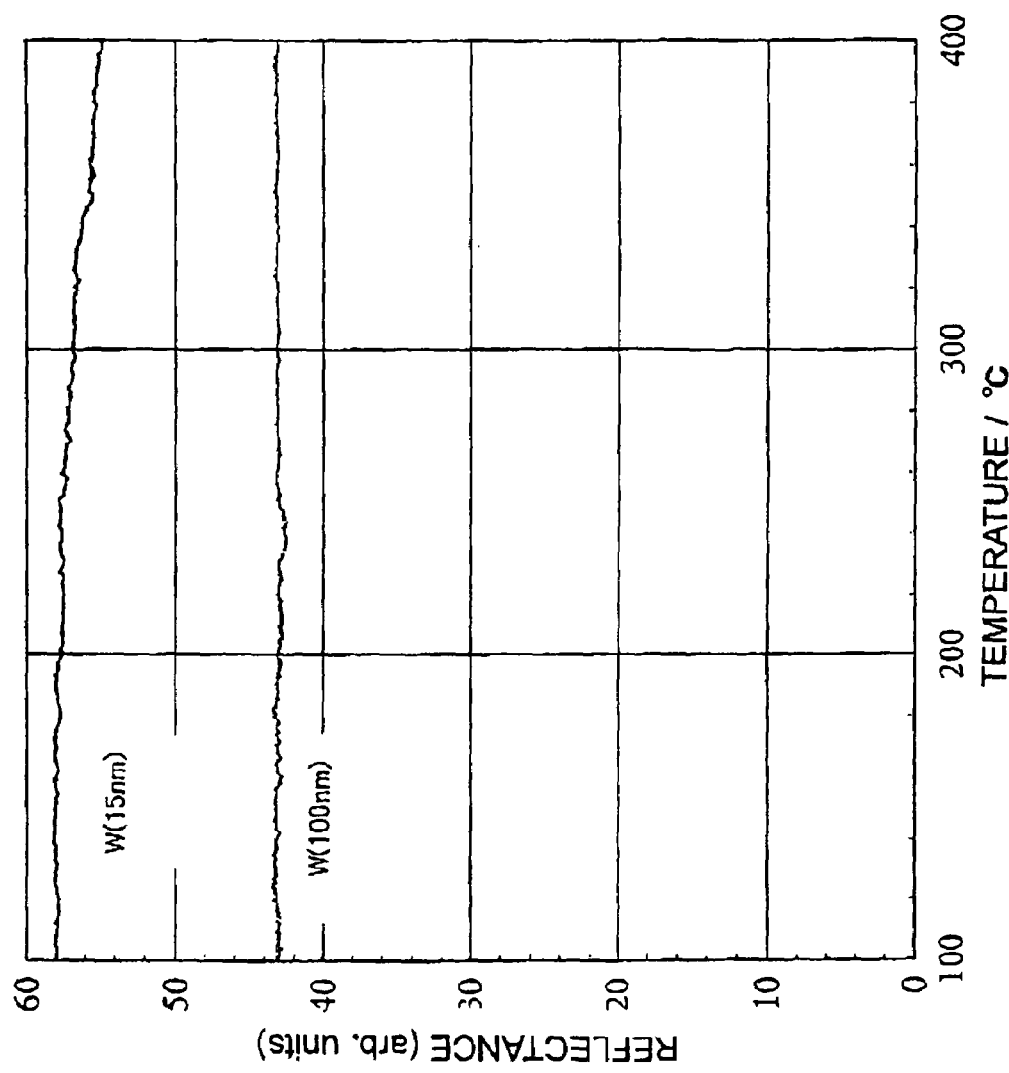
FIG. 14 is a graph of the reflectance of a W layer versus temperature.

In order to examine the thermal effect on a reflectance change, a further experiment was made. In this experiment, a test sample was fabricated by forming a tungsten (W) layer of 15 nm thick or a tungsten layer of 100 nm thick on a substrate in the form of a slide glass of 1.2 mm thick by sputtering. The temperature dependency of the reflectance of the tungsten layer was observed under a heating microscope. The sample was heated at a ramp rate of 30° C./min and measured for reflectance at a wavelength of 635 nm. In FIG. 14, the dependency of reflectance on temperature is shown over the temperature range of 100 to 400° C. It is seen from FIG. 14 that for both the samples, no substantial change of reflectance was observed during heating up to 400° C. These results are in good agreement with the results of FIGS. 10 to 13.

Figure 15:
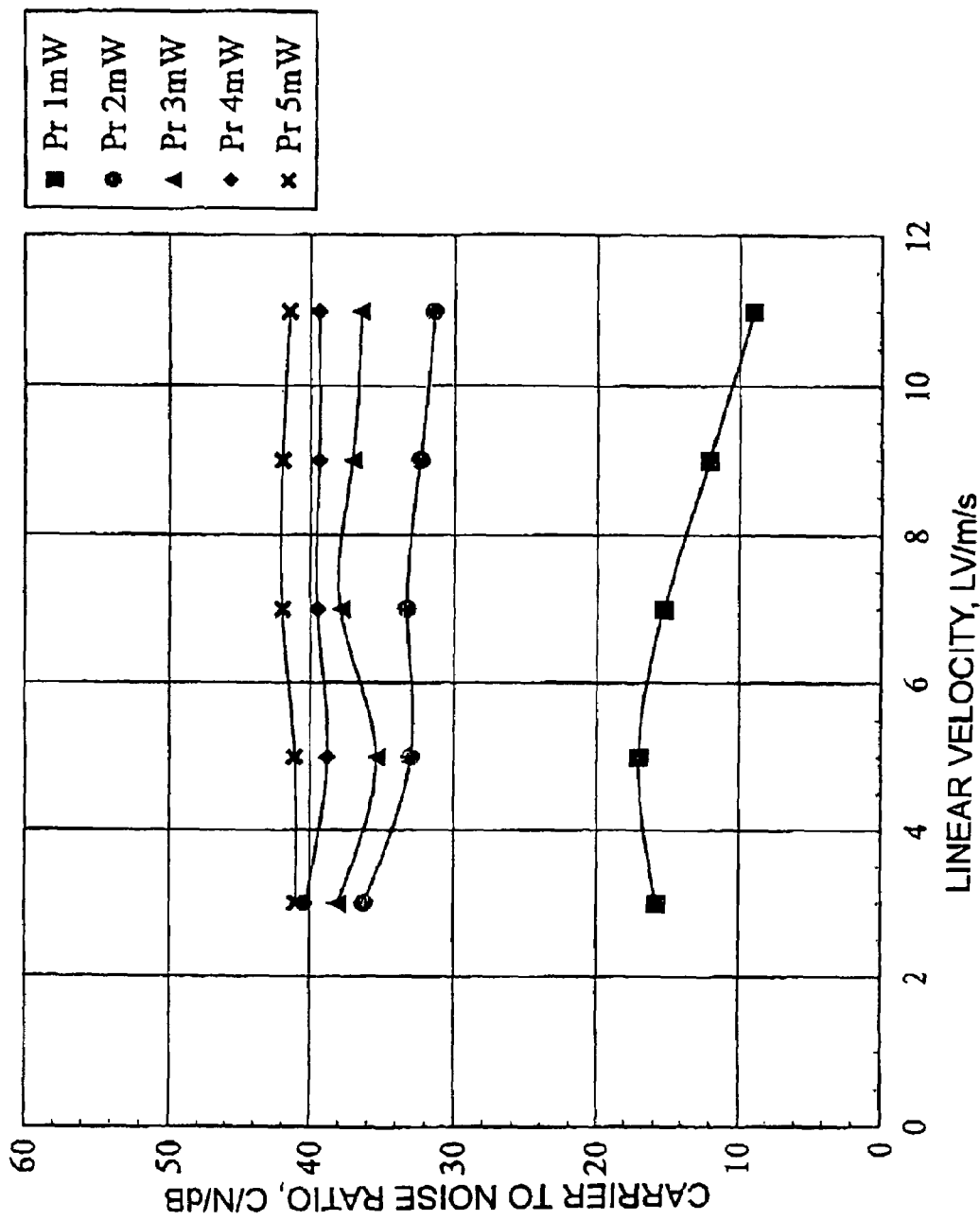
FIG. 15 is a graph of C/N versus linear velocity.

For the sample having a tungsten layer of 15 na thick as the layer 10, FIG. 15 shows the C/N ratio thereof measured while changing the readout power Pr in the range of 1 to 5 mW and the linear velocity LV in the range of 3 to 11 m/s. The C/N was measured on a pit row with a pit length of 250 nm, using the same optical disc tester as above. It is seen from FIG. 15 that no substantial dependency of C/N on linear velocity is observed. That is, within the linear velocity range tested herein, the performance relating to super-resolution readout is not substantially affected by the linear velocity. Therefore, within this linear velocity range, there is no need to control the readout power even when the linear velocity is changed. A free choice of the linear velocity within such a wide range has never been accomplished by prior art super-resolution media whether they are of the heat mode or the photon mode. Although only the results of the sample having a tungsten layer of 15 nm thick are shown in FIG. 15, no substantial dependency of C/N on linear velocity was observed over such a wide linear velocity range for all those samples capable of super-resolution readout among the above samples.

It is noted that each of the above samples was confirmed to be capable of super-resolution readout when C/N was measured along a pit row with a pit length of 250 nm and a pit row with a pit length of 300 nm using reading light having a wavelength of 780 nm.

Figure 16:
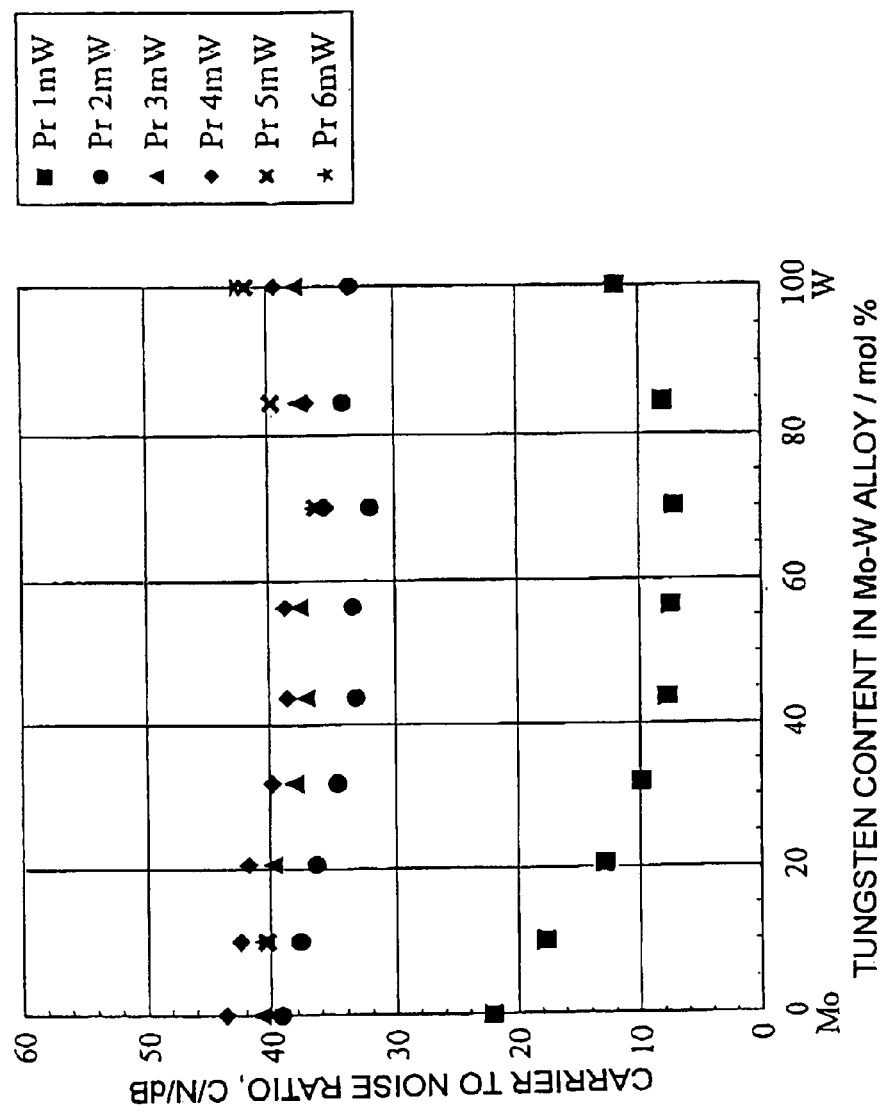
FIG. 16 is a graph of C/N versus a tungsten content in Mo—W alloy.

Further, a sample having the layer 10 made of a tungsten-molybdenum (W—Mo) alloy having a thickness of 15 nm was measured for C/N along a pit row with a pit length of 250 nm using the same optical disc tester as above at a linear velocity of 11 m/s. The results are shown in FIG. 16. It is seen from FIG. 16 that super-resolution readout is also possible when an alloy is used.

Figure 35:
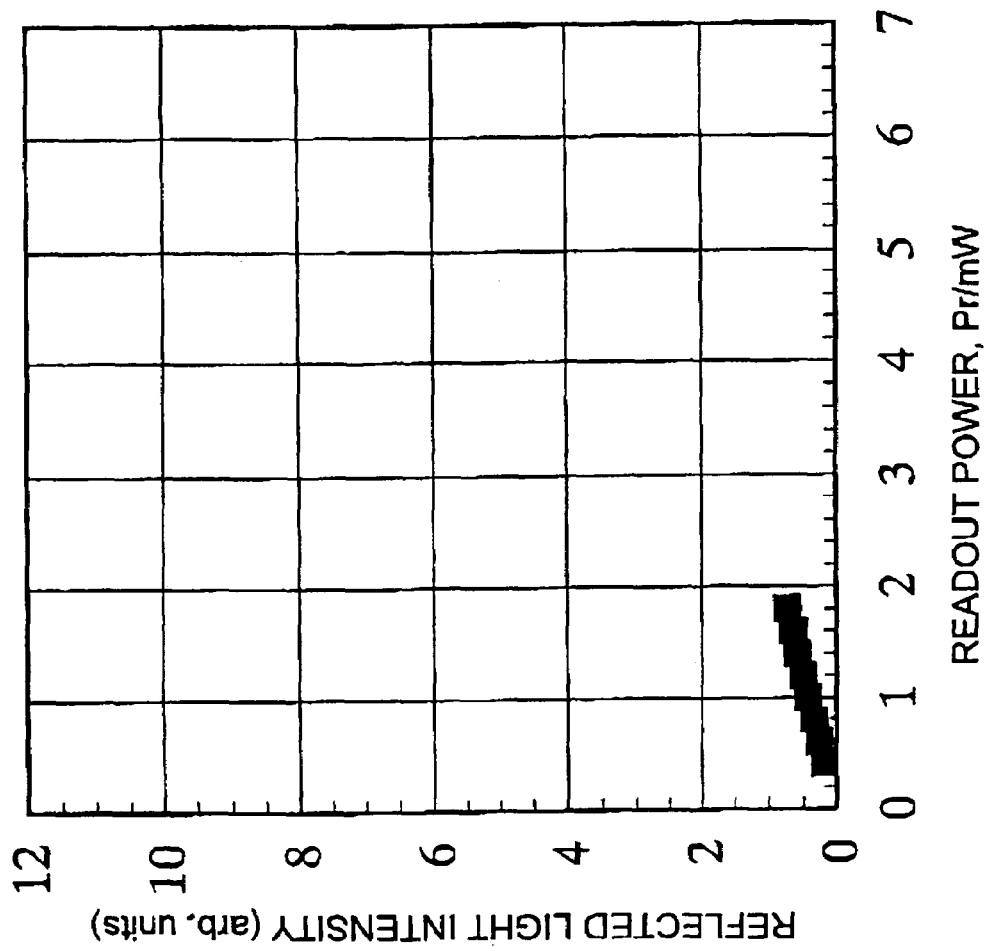
FIG. 35 is a graph of reflected light intensity versus readout power.
Figure 36:
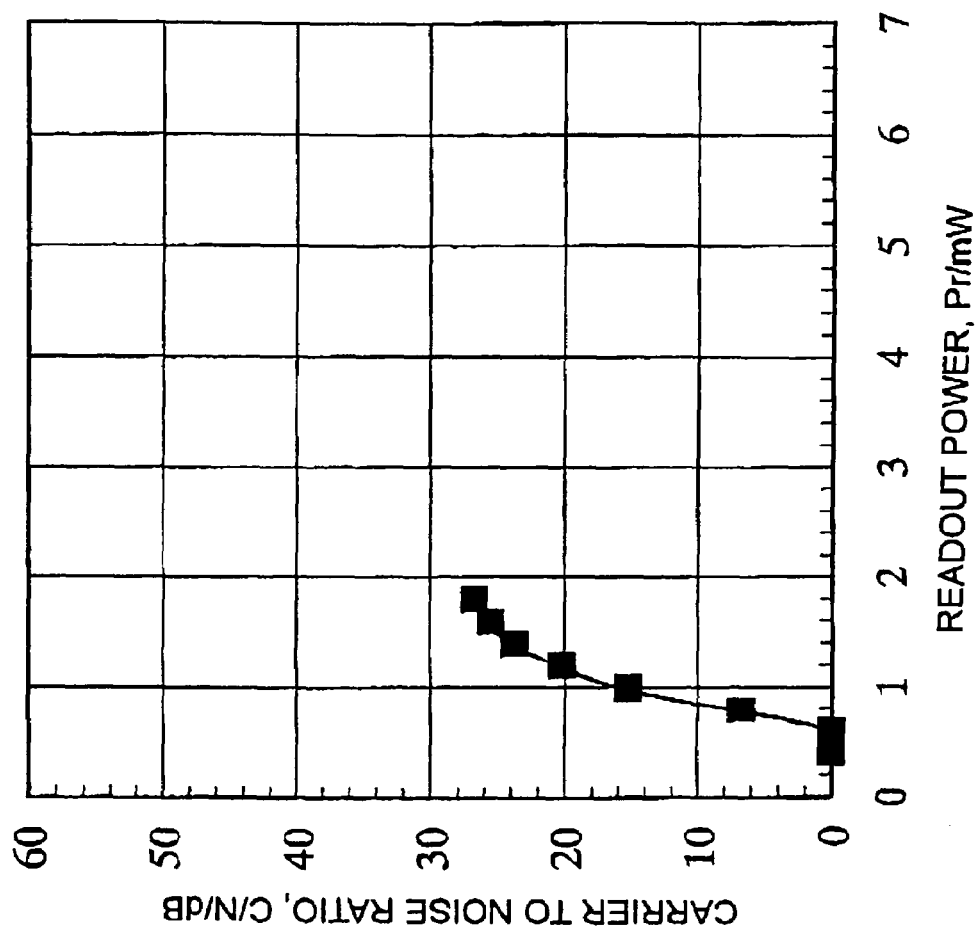
FIG. 36 is a graph of C/N versus readout power.

Still further, a sample having the layer 10 formed of an amorphous $Tb_{19.5}Fe_{70.5}Co_7Cr_3$ (atomic ratio) alloy by sputtering to a thickness of 15 nm was measured for C/N along a pit row with a pit length of 250 nm using the same optical disc tester as above at a linear velocity of 11 m/s. It is noted that although the layer of the alloy having the above composition can be used as a magneto-optical recording layer, it is used herein as a reflective layer in a read only disc sample. In FIG. 35, the intensity of reflected light is plotted as a function of the readout power Pr. In FIG. 36. C/N is plotted as a funciton of the readout power Pr. It is seen from FIG. 35 that in this sample too, the reflected light intensity changes in linear proportion to the readout power. It is also seen from FIG. 36 that super-resolution readout is possible in this sample too, and the layer 10 of magneto-optical recording material serves as the functional layer in the present invention.

A further read test was made on a sample having the layer 10 in the form of a tungsten layer of 15 nm thick. A flat polycarbonate plate of 0.6 mm thick was attached to the layer 10 using a adhesive sheet. Signals were read out by directing reading light to the layer 10 through the polycarbonate plate. Understandably, the polycarbonate plate was attached in order to compensate for the astigmatism of the objective lens of the reading optical system. As a result, the C/N along a pit row with a pit length of 250 nm was 13.8 dB, 21.8 dB, and 27.8 dB at a readout power of 2 mW, 3 mW, and 4 mW, respectively, indicating possible super-resolution readout. These results suggest that super-resolution readout is possible when reading is performed through a transparent resin layer (adhesive layer) which is formed on the layer 10.

Layer 10 Made of Compound:

Even when the layer 10 is constructed of various compounds such as nitrides, oxides, fluorides, sulfides, and carbides, the optical information medium of the invention is also capable of super-resolution readout, and intrinsic effects are exerted. It is noted that the compounds used herein are not limited to stoichiometric compounds and encompass mixtures of metals or metalloids with nitrogen, oxygen, etc. in a proportion less than the stoichiometric composition. Namely, the layer 10 falls within the scope of the invention that contains a metal or metalloid which is capable of super-resolution readout when used in an elemental or alloy form and additionally, another element, preferably at least one element selected from among nitrogen, oxygen, fluorine, sulfur and carbon. The construction of the layer 10 from such compounds is effective for spreading the readout power margin, improving the C/N, and suppressing deterioration of C/N by repetitive reading. An experiment on the layer 10 constructed of compounds is described below.

Figure 17:
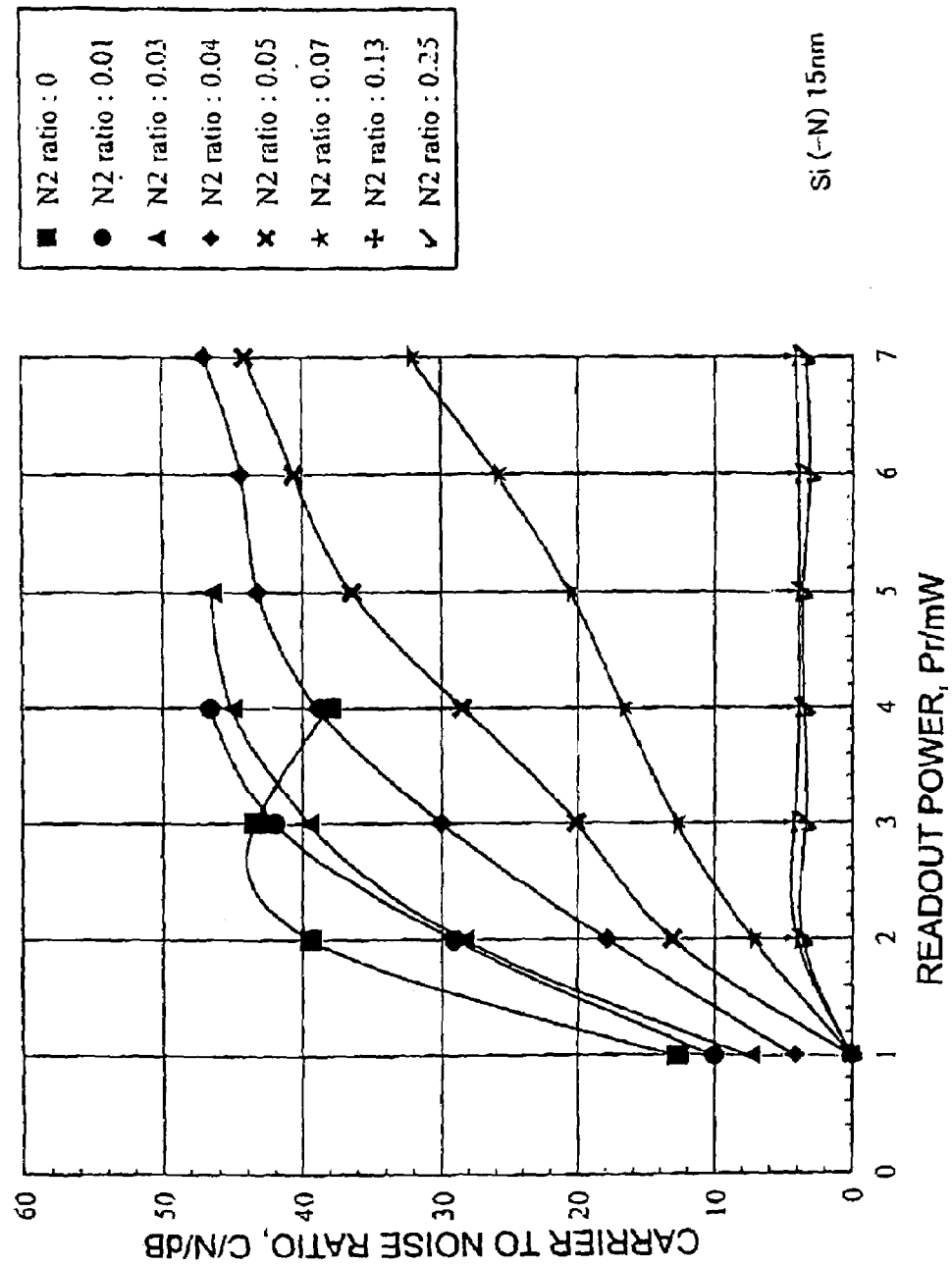
FIG. 17 is a graph of C/N versus readout power.
Figure 18:
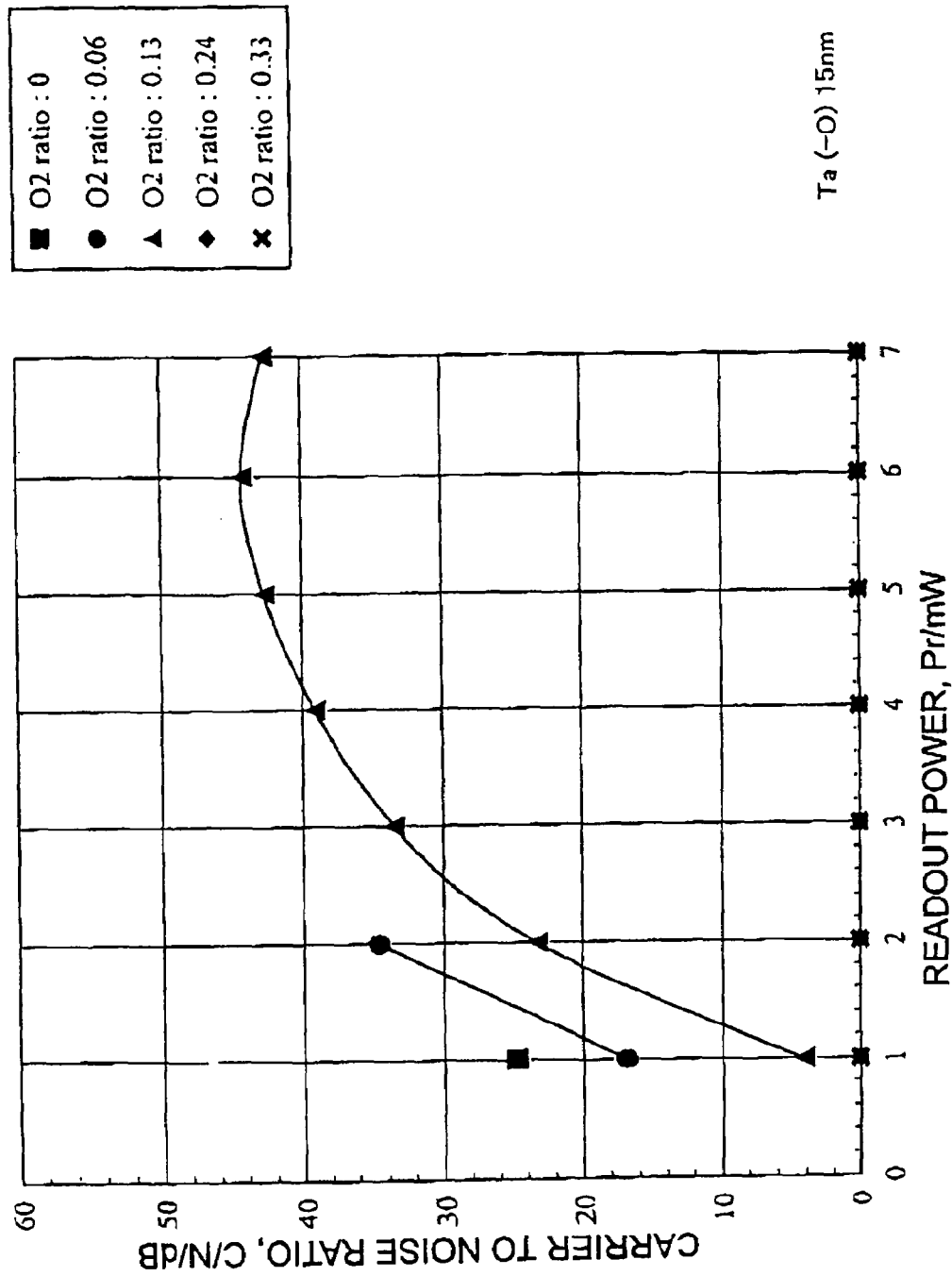
FIG. 18 is a graph of C/N versus readout power.
Figure 19:
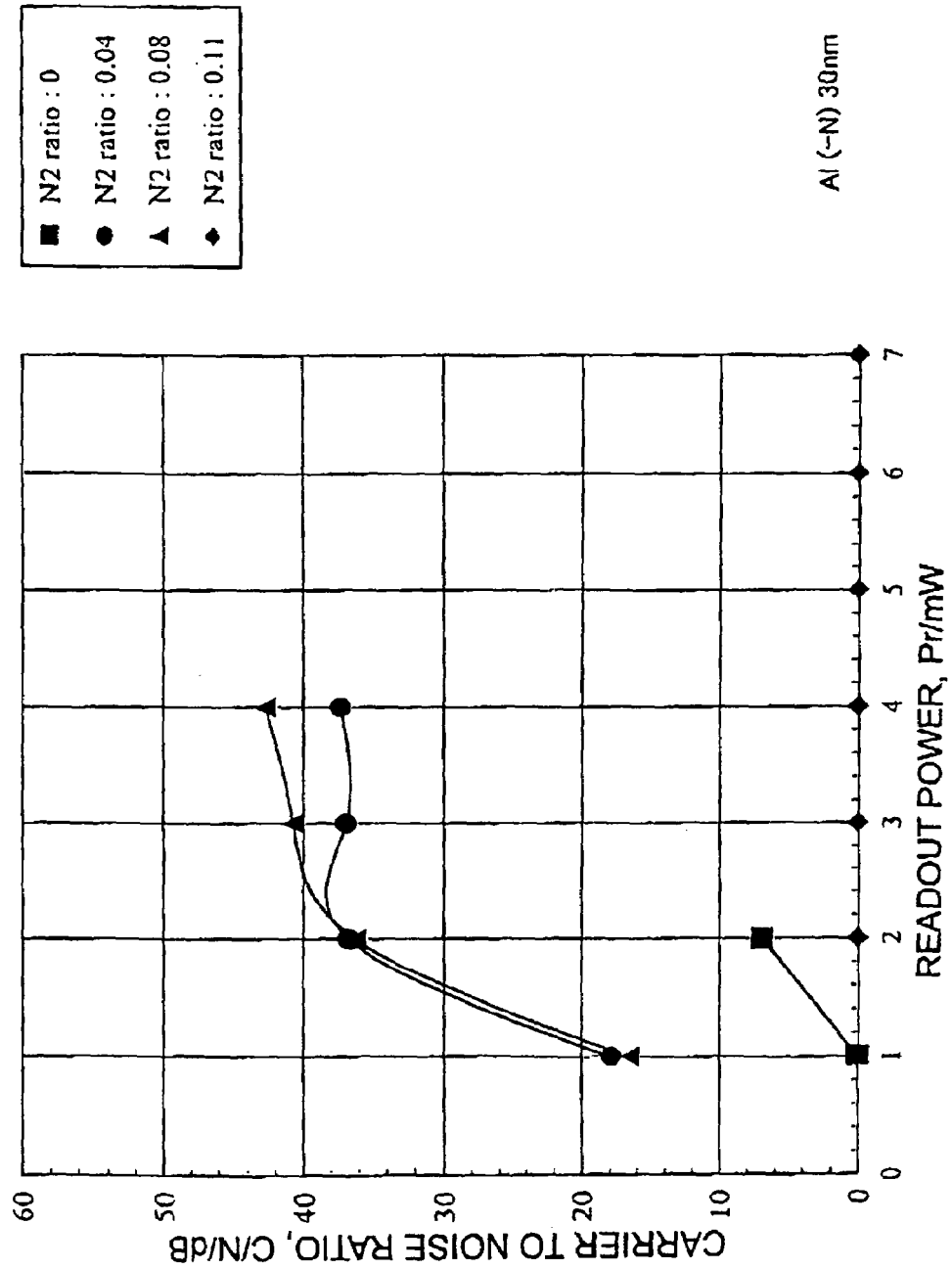
FIG. 19 is a graph of C/N versus readout power.

For the samples used this experiment, the layer 10 was formed by sputtering in an argon atmosphere or reactive sputtering in an atmosphere of argon plus reactive gas. The sputtering target used was silicon (Si), tantalum (Ta) or aluminum (Al), and the reactive gas used was $N_2$ or $O_2$. For those samples in which the layer 10 was formed with the reactive gas being passed at different flow rates, C/N was measured along a pit row with a pit length of 250 nm while changing the readout power in the range of 1 to 7 mW. The C/N measurement used the same optical disc tester as above and a linear velocity of 11 m/s. FIGS. 17, 18, and 19 show the relationship of C/N to readout power Pr of the samples using Si, Ta and Al as the target, respectively. The thickness of the layer 10 was 15 nm when the Si and Ta targets were used and 30 nm when the Al target was used. It is noted that the flow ratio of reactive gas (labeled as $N_2$ ratio or $O_2$ ratio) is the flow rate of reactive gas divided by the sum of the flow rates of reactive gas and argon.

It is seen from FIG. 17 that when the flow ratio of $N_2$ is zero, that is, when the layer 10 was constructed solely of silicon, the C/N became maximum at Pr=3 mW and declined at Pr=4 mW, and no data was available at Pr=5 mW on account of degradation of the layer 10. It is seen from FIG. 18 that when the layer 10 was constructed of tantalum, reading was possible only at Pr=1 mW, and upon application of greater readout powers, reading became impossible on account of degradation of the layer 10. It is also seen from FIGS. 17 and 18 that when the flow ratio of reactive gas was increased, the C/N was lower at low Pr levels, but the maximum C/N improved because higher readout powers were applicable. When the flow ratio of reactive gas was further increased, the maximum C/N lowered, and eventually the super-resolution readout became impossible.

It is seen from FIG. 19 that when the layer 10 was constructed of aluminum, super-resolution readout was impossible at a readout power of 3 mW or higher on account of the saturation of the reflected light detecting system of the tester. As the flow ratio of $N_2$ was increased, reading became possible, achieving a very high C/N. When the flow rate of $N_2$ was further increased, the super-resolution readout eventually became impossible.

Super-resolution readout was possible with a sample in which the layer 10 was a Ge—N layer of 15 nm thick formed by sputtering a germanium target in an atmosphere of $Ar+N_2$. Using the same optical disc tester as above, the sample was measured for C/N along a pit row with a pit length of 250 nm at a linear velocity of 11 m/s. A C/N of 42.6 dB was obtained at a readout power of 7 mW. Super-resolution readout was also possible with a sample having the layer 10 formed to a thickness of 15 nm by sputtering a SiC target in an argon atmosphere. Using the same optical disc tester as above, the sample was measured for C/N along a pit row with a pit length of 250 nm at a linear velocity of 11 m/s. The C/N was 20.2 ds, 23.9 dB, and 27.9 dB at a readout power of 5 mW, 6 mW, and 7 mW, respectively. In either case, a C/N improvement with an increasing readout power was ascertained.

Figure 20:
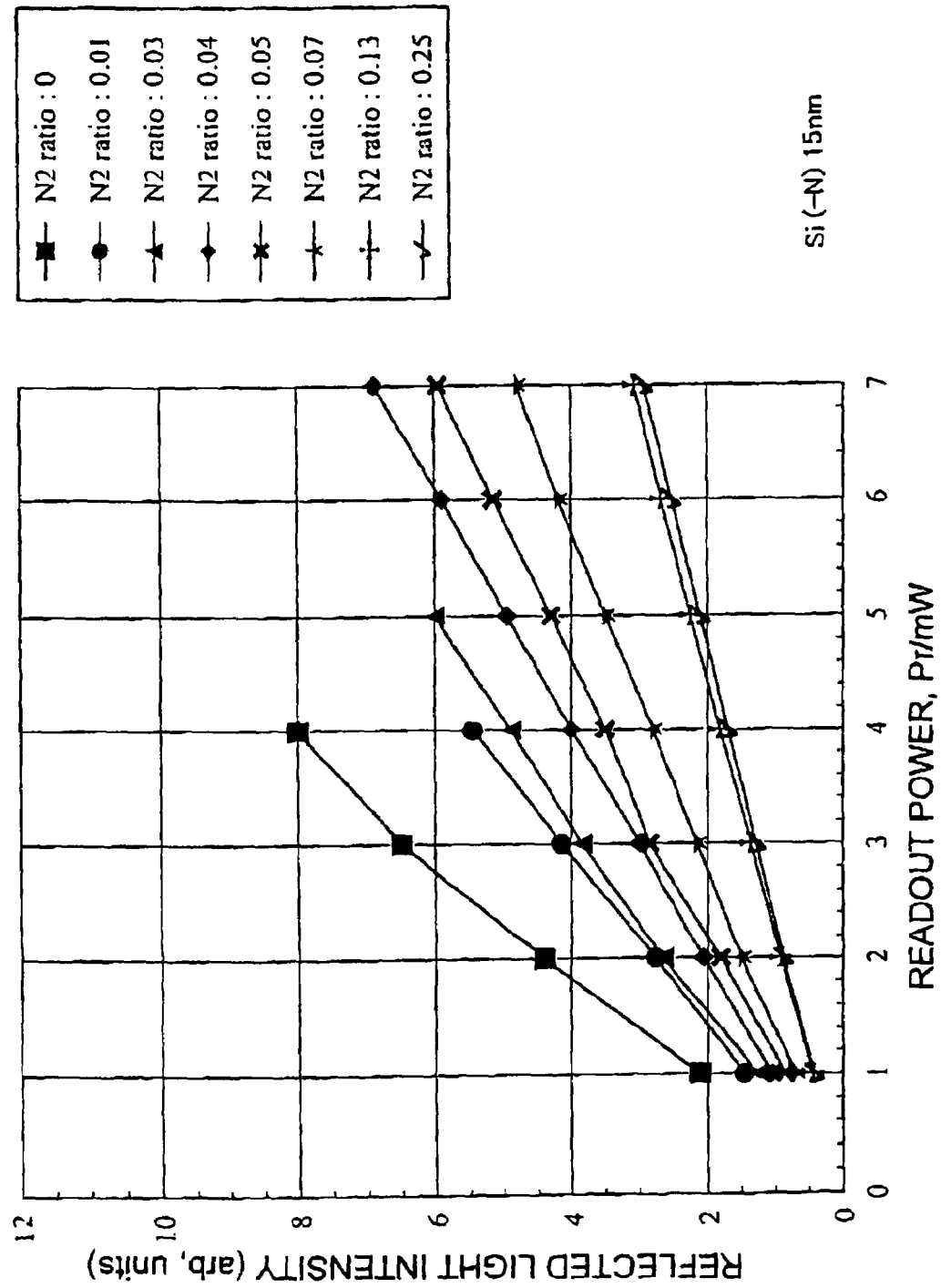
FIG. 20 is a graph of reflected light intensity versus readout power.
Figure 21:
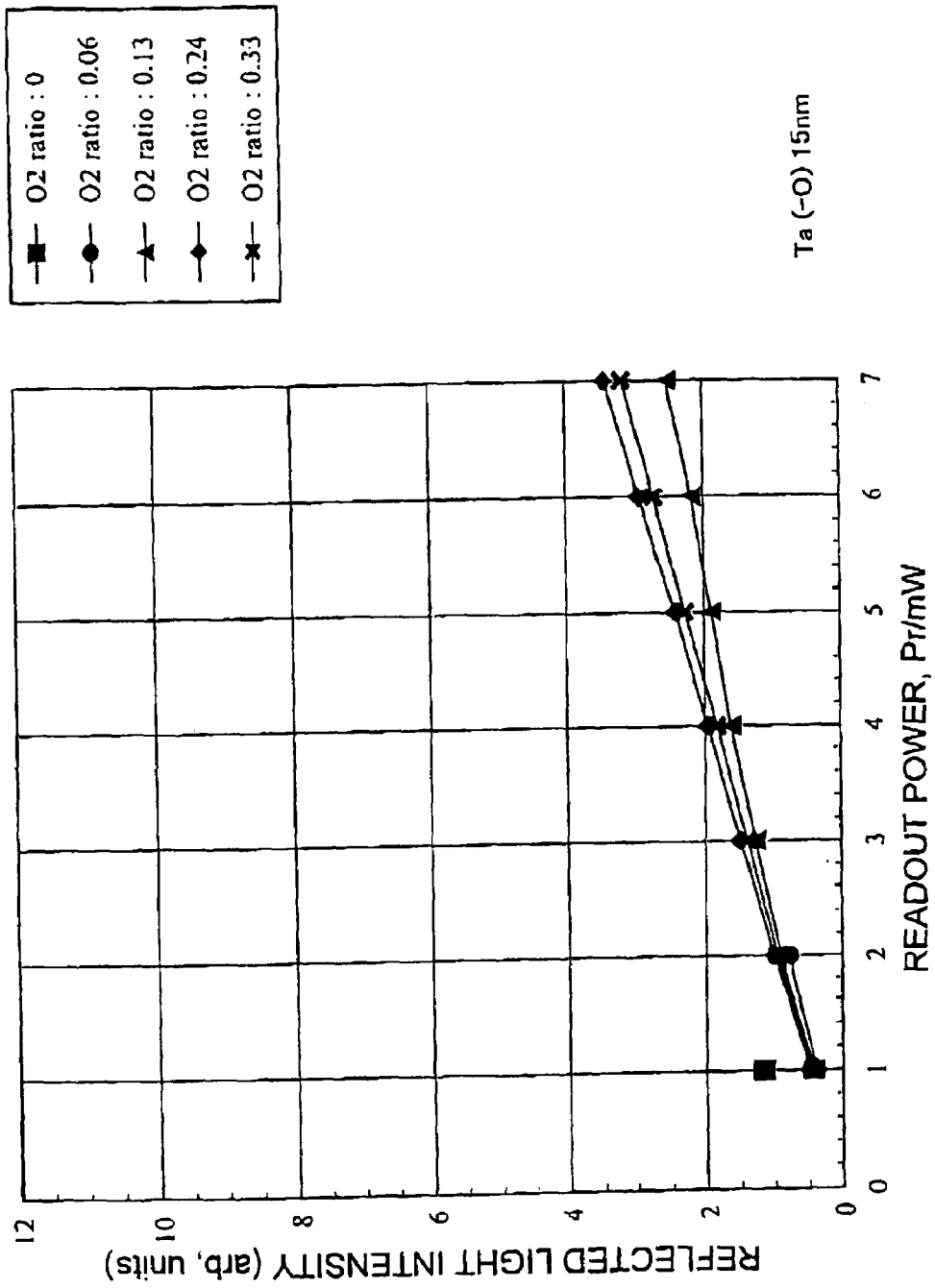
FIG. 21 is a graph of reflected light intensity versus readout power.
Figure 22:
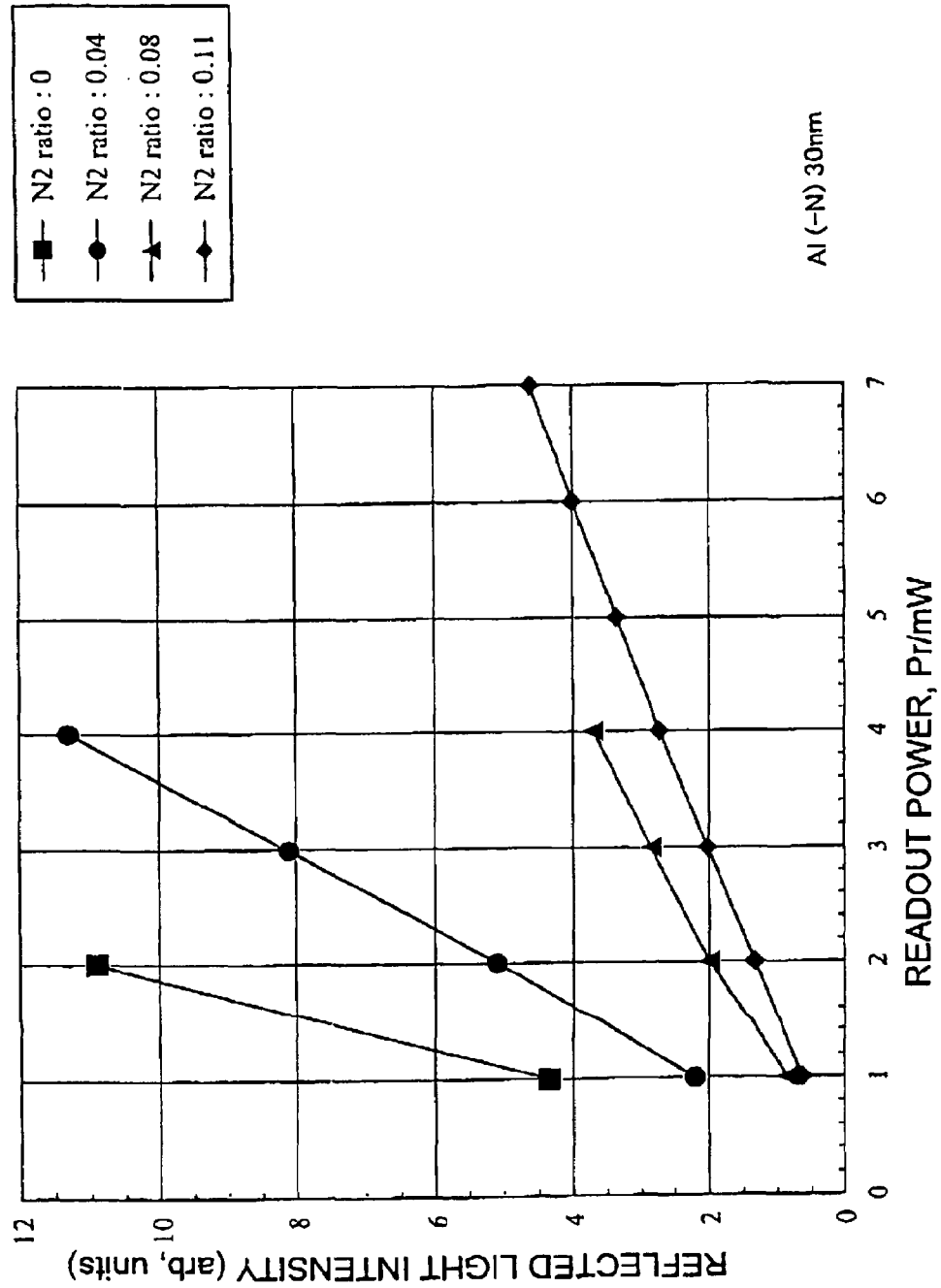
FIG. 22 is a graph of reflected light intensity versus readout power.

For the samples shown in FIGS. 17, 18, and 19, the intensity of reflected light is plotted relative to the readout power Pr in the diagrams of FIGS. 20, 21, and 22. It is seen from these diagrams that the intensity of reflected light increases in substantial linear proportion to an increase in readout power Pr as in FIGS. 10 to 13. This means that the reflectance is not substantially affected by the readout power. It is thus suggested that the super-resolution readout mechanism remains unchanged even when the layer 10 is constructed of compounds instead of pure elements.

Figure 23:
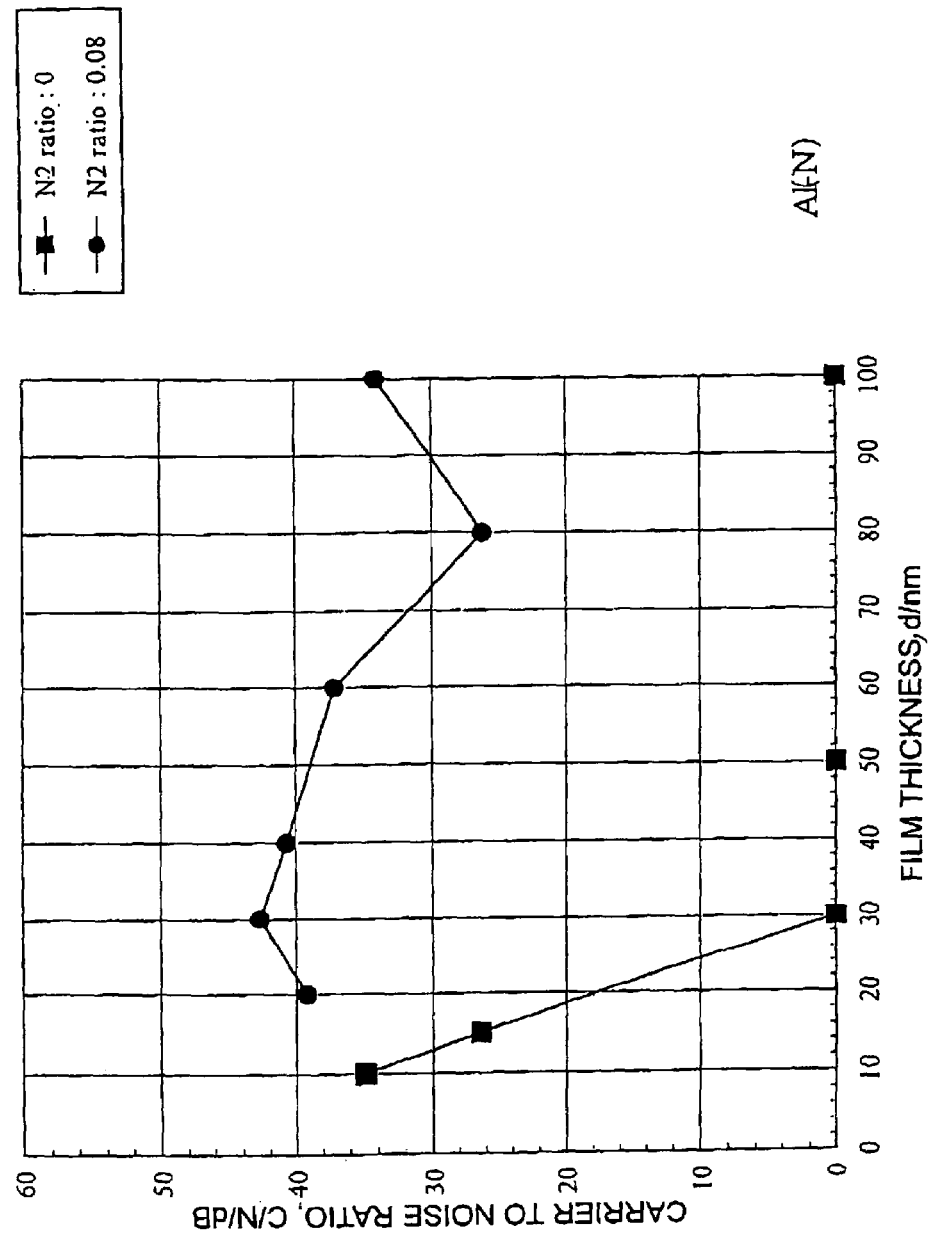
FIG. 23 is a graph of C/N versus the thickness of layer 10.

FIG. 23 shows the C/N relative to the thickness of the layer 10 which is formed by using an aluminum target and setting the $N_2$ flow ratio at 0 or 0.08. The C/N in this diagram is the maximum C/N obtained when the readout power is changed in the range of 1 to 7 mW. It is seen from FIG. 23 that the nitriding of the layer 10 improves the maximum C/N and significantly expands the thickness range of the layer 10 within which super-resolution readout is possible.

Next, samples were formed using a silicon target with or without introducing $N_2$. These samples were examined for a C/N drop by repeating reading operation. In these samples, the layer 10 was 15 nm thick. The readout power was 3 mW for the sample formed without introducing $N_2$ and 6 or 7 mW for the sample having $N_2$ introduced therein. The results are plotted in the diagram of FIG. 24.

Figure 24:
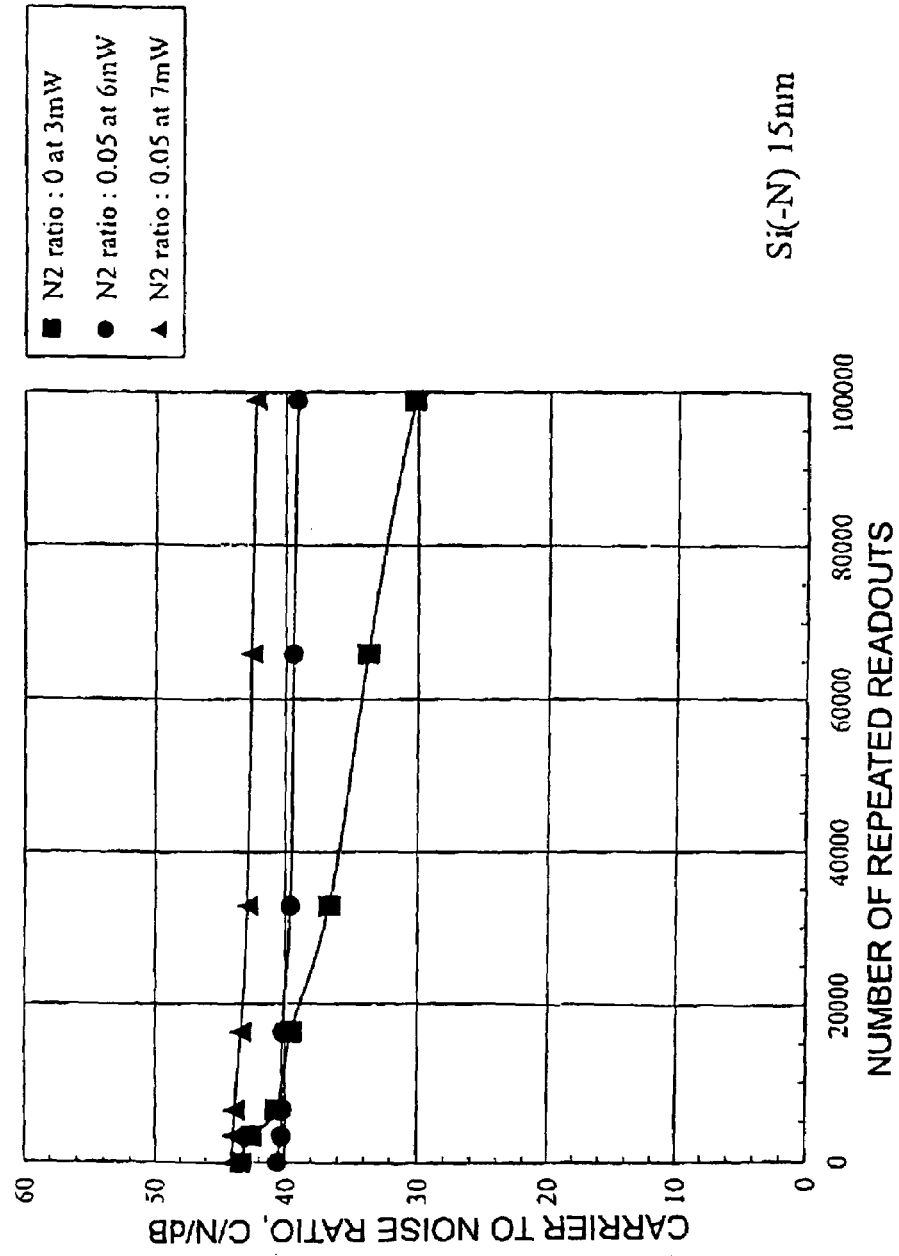
FIG. 24 is a graph of C/N versus the number of repeated readouts.

It is seen from FIG. 24 that the sample formed without introducing $N_2$ experienced a C/N drop of more than 10 dB after 100,000 repeated readouts. In contrast, the sample having $N_2$ introduced therein experienced little C/N drop even after 100,000 repeated readouts. Additionally, this sample showed a higher initial C/N than the sample formed without introducing $N_2$, when the readout power was 7 mW. It is seen from these results that the construction of the layer 10 from a compound significantly improves the stability of the layer 10 against repetitive reading.

Based on the results of the above experiment, the functions and advantages of the layer 10 constructed of a compound are described below.

In the above experiment, nitrogen, oxygen, fluorine, sulfur or carbon was introduced into a metal or metalloid thin film. As the amount of element introduced increased, the thin film increased its transparency or lost its metallic luster. The thin film reached a high degree of transparency when the amount of element introduced reached nearly the stoichiometry. In any of FIGS. 17 to 19, super-resolution readout was possible when the layer 10 had a relatively low degree of transparency, and super-resolution readout became impossible when the layer 10 had a relatively high degree of transparency. When the layer 10 was formed of a compound and thus had a high degree of transparency, the C/N at low Pr lowered. This indicates that the heat mode participates in the super-resolution readout of the medium of the invention. More particularly, the C/N at low Pr lowers as a result of an increase in the degree of transparency of the layer 10 probably because the peak temperature becomes lower due to a drop of the light absorption of the layer 10. It is suggested that in the medium according to the invention wherein the reflectance is not substantially affected by the readout power, the super-resolution readout does not rely on the formation of optical apertures unlike the prior art super-resolution readout media of the heat mode.

It is also seen from the results of FIGS. 17 to 19 that when the layer 10 is deposited by adding an appropriate amount of nitrogen or oxygen to the base element to form a compound, the permissible readout power range is spread and the maximum C/N is increased. It is suggested that the expansion of the readout power range and the increase of the maximum C/N result from an improvement in chemical stability and an increase in transparency of the layer 10 due to compound formation. It is also seen from the results of FIG. 23 that the thickness range of the layer 10 within which super-resolution readout is possible is significantly expanded by forming the layer 10 from a compound. It is suggested that an increase in transparency of the layer 10 due to compound formation is concerned in the expansion of the permissible thickness range. It is further seen from the results of FIG. 24 that the deterioration of C/N by repetitive reading is significantly restrained by forming the layer 10 from a compound. It is suggested that an improvement in chemical stability of the layer 10 accounts for the restrained deterioration of C/N.

First, the improvement in chemical stability of the layer 10 due to compound formation is described together with the concomitant advantages. In general, metals excluding noble metals (e.g., Au) or metalloids naturally produce in the form of compounds such as oxides and sulfides. This fact indicates that in the ordinary environment, metals or metalloids are more stable when present in compound form than in pure elemental form. That is, metals or metalloids are significantly improved in chemical stability by converting them into compounds. On the other hand, the degradation of the layer 10 by high power reading and repetitive reading is due to a chemical change (typically oxidation) caused by a temperature rise of the layer 10. Since the layer 10 is in contact with air, it is susceptible to degradation by heating during application of readout power. However, if the layer 10 is formed of a compound, it is restrained from a chemical change. Then, reading becomes possible with a higher power, the maximum C/N is improved, and the deterioration of C/N by repetitive reading is restrained. Therefore, the formation of the layer 10 from a compound is quite effective when a material which undergoes degradation at a relatively low readout power is used.

Next, the increase in transparency of the layer 10 due to compound formation is described together with the concomitant advantages. When the layer 10 is formed of a compound, its transparency increases as described above, and its optical reflectance lowers accordingly. When the layer 10 is reduced in optical reflectance, it becomes unlikely that the reflected light detecting system is saturated. This results in an increase of the permissible readout power and hence an improvement in maximum C/N. Since the layer 10 formed of a compound is improved in transparency per unit thickness, the layer 10 of a compound avoids saturation of the reflected light detecting system even when the layer 10 is made thicker. For this reason, the thickness range of the layer 10 within which super-resolution readout is possible is significantly expanded as shown in FIG. 23. Therefore, the formation of the layer 10 from a compound is quite effective when a material which causes the reflected light detecting system to be saturated at a relatively low readout power is used.

On the other hand, super-resolution readout becomes impossible with an increased amount of nitrogen or oxygen introduced, because the layer 10 becomes too transparent, that is, has a coefficient of absorption approaching to zero, so that reading light fails to derive the function of the layer 10. Therefore, when the layer 10 is formed of a compound, the degree of conversion of a metal or metalloid into a compound must be appropriately controlled in accordance with the type of metal or metalloid so as to produce a sufficiently high C/N. More illustratively, the amount of nitrogen or oxygen introduced is preferably restricted below the stoichiometry. In the above experiment, super-resolution readout was possible even when SiC conforming to the stoichiometry was used in the layer 10. A higher C/N is obtained when the carbon content is reduced.

In the above experiment, the layer 10 was formed of a compound by utilizing a reactive sputtering technique using a reactive gas such as nitrogen or oxygen or a sputtering technique using a compound target. Other techniques such as CVD may also be utilized.

Figure 2:
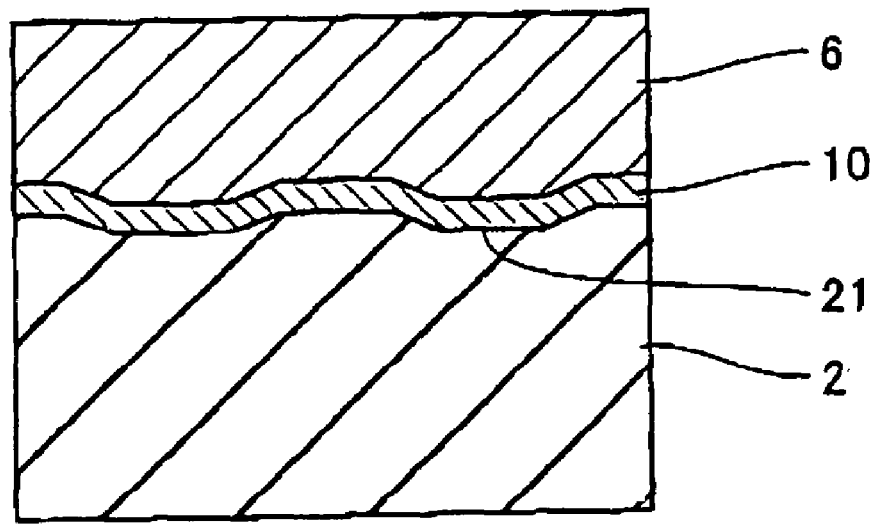
FIG. 2 is a fragmentary cross-sectional view of an optical information medium according to another embodiment of the invention.

Application to Medium Structure Shown in FIG. 2

Figure 25:
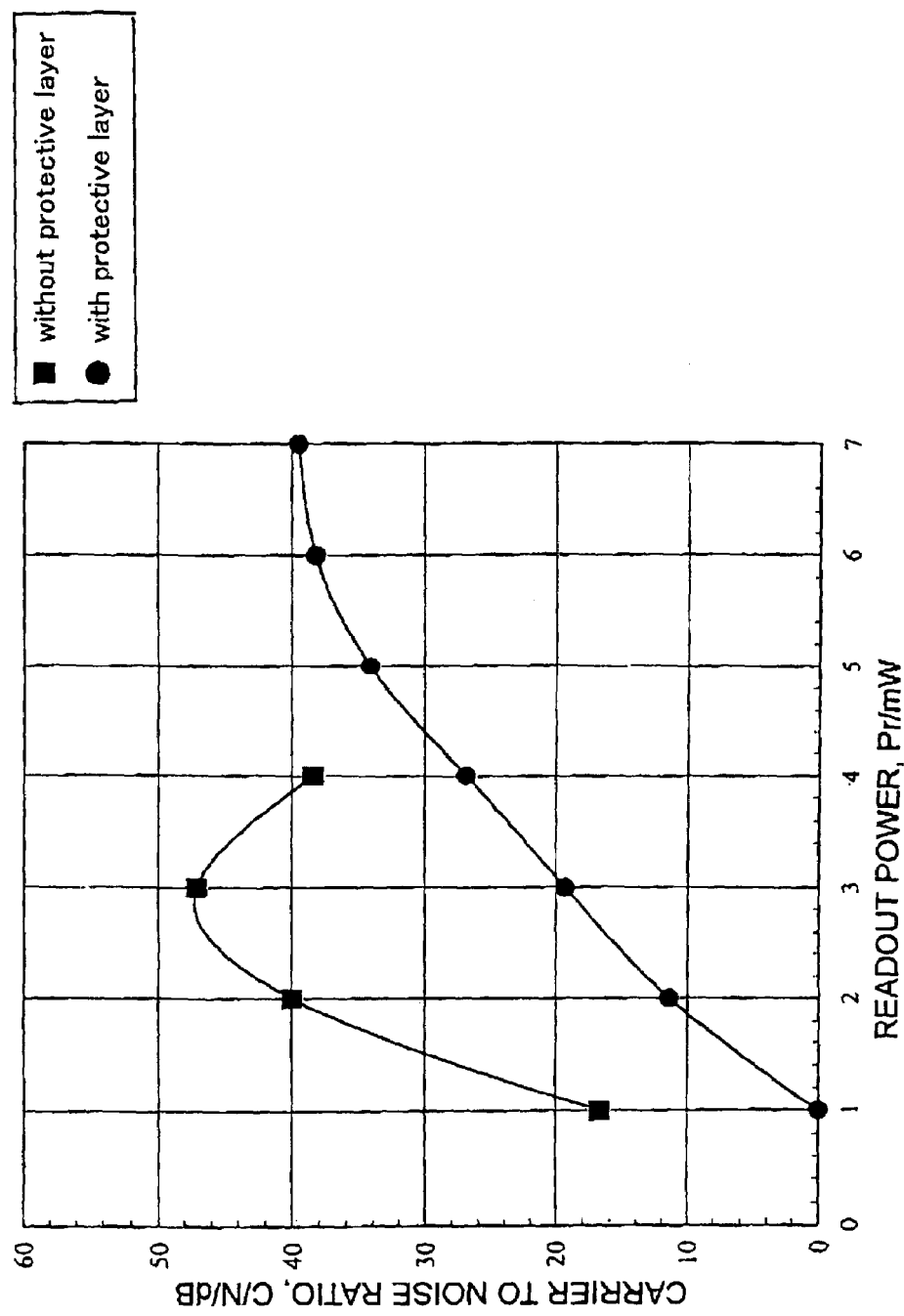
FIG. 25 is a graph of C/N versus readout power in the presence and absence of a protective layer.

Next, a medium sample of the structure shown in FIG. 2 was fabricated. This sample is obtained by providing on the layer 10 of the medium shown in FIG. 1 a protective layer or topcoat 6 made of a resin which is commonly provided in conventional optical information media. The protective layer 6 was formed by applying a UV-curable resin by the spin coating technique, and irradiating UV radiation thereto for curing. The protective layer had a thickness of 10 μm at the end of curing. The layer 10 of this sample was a silicon layer of 15 nm thick which was formed by sputtering. A reference sample was also fabricated as above except that the protective layer was omitted. Using the same optical disc tester as above, each sample was measured for C/N along a pit row with a pit length of 250 nm while rotating the disc at a linear velocity of 11 m/s and changing the readout power. FIG. 25 shows the C/N of the samples versus readout power.

In FIG. 25, the sample without the protective layer has a higher C/N over the majority of the readout power range. This is because the protective layer acted as a heat-sink layer so that the layer 10 might reach a lower temperature upon irradiation of reading light. This, in turn, suggests that the heat mode is concerned in the super-resolution readout of the medium according to the invention.

In FIG. 25, as the readout power increases, the C/N of the sample without the protective layer saturates, then declines a little. Thereafter, at a readout power of 5 mW, no data are available on account of degradation of the layer 10. By contrast, the sample with the protective layer produces a C/N which follows a monotonic and moderate rise until the readout power reaches 7 mW. It is concluded from these results that the protective layer serving as a heat-sink layer has the function of expanding the readout power range.

Next, samples were fabricated as the samples in FIG. 25 except that the element and thickness of the layer 10 were changed as shown in Table 5. It was examined how the C/N was affected by the presence or absence of the protective layer. The maximum C/N at each thickness of the layer 10 and the readout power giving that maximum C/N are shown in Table 5.

TABLE 5

C/N (dB) in the presence or absence of resin protective layer (the value in parentheses is a readout power in mW)

| Layer 10 material | Resin protective layer | Thickness (nm) of layer 10 | | | | | |
|---|---|---|---|---|---|---|---|
| | | 5 | 10 | 15 | 30 | 50 | 100 |
| Nb | absent | — | 10.5 (1) | 34.3 (2) | — | — | — |
| Nb | present | — | 35.2 (7) | 37.5 (7) | — | — | — |
| Mo | absent | 24.7 (2) | — | — | — | — | — |
| Mo | present | 31.3 (7) | — | — | — | — | — |
| W | absent | 32.2 (2) | — | — | — | — | — |
| W | present | 35.7 (6) | — | — | — | — | — |
| Ge | absent | — | 41.3 (2) | 45.0 (2) | 44.4 (2) | — | — |
| Ge | present | — | 43.6 (5) | 42.8 (4) | 41.8 (4) | — | — |
| V | absent | — | — | 31.1 (2) | — | — | — |
| V | present | — | — | 38.4 (7) | — | — | — |
| Cr | absent | 11.7 (1) | 35.2 (2) | — | — | — | — |
| Cr | present | 35.8 (7) | 38.6 (7) | — | — | — | — |
| Pd | absent | 8.6 (2) | — | — | — | — | — |
| Pd | present | 35.9 (7) | — | — | — | — | — |
| Sb | absent | — | 29.4 (1) | 35.6 (2) | — | — | — |
| Sb | present | — | 34.4 (4) | 36.7 (4) | — | — | — |
| Ta | absent | — | 23.3 (1) | 25.0 (1) | 31.5 (2) | — | — |
| Ta | present | — | 35.8 (6) | 37.5 (5) | 35.0 (7) | — | — |
| In | absent | — | — | 21.3 (2) | 27.9 (1) | 25.9 (2) | — |
| In | present | — | — | 38.5 (7) | 30.4 (6) | 11.7 (3) | — |
| Te | absent | — | — | 25.9 (1) | 27.0 (1) | 24.0 (1) | 18.0 (1) |
| Te | present | — | — | 35.2 (3) | 30.6 (2) | 29.1 (2) | 28.1 (3) |
| Bi | absent | — | — | 0.0 (1) | 13.0 (1) | 23.7 (1) | 11.4 (1) |
| Bi | present | — | — | 28.1 (6) | 23.2 (3) | 26.6 (3) | 22.9 (3) |

Referring to Table 5, the layer 10 formed of tantalum (Ta) is now considered. In the absence of the protective layer, the layer 10 having a thickness of 10 nm became degraded at a readout power of 2 mW and produced a maximum C/N of 23.2 dB at a readout power of 1 mW. In the presence of the protective layer, the sample produced signals until the readout power reached 6 mW, and a significantly higher C/N of 35.8 dB at that readout power. For the remaining samples, it was confirmed that the provision of the protective layer permits the use of a higher readout power. Especially in connection with those samples without the protective layer which failed to produce a high C/N at a relatively low readout power on account of degradation of the layer 10, the provision of the protective layer permits the application of a higher readout power, resulting in a significantly improved C/N. It is also seen from Table 5 that the provision of the protective layer significantly expands the thickness range of the layer 10 within which super-resolution readout is possible.

Advantages associated with the provision of the protective layer are evident from the results of the above experiment. Since the protective layer has a higher thermal conductivity than air, the provision of the protective layer accelerates the cooling of the layer 10. Also the protective layer 6 shields the layer 10 from air. As a result, the provision of the protective layer prevents the layer 10 from accumulating heat and hence, from a chemical change. Then the layer 10 does not degrade even when a higher readout power is used. As is evident from the results of the above experiment, the optical information medium of the invention generally produces a read output which increases as the readout power increases, and this output increase lasts until or immediately before the layer 10 is degraded by heating during reading. It is thus suggested that by adding the protective layer to the sample having the layer 10 which degrades at a relatively low readout power in the absence of the protective layer 6, reading at a high power becomes possible and as a result, a high C/N is obtained.

Next, samples with or without the protective layer were subjected to repetitive reading to examine the deterioration of C/N. These samples had the layer 10 in the form of a germanium layer of 10 nm thick. The readout power was 2 mW for the sample without the protective layer and 3 or 4 mW for the sample with the protective layer. The results are shown in FIG. 26.

Figure 26:
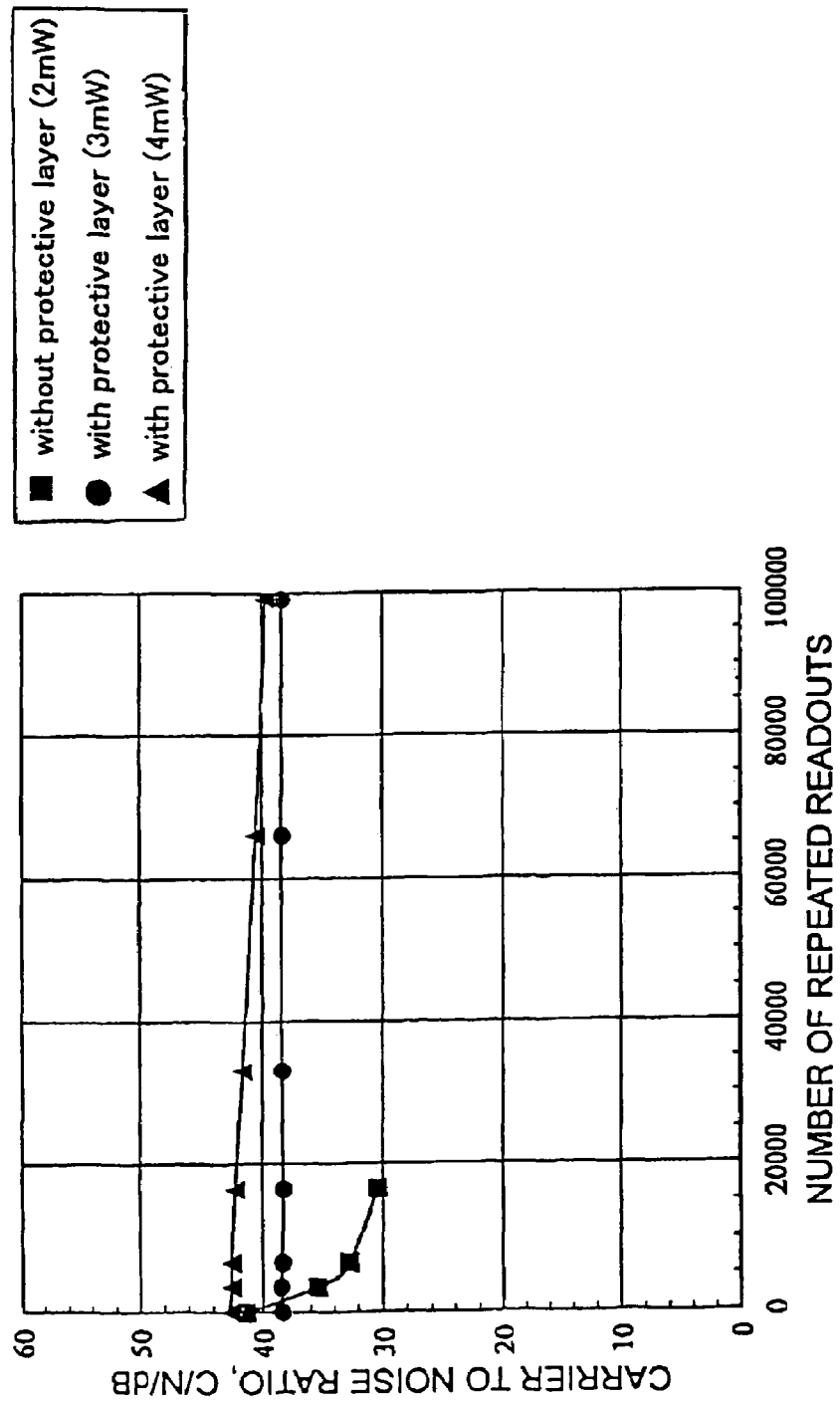
FIG. 26 is a graph of C/N versus the number of repeated readouts in the presence and absence of a protective layer.

In FIG. 26, the sample without the protective layer showed an initial C/N of 41.3 dB, which declined by about 10 dB after 16,000 repeated readouts. By contrast, the sample with the protective layer showed a somewhat low initial C/N of 38.3 dB at a readout power of 3 mW, which did not decline at all until 100,000 readouts. At a readout power of 4 mW, the same sample showed a higher initial C/N of 42.7 dB, which slightly declined to 39.7 dB after 100,000 readouts, indicating the minimized deterioration of C/N. It is seen from these results that the provision of the protective layer significantly improves the stability against repetitive reading. It is suggested that the increased cooling rate of the layer 10 and the shielding of the layer 10 from air contribute to this improvement in stability.

It will be appreciated that although the protective layer made of resin was used in the above-experiment, equivalent results are obtainable from protective layers made of various inorganic compounds such as oxides, nitrides, sulfides, and carbides as long as they have a higher thermal conductivity than air.

Thickness of Layer 10

As seen from the results of the above-described experiments, the layer which is constructed of an elemental metal or metalloid should preferably have the following thickness, which is given for the respective elements.

Nb: up to 100 nm
Mo: up to 70 nm, especially up to 45 nm
W: up to 70 nm, especially up to 40 nm
Mn: up to 100 nm, especially up to 70 nm
Pt: up to 40 nm, especially up to 30 nm
C: up to 100 nm
Si: up to 100 nm
Ge: up to 100 nm
Ti: up to 100 nm
Zr: up to 100 nm, especially 25 to 100 nm
V: up to 100 nm
Cr: up to 30 nm, especially less than 15 nm
Fe: up to 80 nm, especially up to 50 nm
Co: up to 70 nm, especially up to 45 nm
Ni: up to 70 nm, especially up to 50 nm
Pd: up to 40 nm, especially up to 30 nm
Sb: up to 100 nm, especially up to 60 nm
Ta: up to 100 nm, especially up to 60 nm
Al: up to 20 nm, especially less than 15 nm
In: up to 100 nm, especially less than 10 nm
Cu: up to 10 nm
Sn: up to 40 nm
Te: up to 70 nm
Zn: 40 to 90 nm
Bi: 25 to 70 nm It is noted that for those elements which produce a satisfactorily high C/N even at a thickness of 100 nm, the thickness upper limit of 100 nm need not be set from the performance standpoint, but limiting the thickness to 100 nm or less is preferred for preventing a productivity drop. Also preferably, the layer 10 should have a thickness of at least 2 nm regardless of the element of which the layer is made. If the layer 10 is too thin, the reflectance may become too low for the tracking servo system to perform well, failing to produce a satisfactory C/N.

When the layer 10 is formed of compounds, the appropriate thickness range of the layer 10 is expanded as is evident from the results of the foregoing experiments.

Now the functional layer constructed by an alloy is described. By the term "functional element" used below is meant an element which alone can construct the functional layer.

When the functional layer is constructed by a binary alloy in the simple solid solution form as typified by the above-described W—Mo alloy wherein both the elements are functional elements, the alloy layer serves as the functional layer as seen from FIG. 16.

For an alloy layer in the simple solid solution form, it is desired that at least one, preferably all of the constituent elements be functional elements. The molar proportion of functional elements is preferably at least 50% of the entire constituent elements.

Like the alloy layer in the simple solid solution form, it is desired for an amorphous alloy layer such as the above-described magneto-optical recording material layer that at least one, preferably all of the constituent elements be functional elements. The molar proportion of functional elements is preferably at least 50% of the entire constituent elements.

Ag—In—Sb—Te base phase change materials to be described later are phase separation type alloys in which the Sb phase separates from other phases upon crystallization. For such a phase separation type alloy, it is desired that at least one, preferably all of the constituent phases can construct a functional layer alone. For example, the Sb phase in a crystallized Ag—In—Sb—Te alloy serves as a functional layer alone.

Like the single element layer, the alloy layer must satisfy the thickness requirement in order to serve as the functional layer. For example, the alloy layer in the simple solid solution form may be set to a sufficient thickness for a single element layer of each functional element to serve as the functional layer, as shown in FIG. 16.

The specific composition and thickness of an alloy layer are preferably determined only after it is actually inspected whether an alloy layer having a particular composition and thickness serves as the functional layer. For example, intermetallic compounds such as the above-described phase change material of $Ge_2Sb_2Te_5$ often exhibit a behavior unexpected from the respective constituent elements alone.

Figure 3A:
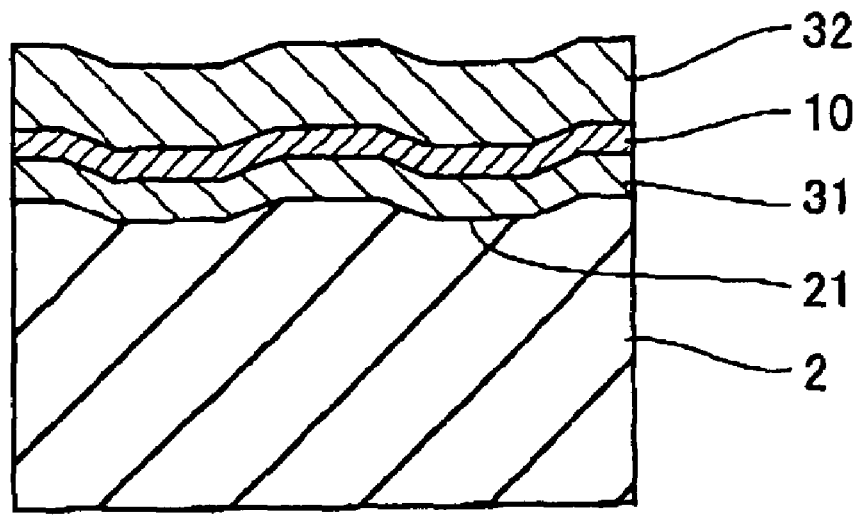
FIGS. 3A and 3B are fragmentary cross-sectional views of optical information media according to further embodiments of the invention.
Figure 3B:
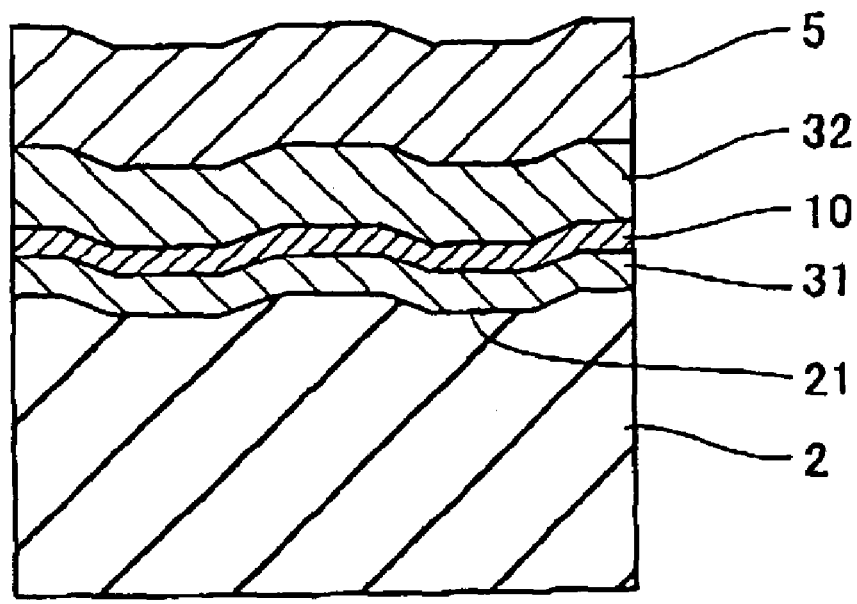

Application to Medium Structure Shown in FIGS. 3A and 3B

Described below is an experiment made when the present invention was applied to media of the structures shown in FIGS. 3A and 3B. The optical information medium 1 shown in FIG. 3A is a read only optical information medium comprising a light transmissive substrate 2, pits 21 in a surface thereof, and a layer 10 on the pitted surface. A first dielectric layer 31 is disposed between the substrate 2 and the layer 10, and a second dielectric layer 32 is disposed on the layer 10. That is, the medium shown in FIG. 3A corresponds to the medium shown in FIG. 1 whose layer 10 is sandwiched between dielectric layers. The medium shown in FIG. 3B is constructed by disposing a metal layer 5 on the second dielectric layer 32 of the medium shown in FIG. 3A.

Optical disc samples of the construction shown in FIG. 3A were fabricated by the following procedure. The substrate 2 was the same as used in the previous experiments. The layer 10 was an antimony (Sb) layer of 15 nm thick, which was formed by sputtering. The first dielectric layer 31 was a silicon nitride layer of 150 nm thick. The second dielectric layer 32 was a silicon nitride layer of 20 nm thick. These silicon nitride layers were formed by sputtering a $Si_3N_4$ target in an argon atmosphere.

Additionally, samples of the construction shown in FIG. 3B were fabricated by forming a metal layer 5 on the second dielectric layer 32 in the sample of the construction shown in FIG. 3A. The metal layer 5 was an aluminum layer of 100 nm thick, which was formed by sputtering an aluminum target.

Using the same optical disc tester as above, the samples were measured for C/N along a pit row with a pit length of 250 nm while changing the readout power and the linear velocity.

FIG. 27A shows the C/N versus readout power of the sample without the metal layer 5. FIG. 27B shows the C/N versus readout power of the sample with the metal layer 5. The data shown in these diagrams are measurements at a linear velocity of 11 m/s. It is seen from FIGS. 27A and 27B that super-resolution readout is also possible when the medium is constructed as shown in FIGS. 3A and 3B.

In FIGS. 27A and 27B, like the majority of the samples shown in FIGS. 6 to 9, the C/N followed a monotonic increase with an increase in readout power. Although the read output is not depicted in these diagrams, the read output also followed a monotonic increase with an increase in readout power.

Figure 28:
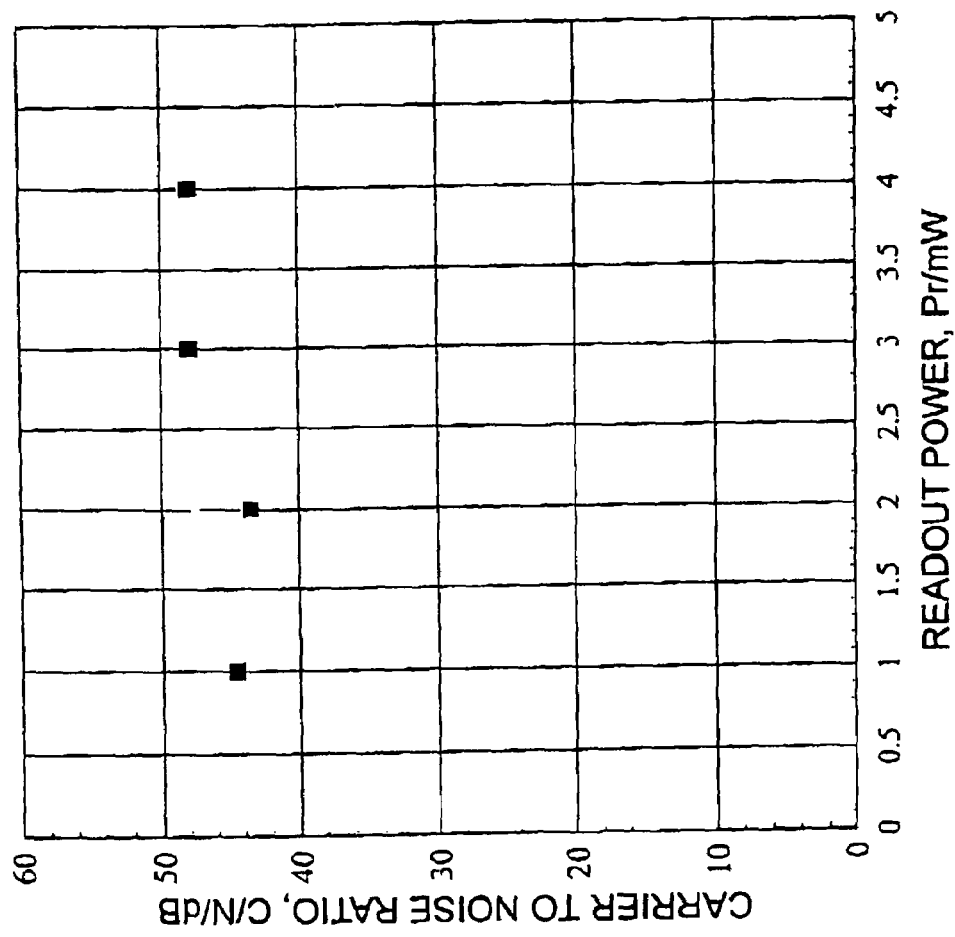
FIG. 28 is a graph of C/N versus readout power.

FIG. 28 shows the C/N along a pit row with a pit length of 300 nm versus readout power of the sample without the metal layer 5. It is seen from FIG. 28 that the C/N does not depend on the readout power like conventional media when the pit length is greater than the readout limit given by diffraction.

Comparing FIG. 27A with FIG. 27B, we will study how the presence or absence of the metal layer 5 affects the readout power Pr and C/N.

When the readout power is 1 to 2 mW, the sample without the metal layer 5 produces a higher C/N. This is because like the protective layer described above, the metal layer 5 serves as a heat-sink layer so that the layer 10 reaches a lower temperature upon exposure to reading light. This indicates that the heat mode is concerned in the super-resolution readout according to the invention.

As the readout power is further increased, the C/N of the sample without the metal layer 5 saturates. Thereafter, at a readout power of 5 mW, no data are available on account of degradation of the layer 10. By contrast, the sample with the metal layer 5 produces a C/N which follows a monotonic rise until the readout power reaches 5 mW, finally marking a higher C/N than the sample without the metal layer 5. It is concluded from these results that where the material of the layer 10 is selected such that the C/N may follow a monotonic increase with an increasing readout power, the provision of the metal layer 5 serving as a heat-sink layer and an air-shielding layer allows the upper limit of readout power to be pulled up, thus achieving a higher C/N.

Figure 29B:
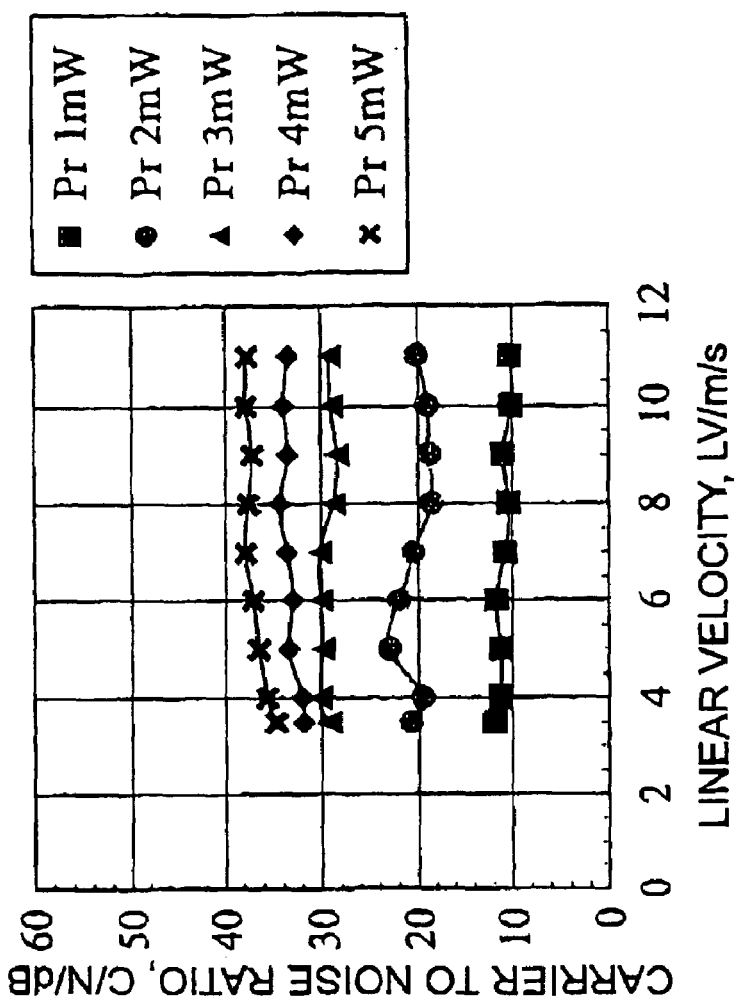
FIG. 29 is a graph of C/N versus a linear velocity, FIGS. 29A and 29B corresponding to the absence and presence of a metal layer, respectively.
Figure 29A:
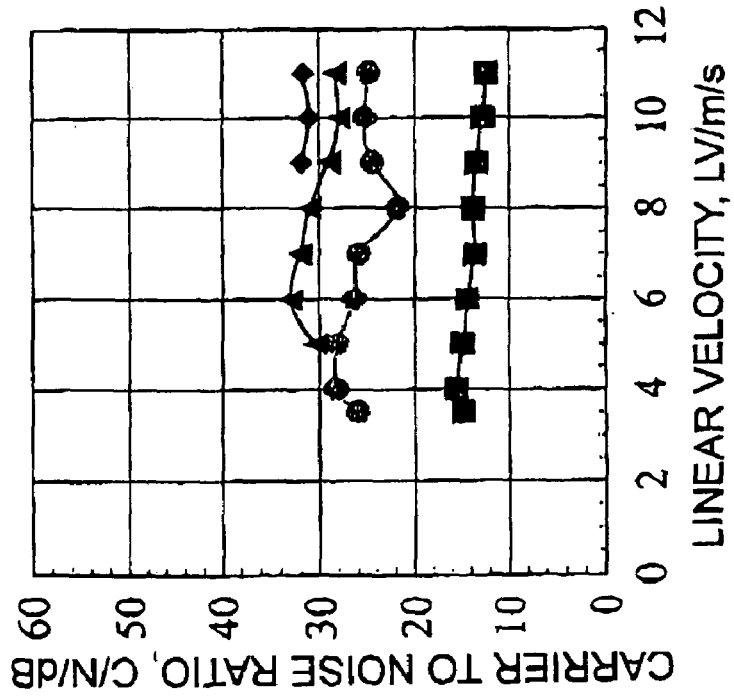

FIG. 29A shows the C/N versus linear velocity of the sample without the metal layer 5, and FIG. 29B shows the C/N versus linear velocity of the sample with the metal layer 5, the C/N values being measured at different readout powers Pr as shown in the diagrams. It is seen from these diagrams that when the medium is constructed as shown in FIG. 3A or 3B, no substantial dependency of C/N on linear velocity is yet observed within the linear velocity range that enables super-resolution readout. In the sample without the metal layer 5, reading was impossible at a readout power of 4 mW combined with a linear velocity of up to 8 m/s and at a readout power of 5 mW, on account of degradation of the layer 10. By contrast, the sample with the metal layer 5, as shown in FIG. 29B, produced a high C/N at any linear velocity in the range of 3 to 11 m/s even when a readout power of 5 mW was used. Namely, the metal layer 5 serving as a heat-sink layer and an air-shielding layer is effective for expanding the linear velocity margin.

A sample was prepared in accordance with the structure shown in FIG. 3B, wherein the layer 10 was constructed by an $Ag_{5.6}In_{3.8}Sb_{63.2}Te_{25.2}Ge_{2.2}$ (atomic ratio) alloy layer of 20 nm thick, the first dielectric layer 31 was constructed by a $ZnS$—$SiO_2$ (80/20 mol %) layer of 85 nm thick, the second dielectric layer 32 was constructed by a $ZnS$-$SiO_2$ (80/20 mol %) layer of 20 nm thick, and the metal layer 5 was constructed by an Al—Cr (1.7 mol %) layer of 100 nm thick. These layers were formed by the sputtering method. In the sample, the layer 10 as deposited was amorphous. Although the layer of the composition of this composition can be utilized as a phase change type recording layer, the layer 10 is not utilized herein as the recording layer.

Figure 37:
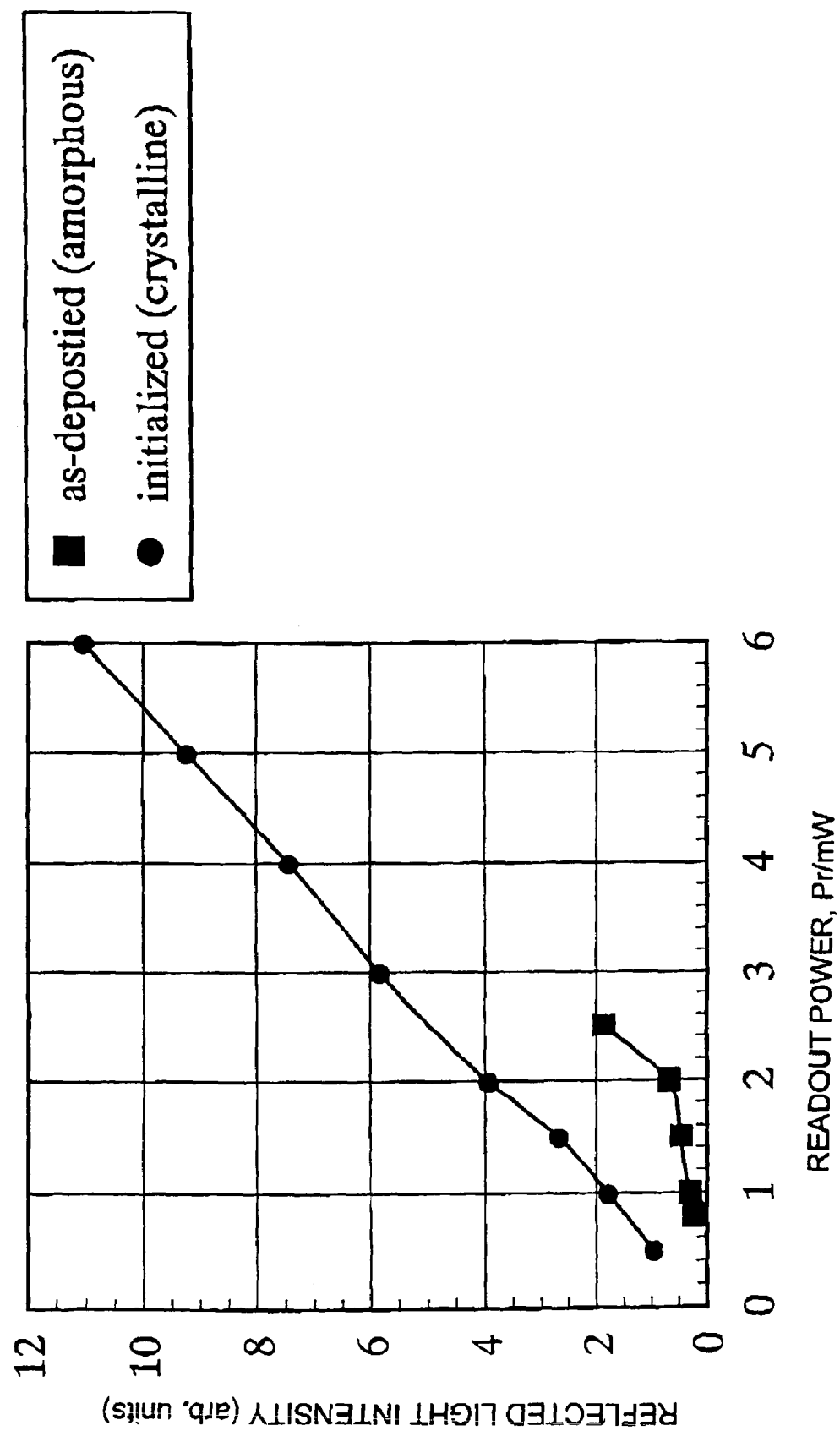
FIG. 37 is a graph of reflected light intensity versus readout power.
Figure 38:
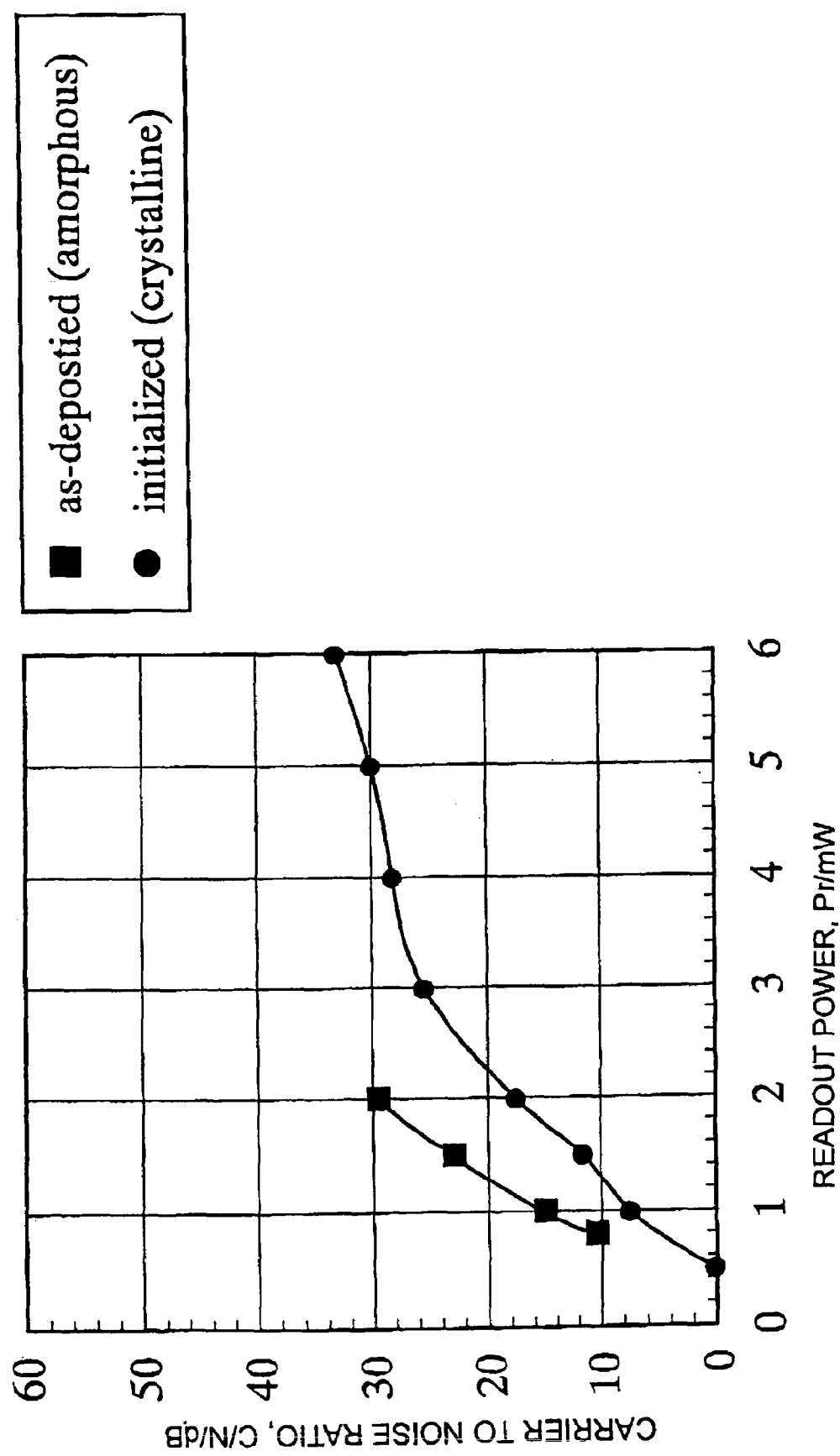
FIG. 38 is a graph of C/N versus readout power.

For the sample as deposited, FIG. 37 shows the intensity of reflected light relative to readout power Pr. It is seen from the graph that the reflected light intensity increases in linear proportion to an increase of Pr until Pr reaches 2 mW, and when Pr increases from 2 mW to 2.5 mW, crystallization occurs to induce an abrupt change of the reflected light intensity. For this sample, a pit row with a pit length of 250 nm was measured for C/N at a linear velocity of 11 m/s using the same optical disc tester as above. FIG. 38 shows C/N in the range of Pr≦2 mW where the reflected light intensity increases in linear proportion to Pr. It is seen from FIG. 38 that for this sample, super-resolution readout is possible in the range of Pr≦2 mW. The dielectric layers in this sample are highly transparent, and dielectric layers having a high transparency do not contribute to super-resolution readout as previously described. Also the Al—Cr (1.7 mol %) layer of 100 nm thick does not contribute to super-resolution readout. Accordingly, the results shown in FIG. 38 indicate that the phase change material layer in the amorphous state serves as the functional layer in the present invention.

Next, the layer 10 of this sample was initialized or crystallized by means of a bulk eraser and thereafter, similarly measured for reflected light intensity and C/N. The results are shown in FIGS. 37 and 38. It is seen that also in a read only medium having a crystallized phase change material layer as the layer 10, the reflected light intensity changes in linear proportion to the readout power Pr and within this range, super-resolution readout is possible.

It is noted that when a read only medium is provided with a phase change material layer as the functional layer, it is not limited to the medium structure shown in FIG. 3B and may take any of the structures shown in FIGS. 1, 2 and 3A or another structure. The medium structure used may be appropriately determined in accordance with various conditions including a reading wavelength.

Figure 4A:
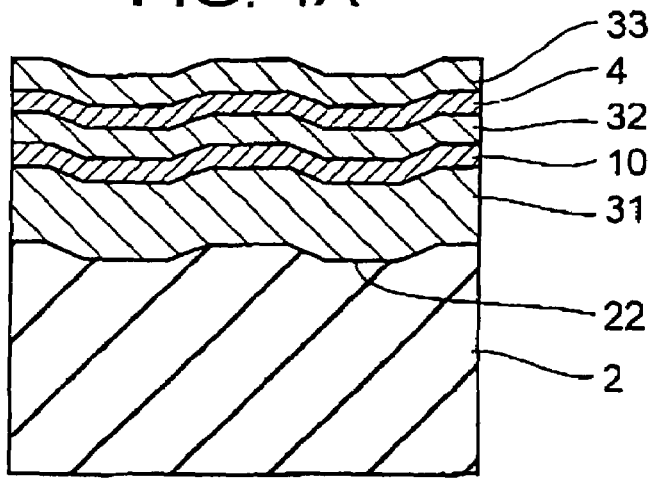
FIGS. 4A, 4B and 4C are fragmentary cross-sectional views of optical information media according to still further embodiments of the invention.
Figure 4B:
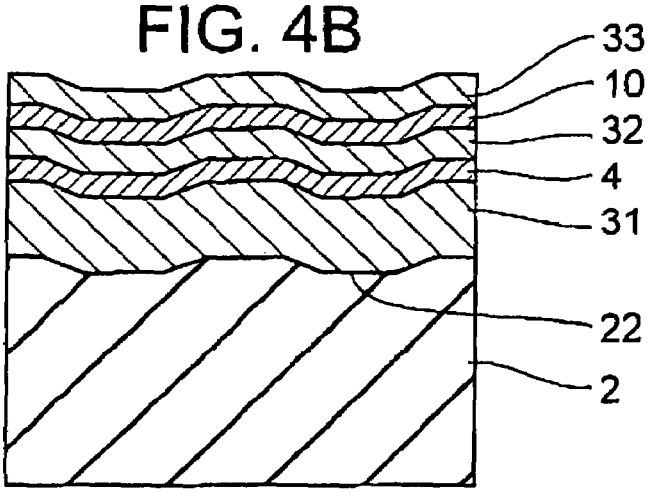

Application to Medium Structure Shown in FIGS. 4A and 4B

Described below is an experiment made when the present invention was applied to media of the structures shown in FIGS. 4A and 4B.

The optical information medium shown in FIG. 4A is an optical recording medium having grooves 22 in a surface of a light transmissive substrate 2. On the grooved surface, a first dielectric layer 31, a layer 10, a second dielectric layer 32, a recording layer 4, and a third dielectric layer 33 are stacked in the described order. Incident light to the substrate 2 is transmitted by the substrate 2, then by the layer 10 and reaches the recording layer 4 where it is reflected by the recording layer 4, then transmitted again by the layer 10 and the substrate 2 and emitted from the substrate 2.

Optical disc samples of the construction shown in FIG. 4A were fabricated by the following procedure. The respective dielectric layers were formed by sputtering a $Si_3N_4$ target in an argon atmosphere. The first dielectric layer 31 had a thickness of 170 nm, the second dielectric layer 32 had a thickness of 20 nm, and the third dielectric layer 33 had a thickness of 20 nm. The layer 10 was constructed of germanium (Ge) or tungsten (W) to a thickness of 15 nm or 100 nm. The recording layer 4 was of the phase change type and formed by sputtering an Ag—In—Sb—Te—Ge alloy as the target in an argon atmosphere. The recording layer had a composition (atomic ratio):

$$(Ag_aIn_bSb_cTe_d)_{1-e}Ge_e \qquad \text{formula (I)}$$

wherein a=0.07, b=0.05, c=0.59, d=0.29, and e= 0.05. The recording layer 4 was 20 nm thick.

The optical information medium shown in FIG. 4B is an optical recording medium having grooves 22 in a surface of a light transmissive substrate 2. On the grooved surface, a first dielectric layer 31, a recording layer 4, a second dielectric layer 32, a layer 10, and a third dielectric layer 33 are stacked in the described order. Incident light to the substrate 2 is transmitted by the substrate 2, then by the recording layer 4 and reaches the layer 10 where it is reflected by the layer 10, then transmitted again by the recording layer 4 and the substrate 2 and emitted from the substrate 2. Optical disc samples of the construction shown in FIG. 4B were fabricated by the same procedure as the samples of the construction shown in FIG. 4A except that the positional relation between the layer 10 and the recording layer 4 was reversed.

These disc samples each were set on the same optical disc tester as described above and single signals were recorded at a linear velocity of 2 m/s. The frequency of the single signals was determined so that a recorded mark might have a length of 200 nm. It is noted that in this experiment, the phase change recording layer was used in the amorphous state without initialization or crystallization.

Using the optical disc tester, the samples were then measured for C/N at a linear velocity of 11 m/s. The results are shown in Table 6.

TABLE 6

| Structure | Material of layer 10 | Thickness of layer 10 (nm) | C/N (dB) | Readout power Pr (mW) | Writing power Pw (mW) |
|---|---|---|---|---|---|
| FIG. 4A | Ge | 15 | 22.1 | 5 | 8 |
| FIG. 4A | Ge | 100 | 27.9 | 7 | 11 |
| FIG. 4A | W | 15 | 19.7 | 7 | 4 |
| FIG. 4A | W | 100 | — | — | — |
| FIG. 4B | Ge | 15 | 18.7 | 6 | 7 |
| FIG. 4B | Ge | 100 | 29.2 | 7 | 8 |
| FIG. 4B | W | 15 | 21.4 | 7 | 12 |
| FIG. 4B | W | 100 | 9.4 | 7 | 4 |

It is seen from Table 6 that the optical recording medium is capable of super-resolution readout according to the invention. As compared with the above-described read-only disc samples, these samples generally show a low C/N, because the medium structure, specifically the thickness of the respective dielectric layers is not optimized. Even those samples which show a C/N of less than 20 dB in Table 6 can produce a C/N of more than 20 dB if the medium structure is optimized. It is suggested that the sample using a tungsten layer of 100 nm thick as the layer 10 failed to produce a C/N because the reading light is little transmitted by the layer 10.

The recording layer with signals recorded was observed under a transmission electron microscope. In the sample of the construction shown in FIG. 4A and having a germanium layer as the layer 10, voids (200-nm length) are formed in the recording layer to define recorded marks. In the remaining samples, crystalline recorded marks were formed in the amorphous recording layer.

FIGS. 4A and 4B show the construction in which reading light is irradiated to the recording layer through the functional layer or to the functional layer through the recording layer. However, if the functional layer is formed of a material capable of forming recorded marks upon receipt of a writing power, a construction in which the functional layer also serves as the recording layer is possible.

Figure 4C:
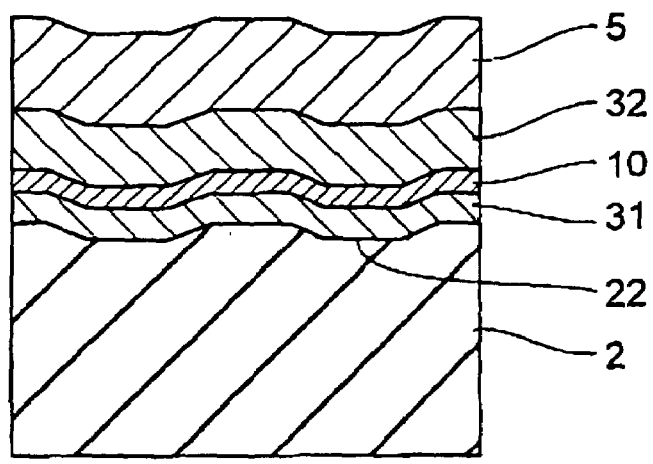

Application to Medium Structure Shown in FIG. 4C

Described below is an experiment made when the present invention was applied to a medium of the structure shown in FIG. 4C.

The optical information medium shown in FIG. 4C is an optical recording medium having grooves 22 in a surface of a light transmissive substrate 2. On the grooved surface, a first dielectric layer 31, a layer 10, a second dielectric layer 32, and a metal layer 5 are stacked in the described order. Writing/reading light enters the medium from the substrate 2 side. The structure of FIG. 4C is arrived at by changing the pits 21 in the read only medium shown in FIG. 3B to the grooves 22.

An optical recording disc sample having the structure of FIG. 4C and a phase change material layer of $Ag_{5.6}In_{3.8}Sb_{63.2}Te_{25.2}Ge_{2.2}$ alloy as the layer 10 was prepared as was the read only disc sample having the structure of FIG. 3B. The composition and thickness of the layer 10, first dielectric layer 31, and second dielectric layer 32 are the same as in the above-described read only disc sample.

Figure 39:
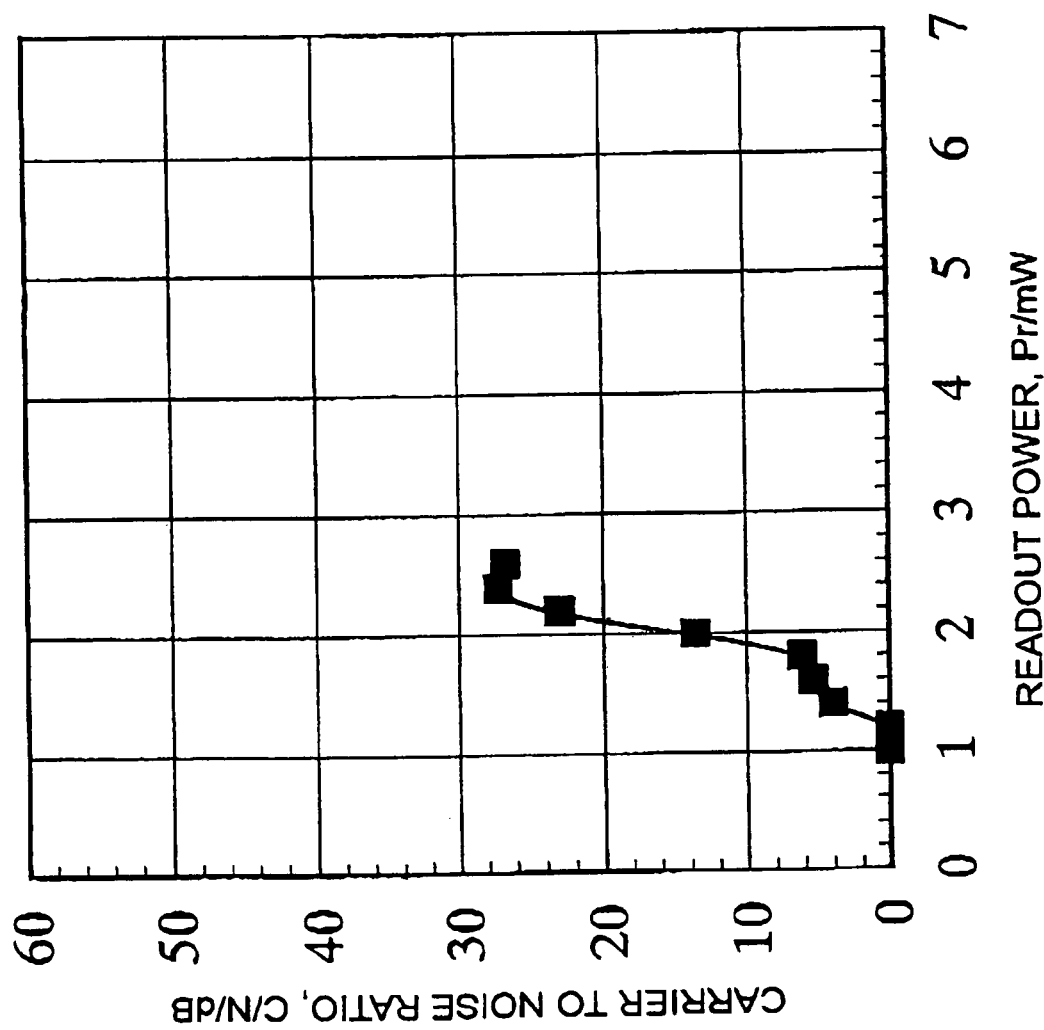
FIG. 39 is a graph of C/N versus readout power.

After the layer 10 of this optical recording disc sample was initialized or crystallized by means of a bulk eraser, single signals were recorded in the layer 10 using the same optical disc tester as described above under conditions: a linear velocity of 6 m/s, a recording power of 13 mW and an erasing power of 5 mW. The frequency of single signals was determined such that amorphous recorded marks having a length of 200 nm may be formed in the layer 10. Next, using the same optical disc tester, the sample was measured for C/N at a linear velocity of 6 m/s. FIG. 39 shows the C/N relative to the readout power Pr. It is noted that amorphous recorded marks are not erased with a readout power in the range shown in FIG. 39.

It is seen from FIG. 39 that this sample also enables super-resolution readout. Since the first dielectric layer 31, second dielectric layer 32 and metal layer do not contribute to super-resolution reading as described above, the layer 10 in this sample serves not only as the recording layer, but also as the functional layer as defined herein.

In this way, a construction in which the functional layer also serves as the recording layer is possible when a functional layer is constructed by a material capable of forming recorded marks upon irradiation of light with an appropriate writing power.

Probably, the readout power has a significant influence on super-resolution readout in the present invention as will be described later. Then, in the construction in which the layer 10 serves as both the functional layer and the recording layer as shown in FIG. 4C, it is desired to enable use of reading light of a high power by elevating the crystallization temperature of the layer 10, or making the second dielectric layer 32 thin to provide a rapid cooling structure, or constructing the second dielectric layer 32 and/or metal layer 5 from a high heat conductivity material. Of course, the medium is preferably designed such that writing characteristics may not be substantially impeded.

Function of Super-Resolution Readout

It is seen from the results of the foregoing experiments that the super-resolution readout enabled by the present invention utterly differs from the conventional super-resolution readout.

Figure 9:
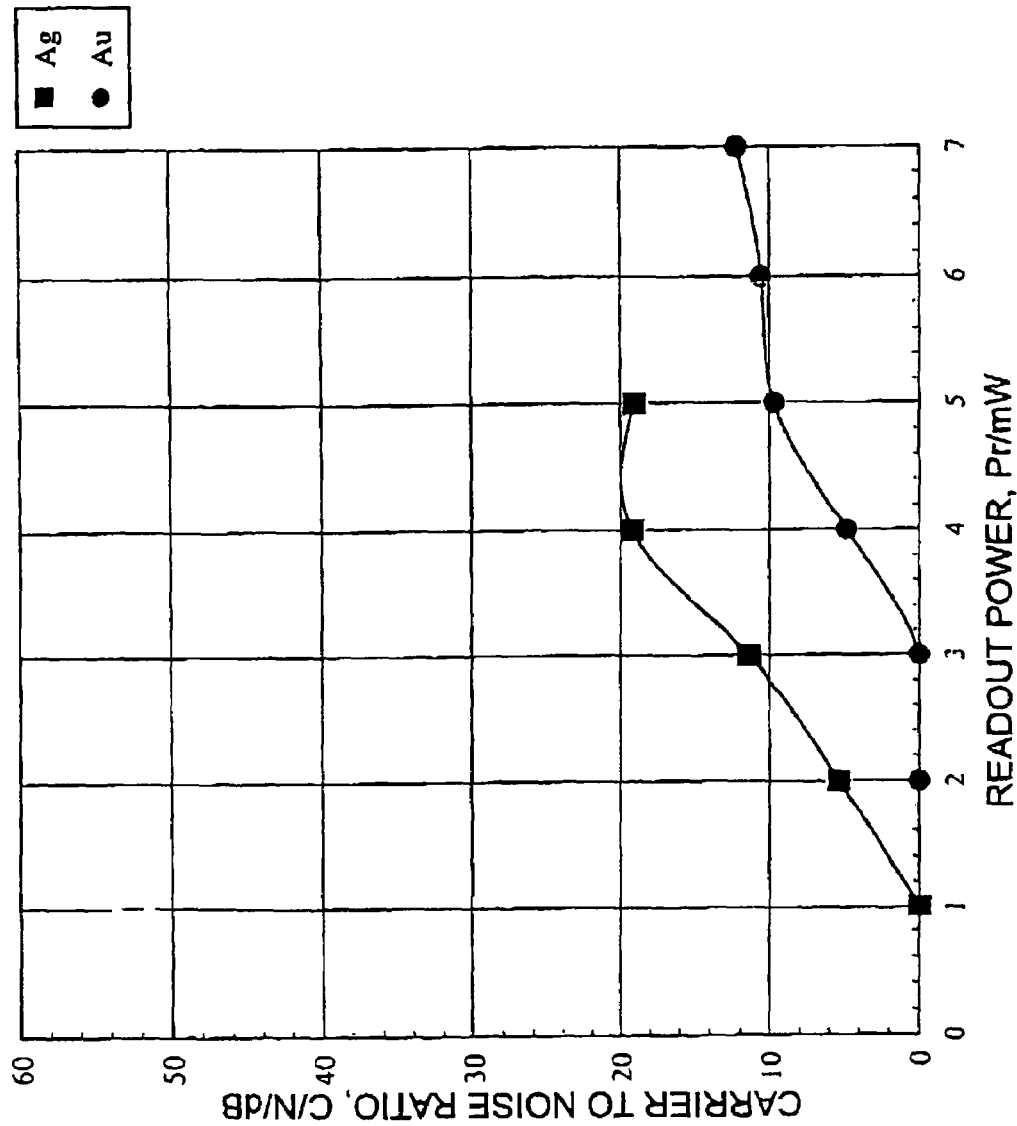
FIG. 9 is a graph of C/N versus readout power.
Figure 10:
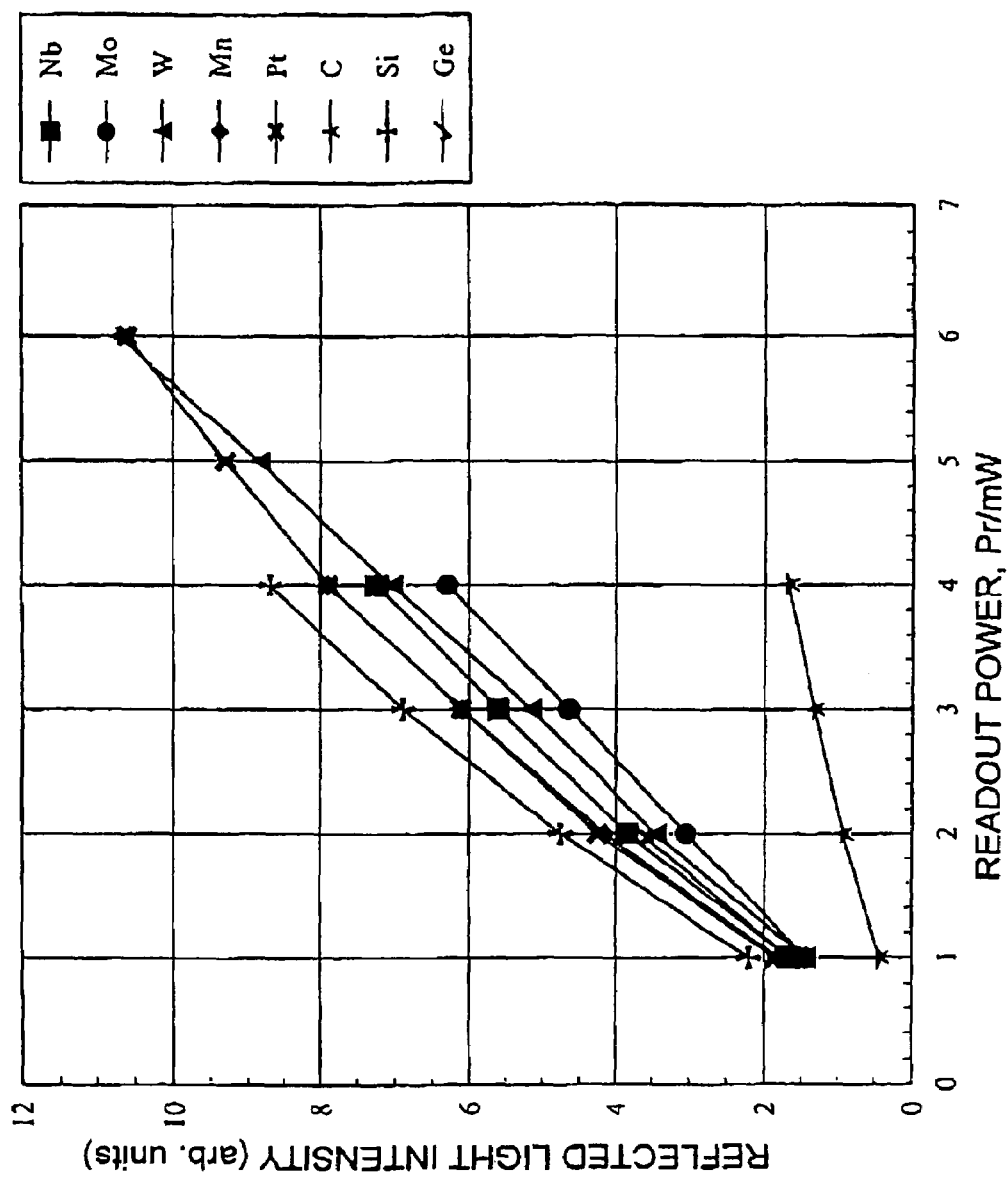
FIG. 10 is a graph of reflected light intensity versus readout power.
Figure 11:
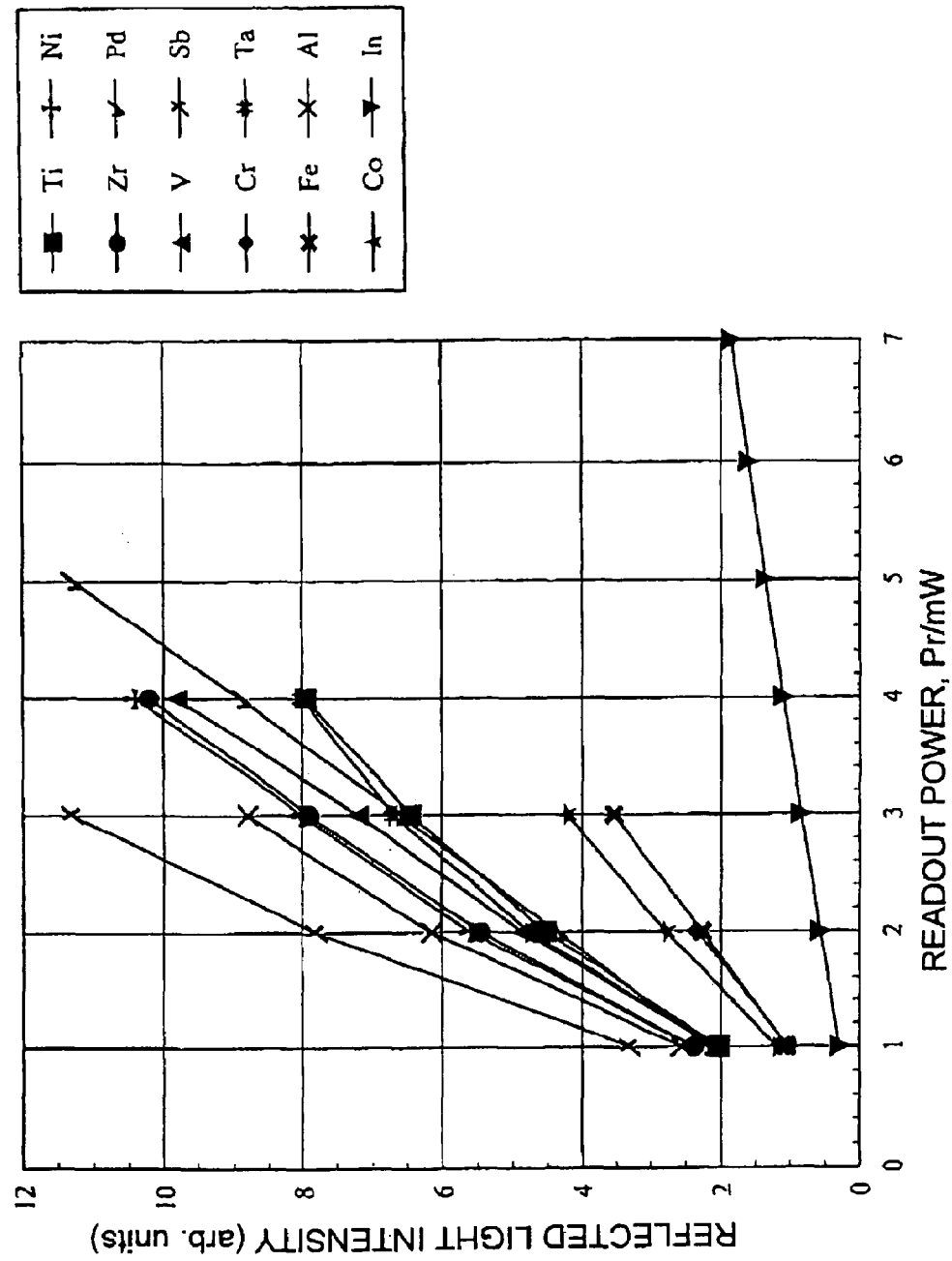
FIG. 11 is a graph of reflected light intensity versus readout power.
Figure 12:
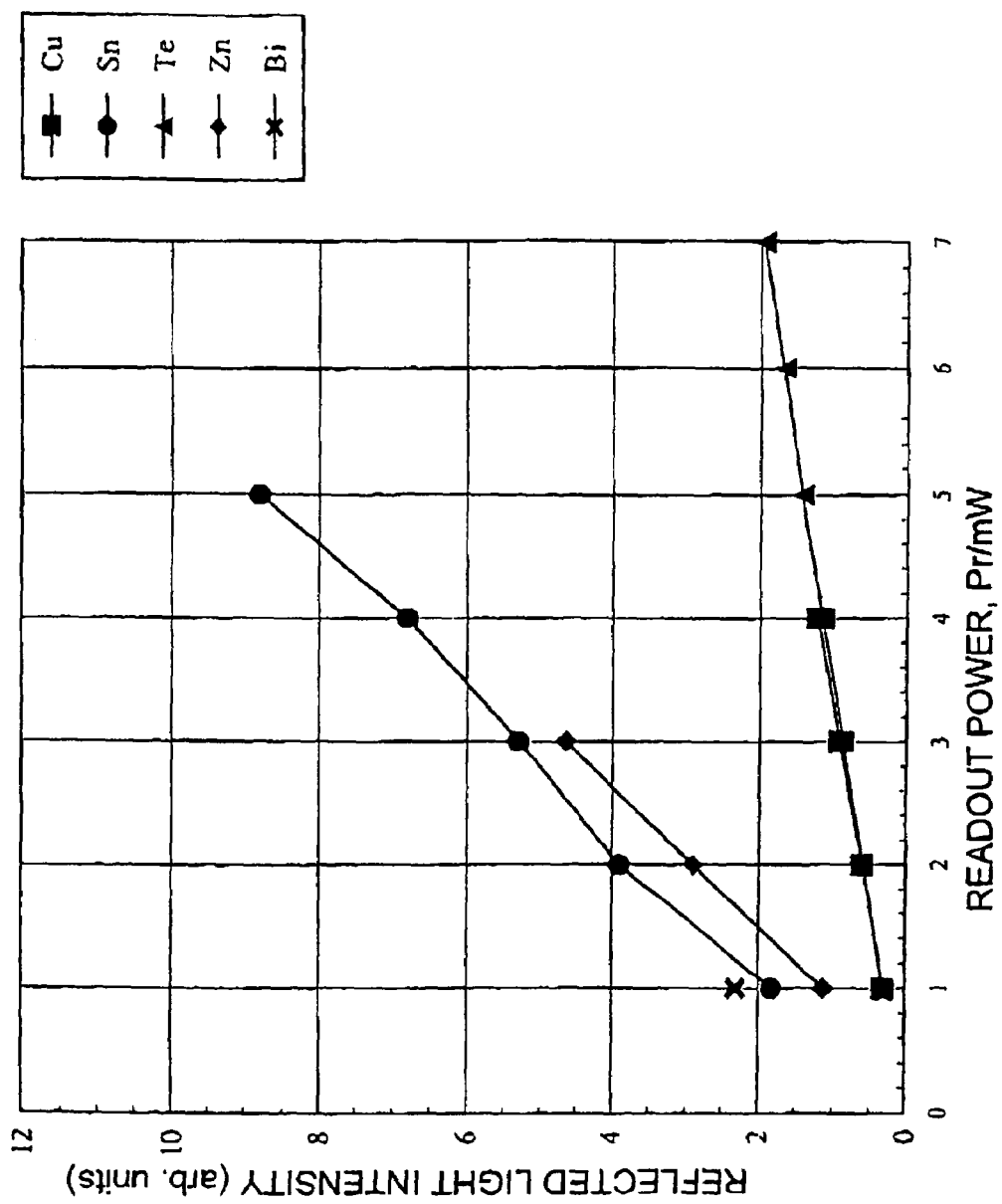
FIG. 12 is a graph of reflected light intensity versus readout power.
Figure 13:
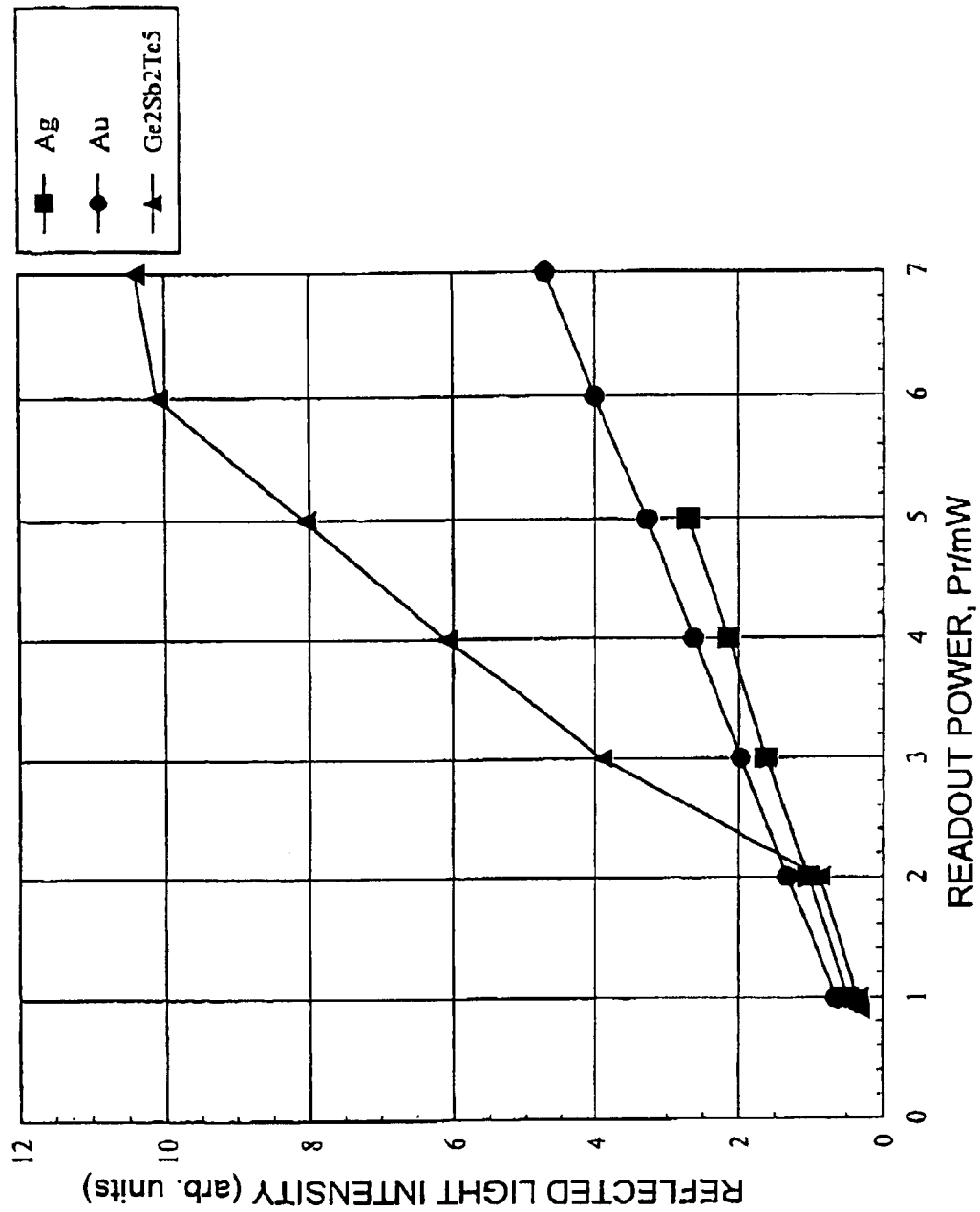
FIG. 13 is a graph of reflected light intensity versus readout power.

First in the conventional super-resolution readout, whether it is of the heat mode or of the photon mode, a laser beam is irradiated to the mask layer to define a beam spot whereby the transmittance or reflectance of a region smaller than the beam spot is increased by utilizing the energy distribution within the beam spot. As a result, as shown in FIG. 9 of JP-A 11-86342 referred to in the preamble, the C/N rises with an increasing readout power, and saturates when the light transmittance of the mask layer reaches a constant level. As the readout power is further increased, an abrupt drop of C/N occurs because the optical aperture (increased transmittance region) becomes too large. It is noted that the prior art super-resolution readout medium shows the same C/N behavior with respect to a readout power change even if it is of the type utilizing a reflectance increase.

Secondly, since the prior art super-resolution readout requires a heat or photon intensity above a certain level to form optical apertures in the mask layer, a threshold exists in the readout power which enables super-resolution readout and the reflectance of the medium drastically changes across the threshold.

Thirdly, the prior art super-resolution readout has the problem that in the case of reading at a constant readout power while changing a linear velocity, as the linear velocity increases, the temperature near the center of the beam spot becomes lower and the number of incident photons decreases. Therefore, in the conventional super-resolution readout, whether it is of the heat mode or of the photon mode, a drastic change of C/N occurs inevitably with a change of linear velocity.

In contrast, the super-resolution readout according to the present invention avoids a drastic drop of C/N, except for the case wherein read signals are lost on account of degradation of the layer 10, although the C/N rises, saturates and then slightly declines as the readout power Pr increases, as shown in FIGS. 6 to 9 and FIGS. 17 to 19. Also as seen from FIGS. 10 to 13 and FIGS. 20 to 22, the reflectance is independent of the readout power. Further, in the super-resolution readout according to the present invention, no substantial dependency of C/N on linear velocity is observed over a wide linear velocity range as shown in FIGS. 15, 29A and 29B. It is concluded from these results that the functional layer according to the invention enables super-resolution readout through a mechanism which completely differs from the mask layer and analogues in the prior art super-resolution media. It is thus suggested that in the present invention, the layer 10 itself improves the spatial resolution rather than the irradiation of reading light forming in the layer 10 minute regions of changed transmittance or reflectance.

Figure 31:
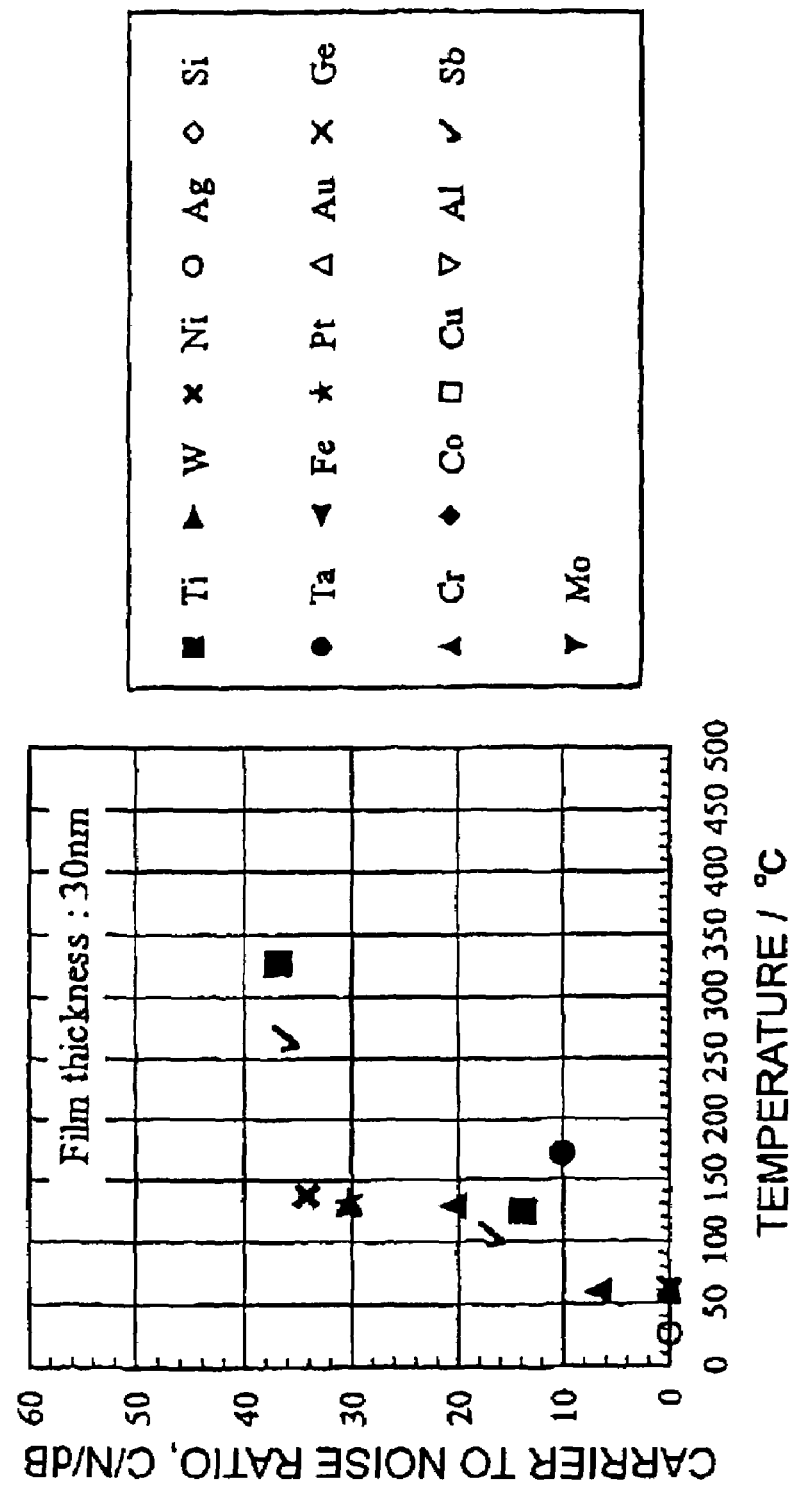
FIG. 31 is a graph of C/N versus the peak temperature of layer 10.
Figure 32:
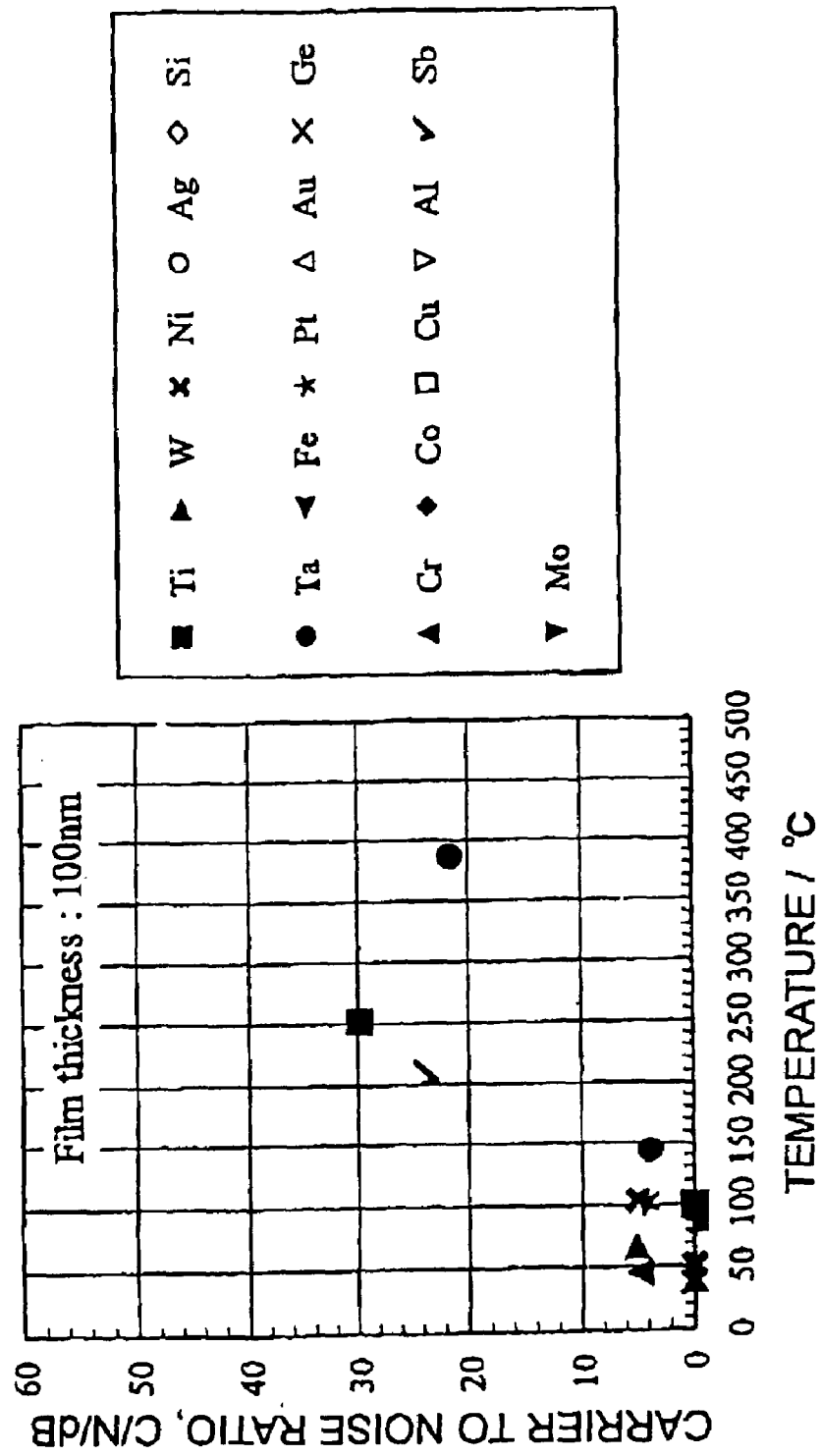
FIG. 32 is a graph of C/N versus the peak temperature of layer 10.

It is suggested that the heat mode is concerned in the super-resolution readout according to the present invention as previously described. To confirm this participation, we investigated the relationship of the C/N to the peak temperature of the layer 10 upon exposure to reading light. The peak temperature of the layer 10 (that is, the temperature reached by the layer 10) was calculated using as parameters the readout power, the refractive index and absorption coefficient of the material of the layer 10 at the reading light wavelength (635 nm), the thermal conductivity, specific heat at constant pressure, and density of the material of the layer 10, the thickness of the layer 10, the spot diameter of a laser beam, and the linear velocity (11 m/s) of the medium. The C/N relative to the peak temperature of the layer 10 is plotted in the graphs of FIGS. 30 to 32 for each thickness of the layer 10.

Figure 30:
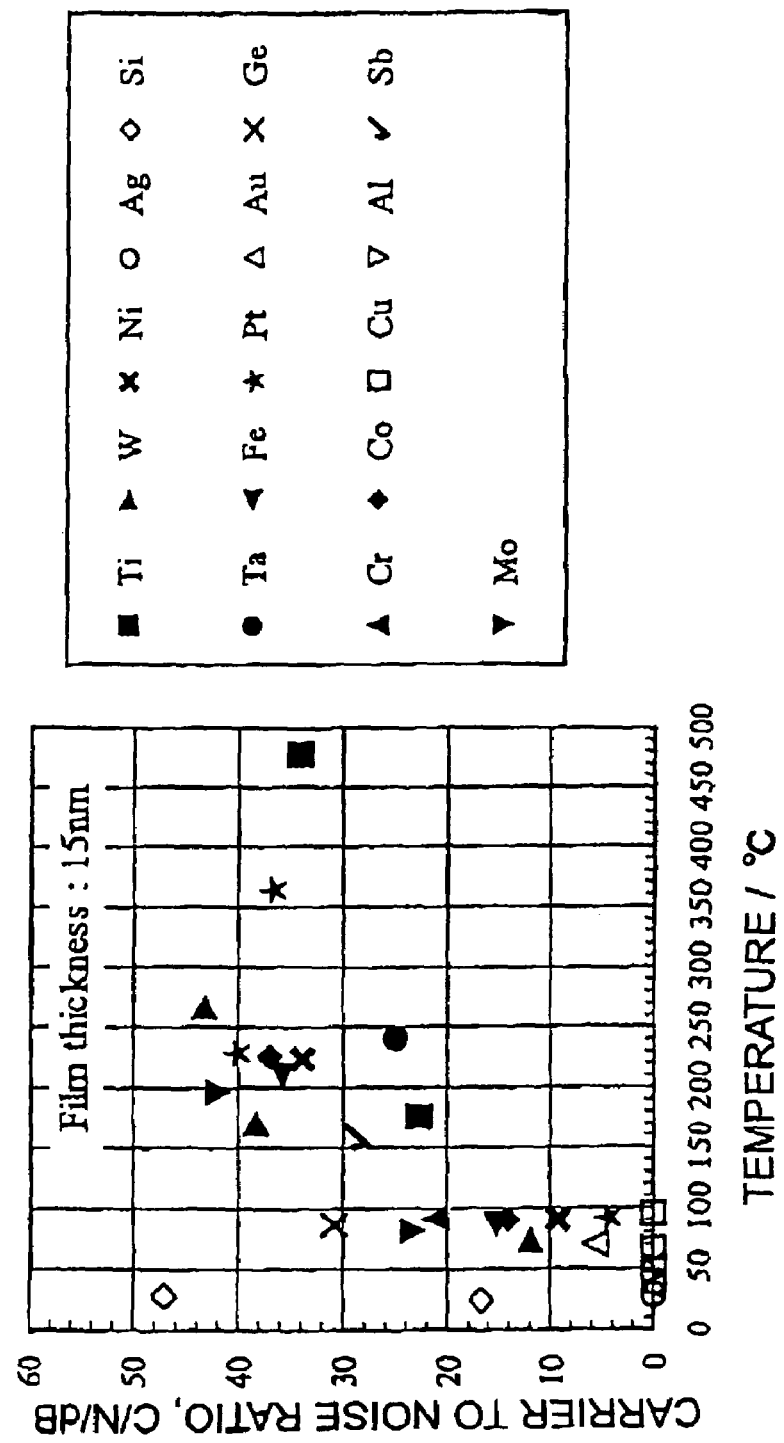
FIG. 30 is a graph of C/N versus the peak temperature of layer 10.

In any of these graphs, the correlation of C/N to the peak temperature of, the layer 10 is observed, a distinct correlation being observed especially in FIG. 30. That is, the tendency that C/N increases as the peak temperature of the layer 10 elevates is observed independent of the element of the layer 10. However, the temperature at which C/N starts to rise differs among different elements of which the layer 10 is made. These results strongly indicate that the heat mode is concerned in the super-resolution readout according to the present invention.

If the C/N is essentially determined by the peak temperature of the layer 10, the use of reading light of a shorter wavelength enables super-resolution readout with a lower power. As the laser wavelength becomes shorter, the spot diameter of a laser beam can be reduced, and as a result, the power density can be increased. Consequently, the use of a laser beam of a shorter wavelength enables the layer within the beam spot to be heated to a predetermined temperature with a lower power. Then, reading light of a shorter wavelength allows for the use of a lower readout power unless the absorption coefficient becomes especially low at the shorter wavelength. To confirm this, the peak temperature of the layer 10 was determined under the situation using reading light with a wavelength of 410 nm and a readout power of 3 mW and rotating the medium at a linear velocity of 11 m/s. The peak temperature reached under this situation was compared with the peak temperature of the layer 10 determined under the situation using reading light with a wavelength of 635 nm and a readout power of 3 mW and rotating the medium at a linear velocity of 11 m/s. As a result, it was confirmed that using reading light of a shorter wavelength, the peak temperature was elevated for all the materials of the layer 10. For example, the peak temperature of the layer 10 made of Cu was 66° C. at a wavelength of 635 nm, but increased to 488° C. at a wavelength of 410 nm.

As described above, the temperature of the functional layer plays an important role in the super-resolution readout according to the invention. To confirm this, we conducted a further experiment.

Figure 33:
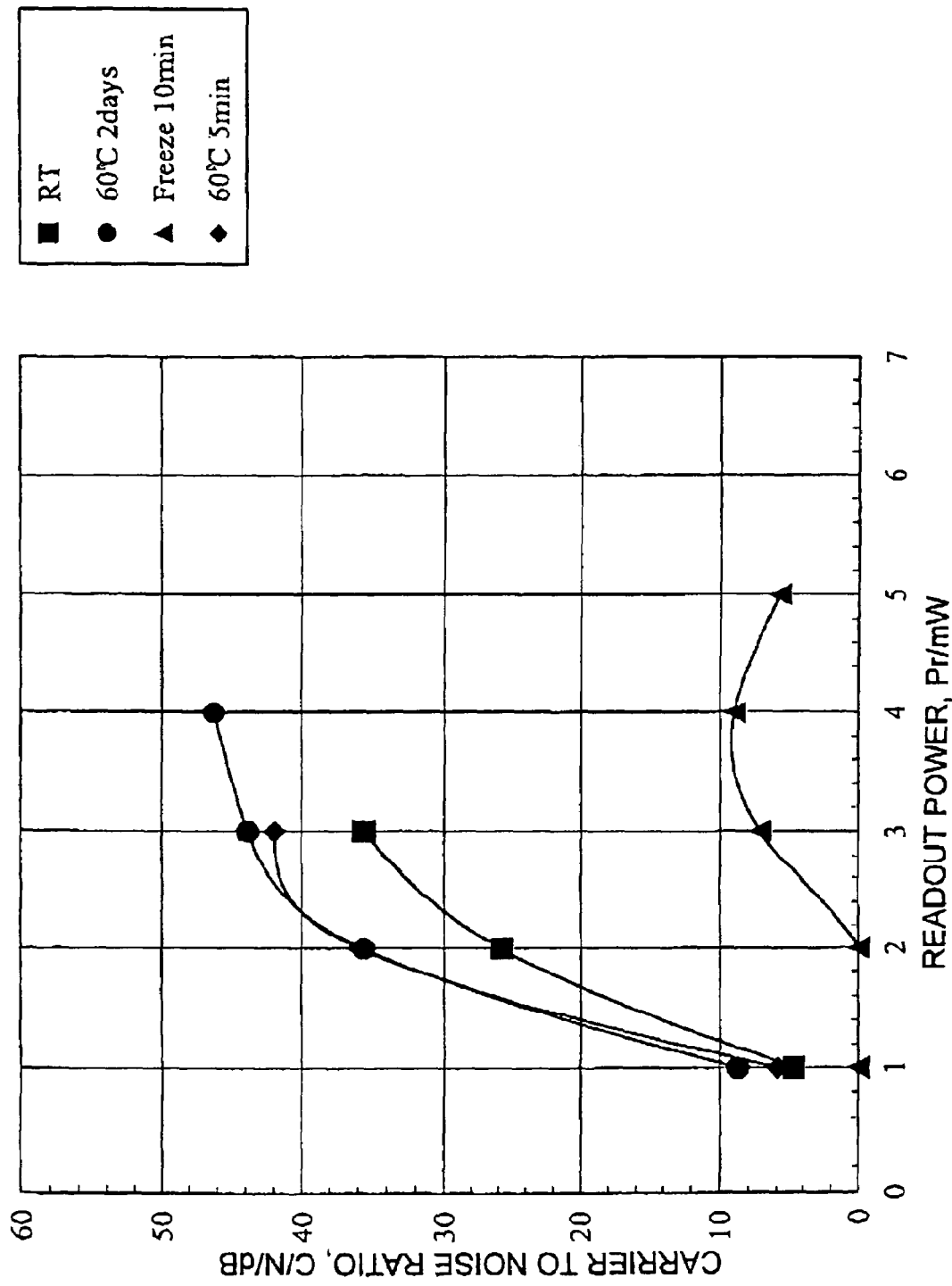
FIG. 33 is a graph showing how C/N changes with a temperature transition in the environment where the optical information medium is situated.

Of the samples prepared in the foregoing experiments, those samples having the layer 10 in the form of a silicon layer of 15 nm thick were measured for C/N along a pit row with a pit length of 250 nm at room temperature (RT). Thereafter, the samples were held for two days at 60° C., followed by C/N measurement, subsequently held for 10 minutes in a refrigerator, followed by C/N measurement, and finally held for 5 minutes at 60° C., followed by C/N measurement. These C/N measurements are plotted in the diagram of FIG. 33. A comparison of C/N values available at the same readout power in FIG. 33 apparently reveals that the C/N improves during the high-temperature storage, but lowers during the low-temperature storage. It is evident from these results that the temperature of the funotional layer is concerned in the super-resolution readout according to the invention.

Reading Method

In the medium of the invention, the temperature of the functional layer during reading operation is correlated to the C/N as described above. Then, according to the invention, super-resolution readout is enabled by raising the temperature of the functional layer above a predetermined value for a particular material of the functional layer. In the practice of the invention, in order to heat the functional layer above the predetermined temperature, only the irradiation of reading light (laser beam) may be utilized, although the elevation of the ambient temperature may be additionally utilized. If the temperature of the functional layer can be set above the predetermined value simply by controlling the ambient temperature, super-resolution readout becomes possible with a readout power of such an order as to invite no substantial temperature rise of the functional layer. Utilizing the elevation of the ambient temperature permits the readout power to be suppressed low and is thus effective in a situation where the reflected light detecting system is saturated due to the too high reflectance of the layer 10. Also when the elevation of the ambient temperature is utilized, it is only required that the layer which has already been heated to a certain temperature be further heated to the predetermined temperature by applying a readout power thereto, which helps reduce the heating rate of the functional layer upon reading. Therefore, the elevation of the ambient temperature is effective when the functional layer is constructed of a material which tends to degrade by a rapid temperature rise.

To elevate the ambient temperature, any of various heating means is incorporated in the drive so that the medium may be entirely heated or locally heated near the region to be addressed for reading. As the heating means, a film heater may be disposed so as to face the medium in the drive. Alternatively, a resistance heating coil is disposed in proximity to the optical pickup so as to move in unison with the optical pickup.

In the medium of the invention, an upper limit is imposed on the available readout power, depending on the material of the layer 10 and the structure of the medium. It is therefore convenient that an optimum readout power for these conditions is previously recorded in the medium of the invention. Then, the optimum readout power can be read out before the start of reading operation, and the reading operation be performed with this optimum power. Also, if necessary, a trial reading operation is performed to determine the optimum readout power.

Pit Depth

It is known for the prior art read-only media having phase pits that the read output generally becomes maximum when the phase pits have a depth of $\lambda/4n$ wherein the substrate provided with phase pits has a refractive index n and the reading light has a wavelength $\lambda$. It is also known that when tracking relies on the push-pull method, the tracking error signal (push-pull signal) becomes maximum when the phase pits have a depth of $\lambda/8n$ and zero when the phase pits have a depth of $\lambda/4n$. For this reason, it is a common practice for the prior art read-only media to set the depth of phase pits at an intermediate of $\lambda/6n$ therebetween.

Figure 34:
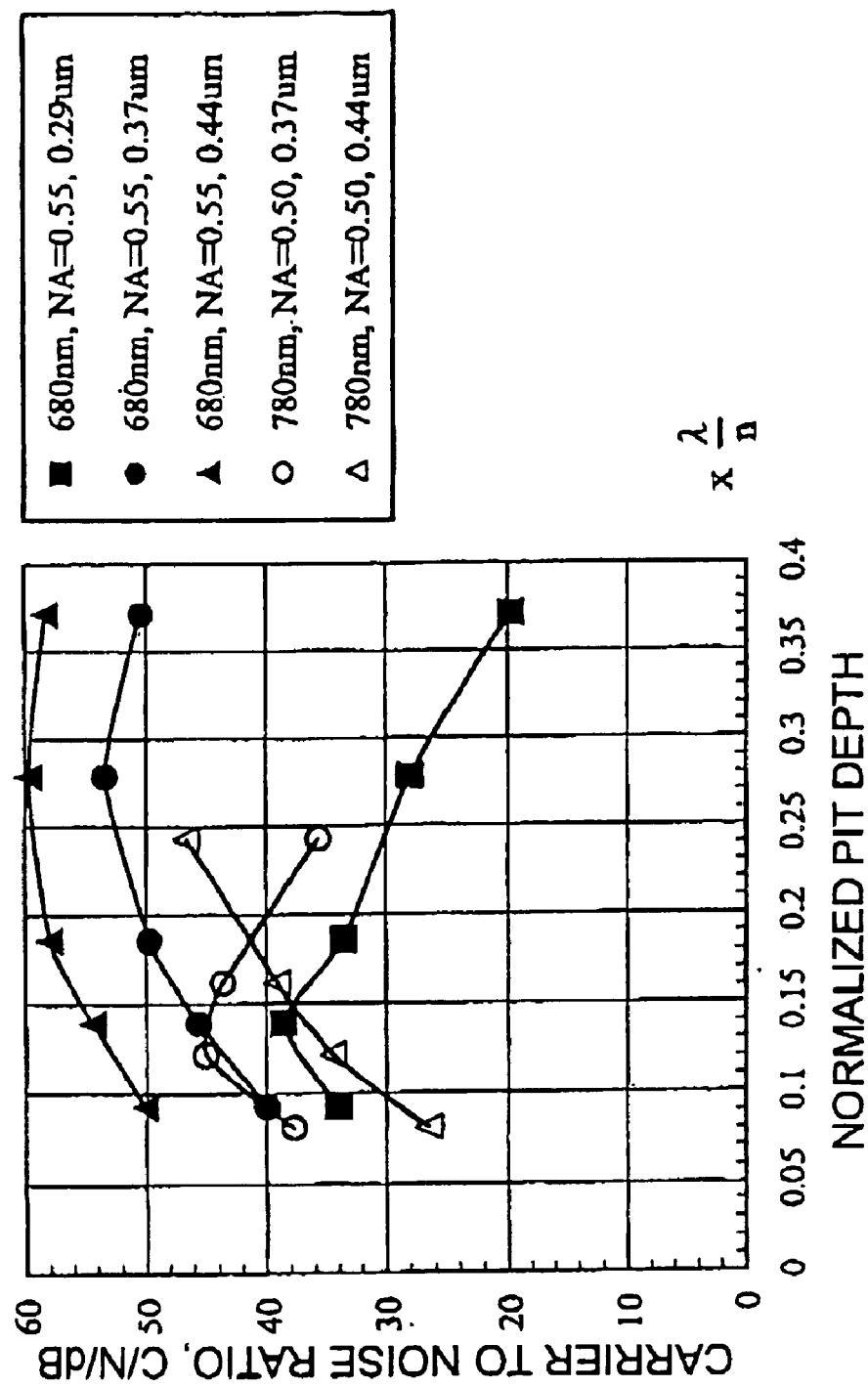
FIG. 34 is a graph of C/N versus pit depth.

In contrast, the depth of pits ensuring a maximum read output to the medium having the functional layer according to the invention differs from that of the prior art read-only media. In FIG. 34, the C/N of the medium of the invention is plotted relative to the pit depth. In the experiment from which the results shown in FIG. 34 are derived, optical disc samples of the construction shown in FIG. 2 were used. The substrate 2 used was a disc which was injection molded from polycarbonate (refractive index n= 1.58) to a diameter of 120 mm and a thickness of 1.2 mm in which phase pits were formed simultaneous with injection molding. Three types of pits with a length of 0.29 $\mu$m. 0.37 $\mu$m and 0.44 $\mu$m were formed. The space between adjacent pits was equal to the pit length. The pit depth was set to the value indicated on the abscissa of the graph of FIG. 34. It is noted that the pit depth indicated in the graph has been normalized in terms of the wavelength $\lambda$ of reading light and the refractive index n of the substrate at the wavelength $\lambda$. The layer 10 was constructed by a germanium layer of 15 nm thick. The protective layer 6 was constructed from a UV-curable resin to a thickness of 10 $\mu$m as in the foregoing samples.

This experiment used:
(1) a reading system of the short wavelength type in which the laser wavelength is 680 nm, the numerical aperture (NA) is 0.55, and the readable pit length is 0.31 $\mu$m or greater, and
(2) a reading system of the long wavelength type in which the laser wavelength is 780 nm, the numerical aperture (NA) is 0.50, and the readable pit length is 0.39 $\mu$m or greater. Reading operation was carried out while setting the readout power to 4 mW for the short wavelength type and 7 mW for the long wavelength type and the linear velocity to 11 m/s for both the types. As to the pits with a length of 0.44 $\mu$m, normal readout was possible since this pit length was greater than the resolution limit of both the types. As to the pits with a length of 0.37 $\mu$m, normal readout took place with the system of the short wavelength type and super-resolution readout toot place with the system of the long wavelength type. As to the pits with a length of 0.29 $\mu$m, super-resolution readout took place even with the system of the short wavelength type.

It is seen from FIG. 34 that in case where normal readout takes place, a maximum C/N is obtained near $\lambda/4n$ as is known in the prior art, and that in case where super-resolution readout takes place, the C/N becomes maximum near $\lambda/8n$. It is thus seen that in case where super-resolution readout takes place, higher read outputs are obtained when the pit depth is made shallower than $\lambda/6n$ which was conventionally selected in order to secure both a read output and a tracking error signal output. It is further seen that in case where super-resolution readout takes place, the decline of C/N from the maximum is minimized even when the pit depth is set to $\lambda/10n$ which is extremely shallower than in the prior art.

Although the C/N rather than the read output is depicted in FIG. 34, in the above experiment, the pit depth at which the read output became maximum was equal to the pit depth at which the C/N became maximum.

It is seen from the results of the foregoing experiments that when it is desired to give preference on the read output of miniature pits to be addressed for super-resolution readout in the medium of the invention, the pit depth d is preferably set to be:

$\lambda/10n \leq d < \lambda/6n$, and especially $\lambda/9n \leq d \leq \lambda/7n$ throughout the medium.

It is noted that in the medium of the structure shown in FIG. 3A, when reading light is directed thereto through the substrate 2, the thickness of the first dielectric layer 31 is equal between pits and the remaining region because the first dielectric layer 31 is relatively thin. Consequently, even when the layer 10 is formed on the substrate 2 with another layer such as the first dielectric layer 31 interposed therebetween, the adequate range of the pit depth can be expressed using the refractive index n of the substrate 2.

Further, when the irregular surface of the substrate 2 in FIG. 1 is turned upside down and a thin transparent resin layer is formed on the layer 10 so that reading light is directed through the transparent resin layer, the refractive index used in the calculation of the adequate pit depth is that of the transparent resin layer. Where the transparent resin layer is omitted in this embodiment, the refractive index used in the calculation of the adequate pit depth is that of air. That is, in these embodiments, the refractive index of the transparent resin layer or air present on the reading light incident side is considered to be the refractive index of the substrate.

Where pits with a length of less than $\lambda/4NA$ requiring super-resolution readout and pits with a length of at least $\lambda/4NA$ capable of normal readout are copresent, both the pits are given different depths whereby high read outputs are obtainable from both the pits. More specifically, the depth $d_S$ of those pits with a length of less than $\lambda/4NA$ and the depth $d_L$ of those pits with a length of at least $\lambda/4NA$ are set to meet $d_S < d_L$. To acquire high outputs, ds should preferably fall in the range:

$\lambda/10n \leq d_S < \lambda/6n$, and especially $\lambda/9n \leq d_S \leq \lambda/7n$.

On the other hand, $d_L$ should preferably fall in the range:

$\lambda/8n < d_L < \lambda/4n$, and especially $\lambda/7n \leq d_L \leq \lambda/5n$.

In order to form two types of pits having different depths, two types of photoresist which differ in sensitivity may be used in the mastering step utilizing photolithography, for example. In this case, a low sensitivity photoresist layer and a high sensitivity photoresist layer are stacked as lower and upper layers, respectively. When a pattern of shallow pits is to be formed, exposure is made such that only the upper layer is reacted to light. When a pattern of deep pits is to be formed, exposure is made such that not only the upper layer, but also the lower layer is reacted to light. Alternatively, using two types of photoresist which differ in absorption wavelength, a photoresist layer of stacked layer structure is formed. In this case too, the photo-reaction of only the upper layer and the photo-reaction of both the upper and lower layers are independently carried out.

Understandably, the above-described control of the pit depth is not limited to the read-only media, but also applicable to address pits in recording media.

Japanese Patent Application Nos. 11-189800, 11-242293, 11-267823, 11-302558, 11-375067 and 2000-182125 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. An optical information medium comprising an information bearing surface having projections and depressions and/or is capable of forming recorded marks, and a functional layer, wherein
    the information borne on said information bearing surface is readable by using reading light of a wavelength longer than $4NA \cdot P_L$ wherein $P_L$ is the minimum size of said projections and depressions or said recorded marks and NA is the numerical aperture of a reading optical system, setting the power of the reading light within such a range that the intensity of reflected light from said functional layer changes in linear proportion to a change in the readout power, and irradiating the reading light to said information bearing surface constructed by the functional layer or to said information bearing surface through the functional layer or to the functional layer through said information bearing surface; and
    wherein said functional layer has a thickness between 5 nm and 100 nm and is made of at least one element of Nb, Mo, W, Mn, Pt, C, Si and Ge; and
    wherein an information on readout power is previously recorded to said information bearing surface.

2. An optical information medium comprising:
    an information bearing surface having projections and depressions and/or capable of forming recorded marks, wherein the information borne by the projections and the depressions and/or by the recorded marks is read based on a change in reflectance, and
    a functional layer having a function of increasing a spatial resolution,
    wherein said information bearing surface includes information on readout power; and
    wherein said readout power is set to maximize carrier-to-noise ratio as a function of thickness and material composition of said functional layer and/or as a function of the structure of said information bearing surface.

3. The optical information medium of claim 2, wherein said information on readout power is previously recorded to said information bearing surface.

4. The optical information medium of claim 3, wherein said functional layer has a thickness between 5 nm and 100 nm and is made of at least one element of Nb, Mo, W, Mn, Pt, C, Si and Ge.

5. An optical information medium comprising a substrate which is formed on a surface with pits for bearing information, and a functional layer on the pitted surface of said substrate, wherein
    the information borne in said pits is readable when reading light of a wavelength longer than $4NA \cdot P_L$ wherein $P_L$ is the minimum length of said pits and NA is the numerical aperture of a reading optical system is irradiated, provided that the reading light has a wavelength $\lambda$ and said substrate has a refractive index n, the pits have a depth d which satisfies:

$\lambda/10n \leq d < \lambda/6n$ throughout the medium, wherein said pitted surface includes information on readout power; and wherein said readout power is set to maximize carrier-to-noise ratio as a function of thickness and material composition of said functional layer and/or as a function of the dimensions of said pits for bearing information.

6. The optical information medium of claim 5, wherein said information on readout power is previously recorded to said pitted surface.

7. The optical information medium of claim 6, wherein said functional layer has a thickness between 5 nm and 100 nm and is made of at least one element of Nb, Mo, W, Mn, Pt, C, Si and Ge.

8. An optical information medium comprising a substrate which is formed on a surface with pits for bearing information, and a functional layer on the pitted surface of said substrate, wherein the information borne in said pits is readable when reading light of a wavelength longer than $4NA \cdot P_L$ wherein $P_L$ is the minimum length of said pits and NA is the numerical aperture of a reading optical system is irradiated, provided that the reading light has a wavelength $\lambda$, said pits include pits having a length of less than $\lambda/4NA$ and a depth of $d_S$, and pits having a length of at least $\lambda/4NA$ and a depth of $d_L$ that satisfies $d_S < d_L$, wherein said pitted surface includes information on readout power; and wherein said readout power is set to maximize carrier-to-noise ratio as a function of thickness and material composition of said functional layer and/or as a function of the dimensions of said pits for bearing information.

9. The optical information medium of claim 8, wherein said information on readout power is previously recorded to said pitted surface.

10. The optical information medium of claim 9, wherein said functional layer has a thickness between 5 nm and 100 nm and is made of at least one element of Nb, Mo, W, Mn, Pt, C, Si and Ge.

* * * * *